US009403987B2

(12) United States Patent
Hayoz et al.

(10) Patent No.: US 9,403,987 B2
(45) Date of Patent: Aug. 2, 2016

(54) CHARGED PARTICLES

(75) Inventors: Pascal Hayoz, Hofstetten (CH); Bernd Lamatsch, Late of Riehen (CH); Achim Lamatsch, legal representative, Waldkirch (DE); Margherita Fontana, Thalwil (CH); Stephan Burkhardt, Gelterkinden (CH); Laurent Michau, Rosenau (FR); Urs Lehmann, Basel (CH); Philippe Bugnon, Le Mouret (CH)

(73) Assignee: BASF SE, Ludwigshafen (DE)

( * ) Notice: Subject to any disclaimer, the term of this patent is extended or adjusted under 35 U.S.C. 154(b) by 933 days.

(21) Appl. No.: 13/376,874

(22) PCT Filed: Jun. 11, 2010

(86) PCT No.: PCT/EP2010/058206
§ 371 (c)(1),
(2), (4) Date: Apr. 25, 2012

(87) PCT Pub. No.: WO2010/149505
PCT Pub. Date: Dec. 29, 2010

(65) Prior Publication Data
US 2012/0229884 A1 Sep. 13, 2012

(30) Foreign Application Priority Data
Jun. 24, 2009 (EP) .................... 09163640

(51) Int. Cl.
| C09K 9/00 | (2006.01) |
| G02F 1/00 | (2006.01) |
| C09B 69/00 | (2006.01) |
| C09B 69/04 | (2006.01) |
| G02F 1/167 | (2006.01) |
| C09D 11/00 | (2014.01) |
| C07F 9/02 | (2006.01) |
| C07F 7/00 | (2006.01) |
| B01D 61/42 | (2006.01) |
| B01D 61/58 | (2006.01) |

(52) U.S. Cl.
CPC .............. *C09B 69/008* (2013.01); *C09B 69/04* (2013.01); *G02F 1/167* (2013.01); *G02F 2001/1678* (2013.01)

(58) Field of Classification Search
USPC .............. 106/23, 31.28, 287.11, 287.14, 490; 204/450; 252/583; 359/296; 427/220; 556/405, 425; 977/773
See application file for complete search history.

(56) References Cited

U.S. PATENT DOCUMENTS

| 4,566,908 A | 1/1986 | Nakatani |
| 4,680,103 A | 7/1987 | Solomon I. et al. |
| 4,877,451 A | 10/1989 | Winnik et al. |
| 5,041,590 A * | 8/1991 | Snow ............................ 556/425 |
| 5,914,806 A | 6/1999 | Gordon |
| 7,319,554 B1 | 1/2008 | Abe |
| 2007/0163463 A1 * | 7/2007 | Hasinovic et al. .............. 106/10 |
| 2007/0297038 A1 | 12/2007 | Chopra |
| 2009/0296195 A1 | 12/2009 | Fontana |

FOREIGN PATENT DOCUMENTS

| DE | 10346944 A1 * | 5/2005 | ................ D06P 5/15 |
| EP | 0355062 A | 2/1990 | |
| IT | WO 2007/048721 A1 * | 5/2007 | ................ C09C 1/30 |
| JP | 2007169507 | 7/2007 | |
| RU | 2108354 | 4/1998 | |
| RU | 2137801 | 9/1999 | |
| WO | 2007/048721 A | 5/2007 | |
| WO | 2008/087794 A | 7/2008 | |

OTHER PUBLICATIONS

Jie Wu, Li-Min Wang, Ping Zhao, Feng Wang, Guifeng Wangb, A new type of quaternary ammonium salt containing siloxane group and used as favorable dispersant in the surface treatment of C.I. pigment red 170, Progress in Organic Coatings 63 (2008) 189-194.*
Kohl et al., "Bis(rylenedicarboximide)-a,d-1,5-diaminoanthraquinones as unique infrared absorbing dyes", Chem. Commun., 2002, pp. 2778-2779.
Green, Floyd J., "4-Phenylazomaleinanil", The Sigma-Aldrich Handbook of Stains, Dyes and Indicators, Jun. 1990, p. 572.
Green, Floyd J., "Sudan Black B", The Sigma-Aldrich Handbook of Stains, Dyes and Indicators, Jun. 1990, p. 660.
Winnik et al., Dyes and Pigments, vol. 14, Jan. 1, 1990, pp. 101-112.
English language machine-generated translation for RU2108354 (7 pages); 1998.
English language machine-generated translation for RU2137801 (22 pages); 1999.
English language machine-generated translation for JP2007169507 (56 pages); 2007.

* cited by examiner (Continued)

*Primary Examiner* — Bijan Ahvazi
(74) *Attorney, Agent, or Firm* — Marshall, Gerstein & Borun LLP

(57) ABSTRACT

Disclosed is a composition comprising a charged particle of volume 5 nm³ to 50 million nm³ preferably having an inorganic core of $SiO_2$, $Al_2O_3$, and/or $TiO_2$, or a core essentially consisting of an organic pigment and/or pigment derivative, and a counter ion which is separable from the particle and is not covalently linked to the particle, said counter ion comprising a silicon atom which is directly bound to a carbon atom. Preferably, said charged particle comprises a dye attached to said inorganic core and said counter ion comprises a (poly)siloxane moiety linked via suitable bridge members to a quaternary, positively charged, nitrogen or phosphorus atom, or to a moiety carrying an anionic functional group. Said composition may be used e.g. in the form of a homogenous dispersion in an electrophoretic display.

15 Claims, No Drawings

CHARGED PARTICLES

The present invention relates to compositions comprising specifically functionalized charged nanoparticles and counter ions comprising a silicon atom which is directly bound to a carbon atom, and to the use of said compositions and counter ions in electrophoresis, e.g. in electrophoretic displays.

Electrophoresis is the motion of dispersed particles or charged molecules relative to a fluid under the influence of an electric field.

Electrophoretic displays generally comprise an electric double layer produced in an interface between a solid (charged particle) and a liquid (dispersion medium), in which a charged particle migrates to an electrode having polarity opposite to the charge possessed by the charged particle by using, as motive power, the force exerted by an electric field.

It is of importance for electrophoretic displays, especially for electronic paper, that, once some contents are displayed, the display can be retained for a longer period of time even though a voltage is applied in currentless state. This is in contrast to other types of displays, e.g. LCD or LED displays. A further difference to LCD displays resides in the fact that electrophoretic displays can be much easier viewed in bright sunlight than LCD displays.

The present invention provides dispersable charged particles which can be used as electronic ink for such electrophoretic displays and which enable to cover the full colour range.

WO 2007/048721 A1 (which is incorporated herein by reference) describes for use in electrophoretic displays coloured nano-, sub-micro- or microparticles carrying a positive or negative charge and comprising an inorganic core of $SiO_2$, $Al_2O_3$ or mixed $SiO_2$ and $Al_2O_3$ particles to which an organic chromophore is covalently bound via a bridge member to an oxygen atom on the surface of said inorganic core. Said positive charge on said particles is neutralized by anionic counterions preferably selected from fluoride, chloride, methyl sulfate, ethyl sulfate, formate or acetate. Said negative charge on said particles is neutralized by cationic counterions selected from alkali metal ions, or ammonium or phosphonium ions.

The counterions disclosed in WO 2007/048721 A1 are clearly not ideal for use in very a polar solvents, like dodecane. They require polar solvents for good solvation. Polar solvents, however, are not suitable for energy-efficient electrophoretic displays since their conductivity would lead to a loss of electrical energy.

The problem to be solved by the present invention was to overcome this disadvantage.

According to the solution of this problem as disclosed herein special counter ions are employed, said counter ions preferably comprising (poly)siloxane moieties linked via suitable bridge members to a negatively or preferably positively charged functional group.

The invention relates to a composition comprising a charged particle of volume 5 nm³ to 500 million nm³, e.g. 50 million nm³, and a counter ion which is separable from the particle and is not covalently linked to the particle, said counter ion comprising a silicon atom which is directly bound to a carbon atom, especially to such composition in the form of a homogenous dispersion.

As stated above, the charged particle has a volume of 5 nm³ to 500 million nm³, e.g. 50 million nm³, especially 10 nm³ to 1 million nm³, preferably 25 nm³ to 500,000 nm³, most preferably 25 nm³ to 100,000 nm³. The particles are preferably approximately spherical. The preferred diameter of spherical particles is between 2 nm and 500 nm, especially 3 nm and 100 nm, preferably 3 nm and 50 nm, most preferably 3 nm and 30 nm. Using the formula for the volume V of a sphere, i.e. $V=⅙ \pi d^3$, these diameters d correspond to an approximate particle volume of about 4 nm³ (diameter 2 nm), 14 nm³ (diameter 3 nm), 14000 nm³ (diameter 30 nm), 63000 nm³ (diameter 50 nm), 500000 nm³ (diameter 100 nm), and 63 million nm³ (diameter 500 nm), respectively.

Preferably, the charged particle has an inorganic core, like especially a $SiO_2$, $Al_2O_3$, $TiO_2$ or mixed $SiO_2$, $Al_2O_3$ and/or $TiO_2$ core. Mixed inorganic particles can e.g. contain a core of $TiO_2$ or $Al_2O_3$, which is coated with $SiO_2$. Alternatively, the core of the charged particle comprises an organic pigment which is usually modified as described further below. The core of the charged particle does not comprise an organic (co-)polymer, like a polystyrene comprising (co-)polymer.

Preferably, a dye is covalently bound to said inorganic core directly or via a bridge member. Preferably, the charged particle is a $SiO_2$, $Al_2O_3$, $TiO_2$ or mixed $SiO_2$, $Al_2O_3$ and/or $TiO_2$ particle comprising, covalently bound to an oxygen atom on the surface, a radical of formula

(I)

wherein
q is 1 to 4,
$R_1$ and $R_2$ are independently of each other hydrogen, core surface-O—, or a substituent,
X is alkylene, like branched or preferably straight chain alkylene having preferably 1-20 carbon atoms, preferably —$(CH_2)_y$— wherein y is 1 to 8,
B is a direct bond or a bridge member extending to D, and
D is the residue of a dye, like especially a dye comprising an organic chromophore.

Preferably, D is the charged residue of a dye. If D is uncharged, the charge can be introduced into the particle by another charged group covalently bonded to the particle. In such case, for example, in the above formula (I) D or B-D may be replaced by a charged group.

There are some dyes which contain already a —Si($R_1$, $R_2$)—X—B— moiety [cf. the dyes of formulae (72) to (76) below]. In such case D may be directly linked to the inorganic core without the need to introduce another —Si($R_1$, $R_2$)—X—B— moiety.

The particles can comprise mixtures of dyes. Usually one kind of dyes per particle is preferred, except in the case of black dye mixtures.

The particles can comprise further groups attached to the core surface in addition to the group of formula (I), e.g. to enhance the dispersibility of the particles, to stabilize the dispersions, to stabilize the dyes etc.

In addition to a counter ion comprising a silicon atom which is directly bound to a carbon atom the particles can comprise a non-covalently bound counter ion.

q is especially 1 or 2, preferably 1. If the alkylene moiety X contains at least 2 carbon atoms q may represent also 3 or 4.

$R_1$ and $R_2$ are, for example, independently of each other hydrogen; $C_5$-$C_{12}$-cycloalkyl; $C_1$-$C_{25}$alkyl which may be interrupted by —O— or —S— and/or substituted by halogen, like preferably fluorine; $C_2$-$C_{24}$alkenyl; phenyl; $C_7$-$C_9$-phenylalkyl; —$OR_5$;

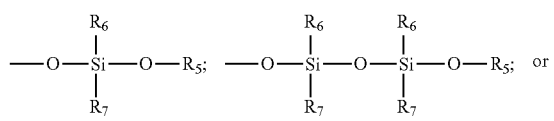

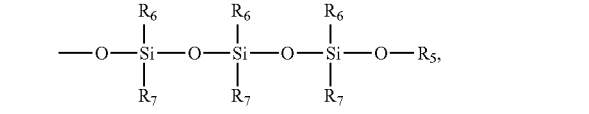

$R_5$ is hydrogen; $C_1$-$C_{25}$alkyl which may be interrupted by —O— or —S—; $C_2$-$C_{24}$alkenyl; phenyl; $C_7$-$C_9$-phenylalkyl;

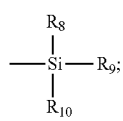

or core surface oxygen.

$R_6$ and $R_7$ are independently of each other hydrogen; $C_5$-$C_{12}$-cycloalkyl; $C_1$-$C_{25}$alkyl which may be interrupted by —O— or —S— and/or substituted by halogen, like preferably fluorine; $C_2$-$C_{24}$alkenyl; phenyl; $C_7$-$C_9$phenylalkyl; or —OR$_5$, and $R_8$, $R_9$ and $R_{10}$ are independently of each other hydrogen; $C_1$-$C_{25}$alkyl which may be interrupted by —O— or —S—; $C_2$-$C_{24}$alkenyl; phenyl; or $C_7$-$C_9$-phenylalkyl.

$C_5$-$C_{12}$-cycloalkyl may be unsubstituted or substituted by $C_1$-$C_7$alkyl and is e.g. cyclopentyl, 1-methyl-cyclopentyl, cyclohexyl, 1-methyl-cyclohexyl, 2-methyl-cyclohexyl, 3-methyl-cyclohexyl, cycloheptyl, cyclooctyl, or cyclododecyl.

$R_1$, $R_2$, $R_5$, $R_6$, $R_7$, $R_8$, $R_9$ and $R_{10}$ as $C_1$-$C_{25}$alkyl may be a branched or unbranched radical, for example methyl, ethyl, propyl, isopropyl, n-butyl, sec-butyl, isobutyl, tert-butyl, 2-ethylbutyl, n-pentyl, isopentyl, 1-methylpentyl, 1,3-dimethylbutyl, n-hexyl, 1-methylhexyl, n-heptyl, isoheptyl, 1,1,3,3-tetramethylbutyl, 1-methylheptyl, 3-methylheptyl, n-octyl, 2-ethylhexyl, 1,1,3-trimethylhexyl, 1,1,3,3-tetramethylpentyl, nonyl, decyl, undecyl, 1-methylundecyl, dodecyl, 1,1,3,3,5,5-hexamethylhexyl, tridecyl, tetradecyl, pentadecyl, hexadecyl, heptadecyl, octadecyl, icosyl or docosyl. The alkyl radicals may be uninterrupted or be interrupted by —O— or —S—. Alkyl radicals like $C_2$-$C_{25}$alkyl, especially $C_3$-$C_{25}$alkyl, which are interrupted by —O— or —S— are, for example, $CH_3$—O—$CH_2CH_2$—, $CH_3$—S—$CH_2CH_2$—, $CH_3$—O—$CH_2CH_2$—O—$CH_2CH_2$—, $CH_3$—O—$CH_2CH_2$—O—$CH_2CH_2$—, $CH_3$—(O—$CH_2CH_2$—)$_2$O—$CH_2CH_2$—, $CH_3$—(O—$CH_2CH_2$—)$_3$O—$CH_2CH_2$— or $CH_3$—(O—$CH_2CH_2$—)$_4$O—$CH_2CH_2$—.

Preferred is $C_1$-$C_{12}$alkyl, especially $C_1$-$C_8$alkyl, which alkyl radicals may be uninterrupted or be interrupted by —O—.

$R_1$, $R_2$, $R_5$, $R_6$, $R_7$, $R_8$, $R_9$ and $R_{10}$ as alkenyl having 2 to 24 carbon atoms may be a branched or unbranched radical such as, for example, vinyl, propenyl, 2-butenyl, 3-butenyl, isobutenyl, n-2,4-pentadienyl, 3-methyl-2-butenyl, n-2-octenyl, n-2-dodecenyl, iso-dodecenyl, oleyl, n-2-octadecenyl or n-4-octadecenyl. Preference is given to alkenyl having 3 to 18, especially 3 to 12, for example 3 to 6, especially 3 to 4 carbon atoms.

$R_1$, $R_2$, $R_5$, $R_6$, $R_7$, $R_8$, $R_9$ and $R_{10}$ as $C_7$-$C_9$-phenylalkyl are, for example, independently of each other benzyl, α-methylbenzyl, α,α-dimethylbenzyl or 2-phenylethyl. Preference is given to benzyl.

$R_5$ is preferably hydrogen, $C_1$-$C_4$alkyl, or the particle surface, especially the particle surface, like the $Al_2O_3$ surface, $TiO_2$ surface or the $SiO_2$ surface. A highly preferred meaning for $R_5$ is the $SiO_2$ surface.

$R_6$ and $R_7$ are preferably independently of each other —OR$_5$ or $C_1$-$C_4$alkyl, especially methyl.

$R_8$, $R_9$ and $R_{10}$ are preferably independently of each other $C_1$-$C_4$alkyl, especially methyl.

Preferably, $R_1$ and $R_2$ are —OR$_5$;

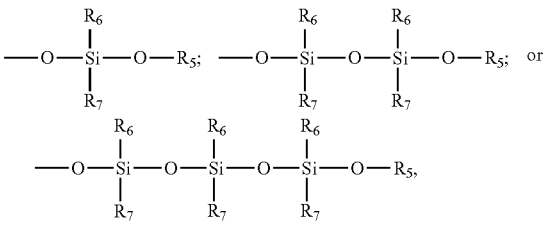

especially a radical of formula —OR$_5$, wherein for $R_5$, $R_6$ and $R_7$ the above-mentioned meanings and preferences apply.

More preferably, $R_1$ and $R_2$ are a radical of formula —OR$_5$, wherein $R_5$ is part of the core surface, like the $Al_2O_3$ surface, $TiO_2$ surface or the $SiO_2$ surface, especially the $SiO_2$ surface.

y is 1 to 8, preferably 2, 3 or 4, especially 3.

The bridge member B is any kind of chemical bridge enabling the covalent linkage of the dye D to the alkylene moiety X.

B is, for example, the direct bond, or a bridge member selected from —NR$_3$—, —O—, —S—, —NR$_3$—$C_1$-$C_{25}$alkylene-NR$_3$—, —NR$_3$—SO$_2$—, —NR$_3$—CO—, —OC(O)—, —OC(O)O—, —OC(O)NR$_3$—, and $C_1$-$C_{25}$alkylene, which alkylene may be bound and/or be interrupted by at least one of the radicals selected from the group consisting of —O—, —S—, —N(R$_3$)—, —N$^+$(R$_3$)$_2$—, —CO—, —O—CO—, —CO—O—, —N(R$_3$)—CO—, —CO—N(R$_3$)— and phenylene, wherein $R_3$ is hydrogen or unsubstituted or substituted $C_1$-$C_{12}$alkyl, e.g. $C_1$-$C_{12}$alkyl substituted by hydroxy, like 2-hydroxyethyl. The $C_1$-$C_{25}$alkylene radical may be unsubstituted or substituted, for example by a cationic or anionic group, like —N$^+$(R$_3$)$_3$, —SO$_3^-$ or —COO$^-$, or by hydroxy, preferably by hydroxy. The phenylene radical mentioned above may be unsubstituted or substituted, for example by hydroxyl, halogen, carboxy, sulfonato, amino, acetylamino or mono- or di($C_1$-$C_8$alkyl)amino.

$R_3$ as alkyl radical may be substituted by hydroxy or the cationic or anionic groups mentioned before, especially by a cationic ammonium group or an anionic carboxy, sulfat or sulfonato group. If more than one $R_3$ group is present in the bridge member B the $R_3$ groups can be the same or different from each other.

Preferably, $R_3$ is hydrogen or $C_1$-$C_{12}$alkyl, especially hydrogen or $C_1$-$C_4$alkyl. A highly preferred meaning for $R_3$ is hydrogen.

Preferably, B is the direct bond or a bridge member of formula -$A_1$-$C_1$-$C_{25}$alkylene-$A_2$-, -$A_1$-$C_1$-$C_{25}$alkylene-phenylene-$A_2$- or -$A_1$-phenylene-$C_1$-$C_{25}$alkylene-$A_2$-, wherein the $C_1$-$C_{25}$alkylene can be uninterrupted or be interrupted as given above and $A_1$ and $A_2$ are the direct bond or radicals as given above. Preferred meanings for $A_1$ and $A_2$ are the direct bond, —O—, —S—, —N(R$_3$)—, —CO—, —O—CO—, —CO—O, N(R$_3$)—CO—, —CO—N(R$_3$)—, especially —N(R$_3$)—, —O— or —S—, wherein $R_3$ is as defined above. Highly preferred meanings for $A_1$ and $A_2$ are the direct bond or —N(R$_3$)—, especially the direct bond or —NH—. As to the $C_1$-$C_{25}$alkylene it is preferred that it is uninterrupted or interrupted by at least one of the radicals selected from the group consisting of —O—, —N(R$_3$)—, —N$^+$(R$_3$)$_2$—, —CO—, —CO—O—, —CO—N(R$_3$)— and phenylene, especially —O—, —NH—, —CO—O—, —CO—NH— and phenylene, and more preferably by —CO—O—, —CO—NH— and phenylene. $C_1$-$C_{25}$alkylene and phenylene may be substituted as given above, or preferably be unsubstituted. In general, for $C_1$-$C_{25}$alkylene radicals $C_2$-$C_{25}$alkylene, especially $C_1$-$C_{16}$-alkylene or $C_2$-$C_{16}$alkylene, more especially $C_1$-$C_7$alkylene or $C_2$-$C_7$alkylene is preferred.

More preferably, B is the direct bond or a bridge member of formula -$A_1$-$C_1$-$C_{25}$alkylene-$A_2$-, -$A_1$-$C_1$-$C_{25}$alkylene-phenylene-$A_2$- or -$A_1$-phenylene-$C_1$-$C_{25}$alkylene-$A_2$-, wherein $A_1$ and $A_2$ are the direct bond, —O—, —S—, —N($R_3$)—, —CO—, —O—CO—, —CO—O—, —N($R_3$)—CO— or —CO—N($R_3$)—,
the $C_1$-$C_{25}$alkylene radical is uninterrupted or interrupted by at least one of the radicals selected from the group consisting of —O—, —S—, —N($R_3$)—, —N$^+$($R_3$)$_2$—, —CO—, —O—CO—, —CO—O—, —N($R_3$)—CO—, —CO—N($R_3$)— and phenylene, and
wherein $R_3$ is as defined above.

Important meanings for B are the direct bond or a bridge member of formula -$A_1C_1$-$C_{25}$alkylene-$A_2$-, -$A_1$-$C_1$-$C_{25}$alkylene-phenylene-$A_2$- or -$A_1$-phenylene-$C_1$-$C_{25}$alkylene-$A_2$-, wherein
$A_1$ and $A_2$ are the direct bond —N($R_3$)—, —O— or —S—, wherein $R_3$ is as defined above, and the $C_1$-$C_{25}$alkylene radical is uninterrupted or interrupted by at least one of the radicals selected from the group consisting of —O—, —S—, —NH—, —CO—, —O—CO—, —CO—O—, —NH—CO—, —CO—NH— and phenylene.

Very important meanings for B are the direct bond or a bridge member of formula —NH—$C_1$-$C_{25}$alkylene-$A_2$- or —NH—$C_1$-$C_{25}$alkylene-phenylene-$A_2$-, wherein
$A_2$ is the direct bond or —NH—, and
the $C_1$-$C_{25}$alkylene radical is uninterrupted or interrupted by at least one of the radicals selected from the group consisting of —CO—O—, —CO—NH— and phenylene.

$C_1$-$C_{25}$alkylene and phenylene may be substituted as given above, or preferably be unsubstituted.

The most important meanings for B are the direct bond, or a bridge member selected from —$NR_3$—, —O—, —S—, —$NR_3$—$C_1$-$C_{25}$alkylene-$NR_3$—, —$NR_3$—$SO_2$—, —$NR_3$—CO— —OC(O)— and —OC(O)$NR_3$—.

Depending on the kind of bridge member used it is also possible to covalently link more than one dye D to the bridge member B as shown in formula Ia, wherein z is 1 to 4 and the other symbols are as defined above and below.

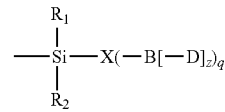

(Ia)

For example, if B represents —$NR_3$— and $R_3$ represents 2-hydroxy-ethyl it is possible to link another dye molecule via the hydroxy group.

D is the radical of a dye which contains preferably anionic and/or cationic groups, like borates, sulfates, phosphonates, phosphates, —CSS—, CSO— and especially quaternary ammonium or phosphonium, $SO_3^-$ or $COO^-$, which contribute to the overall charge of the particle. A dye contains a chromophore absorbing electromagnetic radiation having a wave length from 200 to 1500 nm, especially 400-800 nm.

D is preferably the radical of an acridine, anthraquinone, azomethine, monoazo, disazo, polyazo, benzodifuranone, coumarin, diketopyrrolopyrrol, dioxazine, diphenylmethane, formazan, indigoid, methine, polymethine, naphthalimide, naphthoquinone, nitroaryl, oxazine, perinone, perylene, phenazine, phthalocyanine, pyrenequinone, quinacridone, quinoneimine, quinophtalone, stilbene, styryl, thiazine, thioxanthene, triarylmethane, xanthene or metal complex dye, and more preferably the radical of a monoazo, disazo, polyazo, anthraquinone, phthalocyanine, formazan, dioxazine or metal complex dye, and like those described in WO 2007/048721 A1 which is incorporated herein by reference.

Most preferably, D is the radical of an anthraquinone, azomethine, monoazo, disazo, polyazo, benzodifuranone, dioxazine, formazan, phthalocyanine, triarylmethane, azo metal complex, polymethine, xanthene, phenazine, diazastyryl or anthrapyridone dye, e.g. as exemplified herein below.

The formulae of examples for selected reactive dyes which can be used within the context of the present invention are depicted below. Conventionally, the formulae of dyes are drawn in the form of their free acid and/or base, irrespective of the fact that the dyes are normally used in their salt form. Reactive dyes contain reactive groups which can be used to link these dyes to the particles described in this invention in a manner known by the person skilled in the art, e.g. by an addition or substitution reaction.

Examples for reactive green dyes are the following:

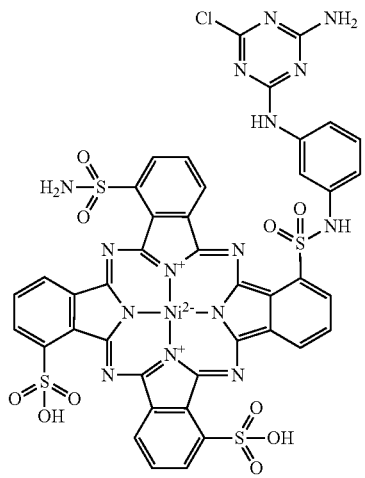

(42)

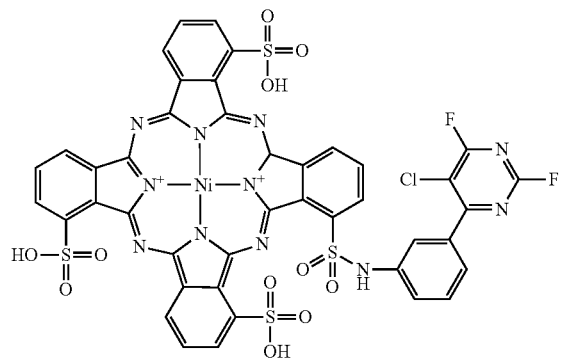

(43)

(44)
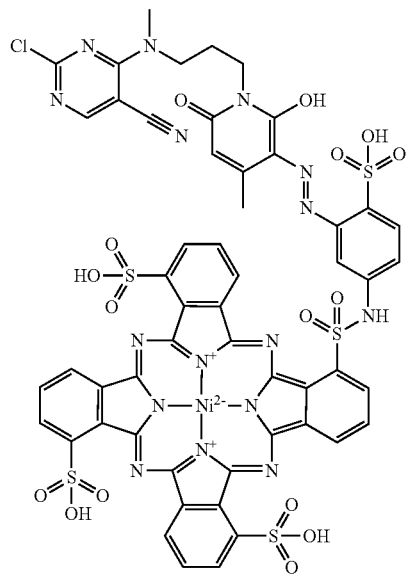
(45)
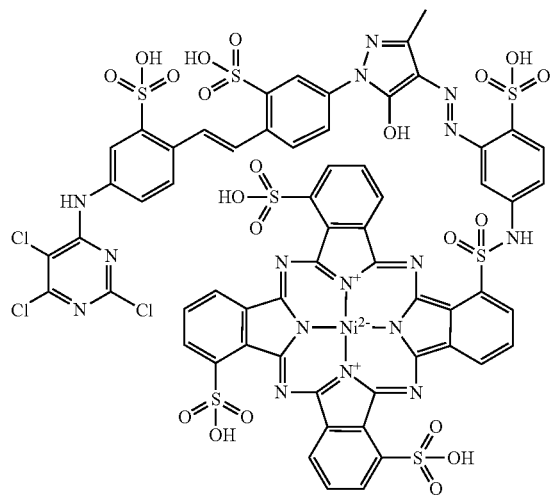
(46)
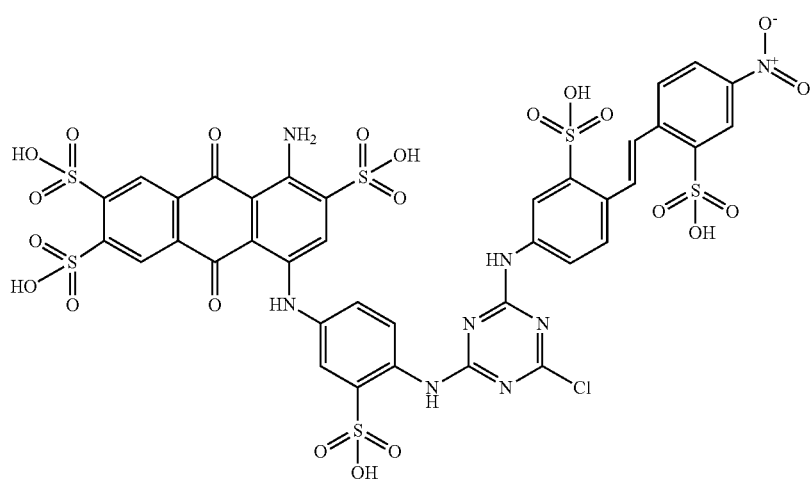
Examples for reactive blue dyes which can be used within the context of the present invention are the blue dye of formula (24) depicted in the form of its sodium salt in Example 5, Step 5.1 and the following:

(47)
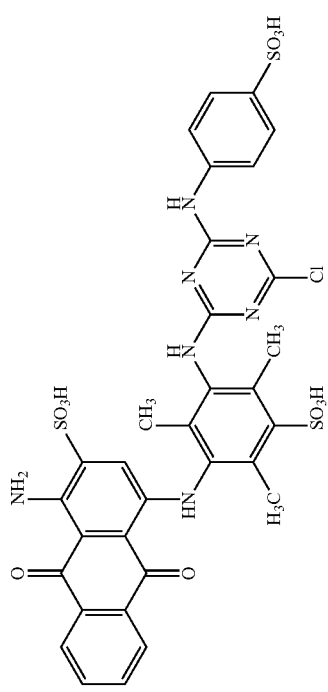
(48)
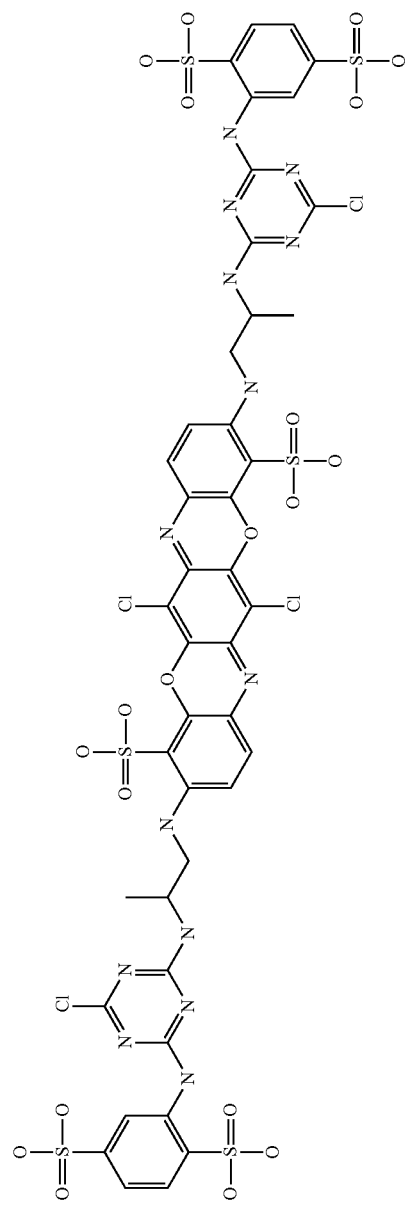

-continued
(49)
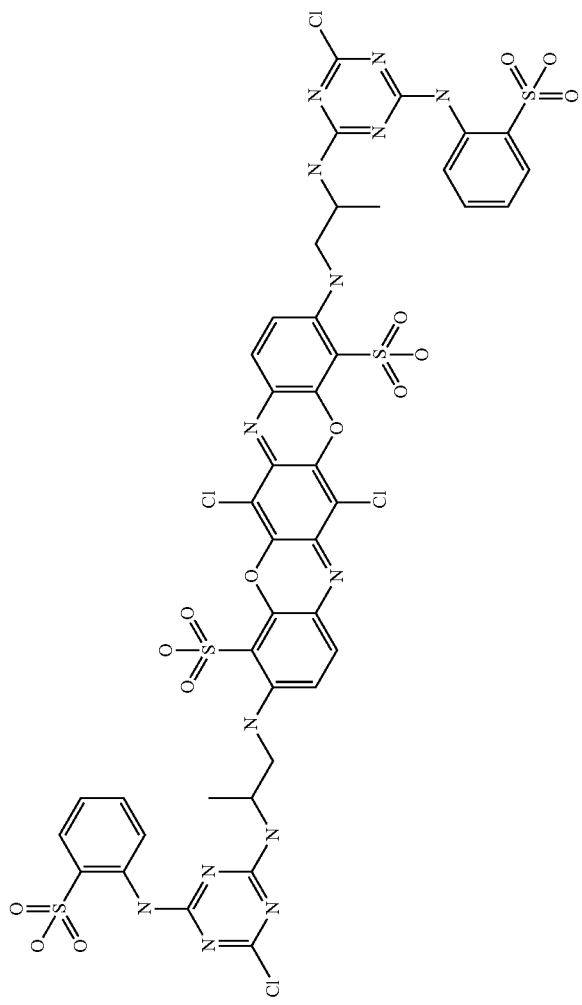
(50) (51)
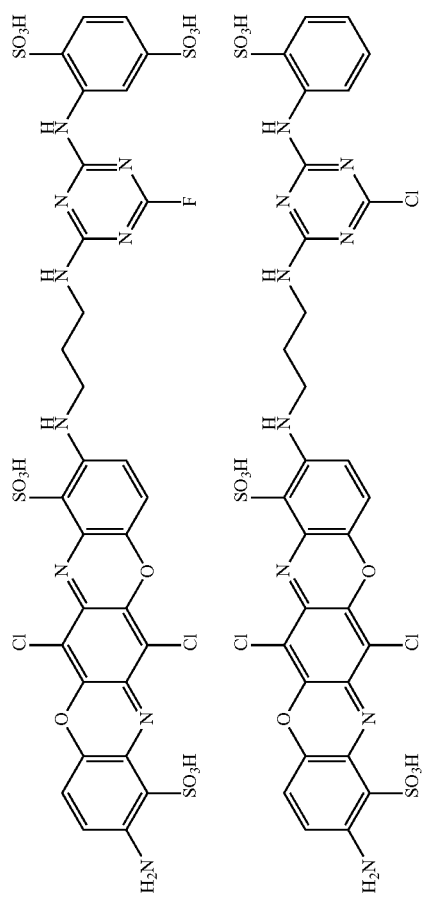

-continued
(52)
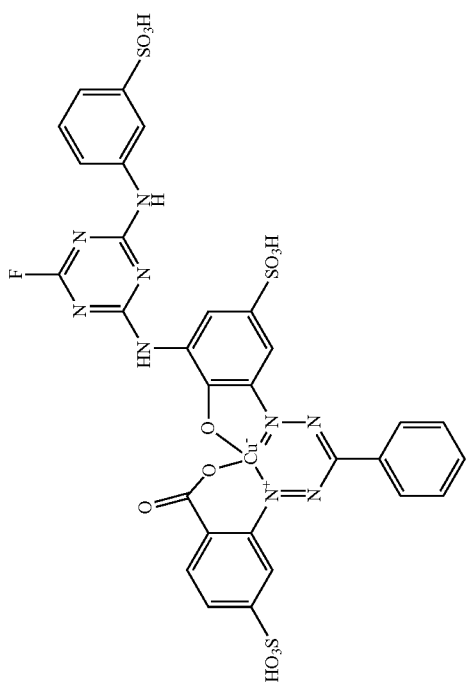
(53)
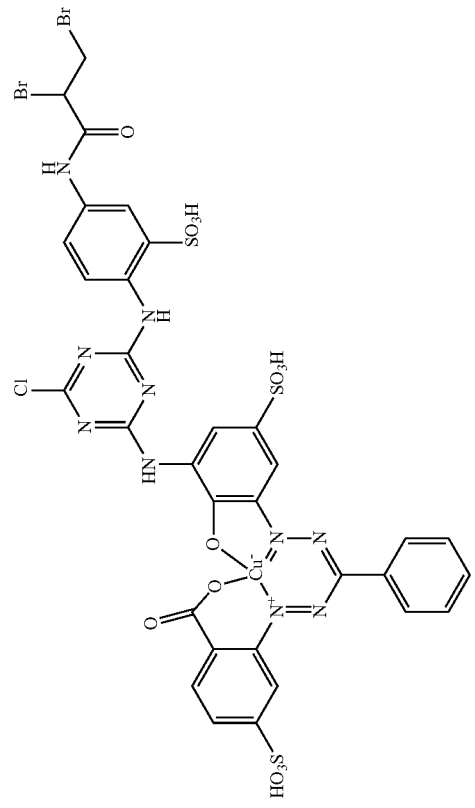

-continued
(54)
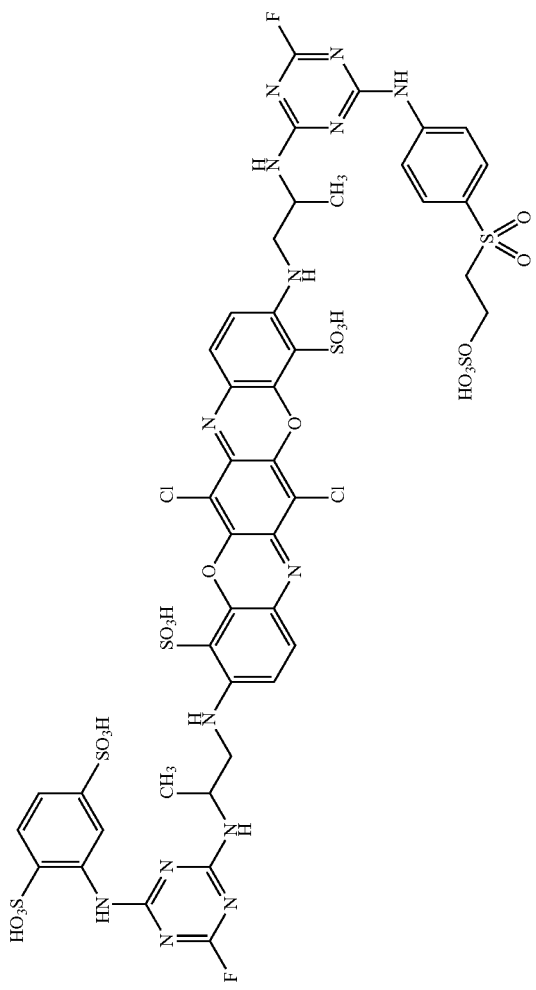
(55)
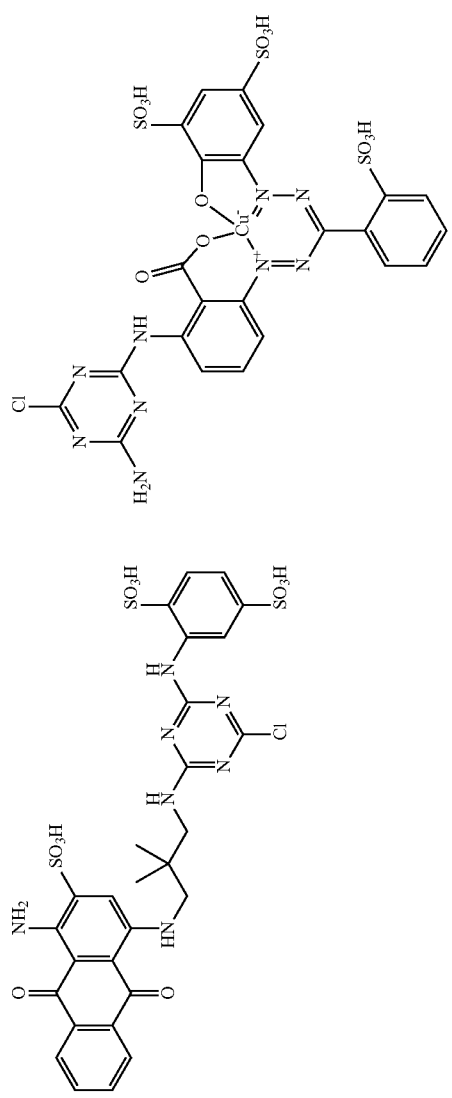
(56)
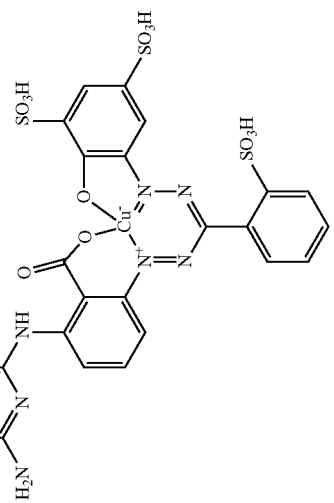

-continued
(57)
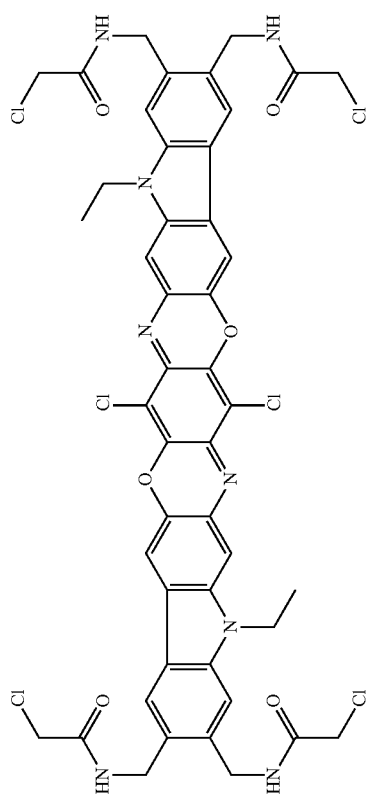
(58)
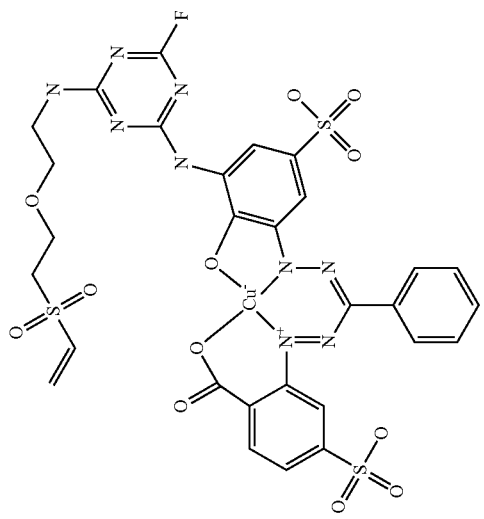
(59)
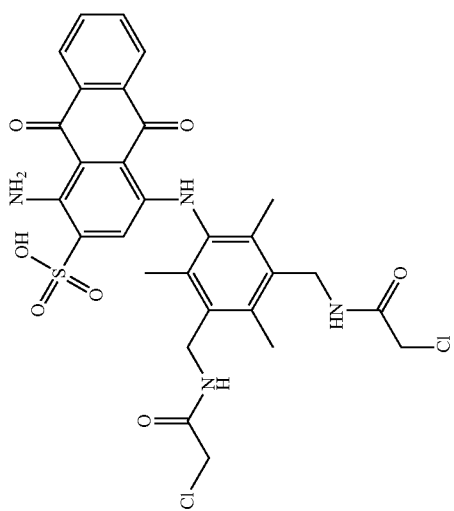

-continued
(60)
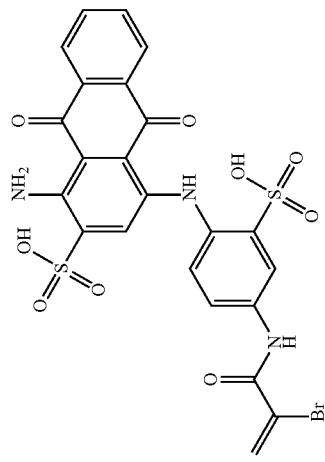
(61)
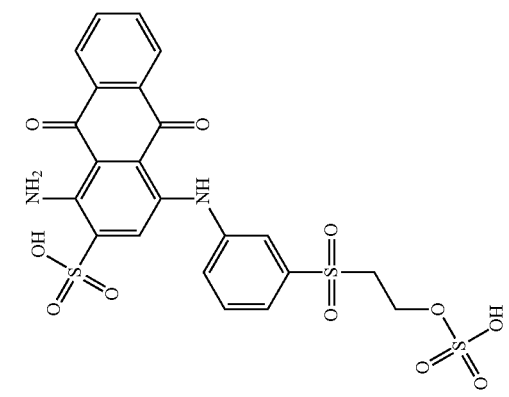
(63)
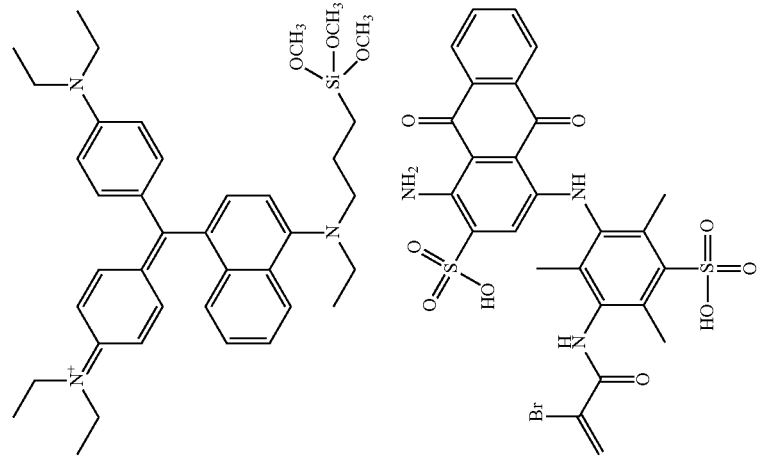
(62)

-continued
(64)
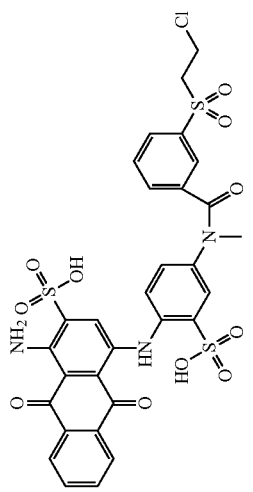
(65)
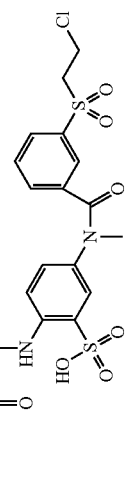
(66)
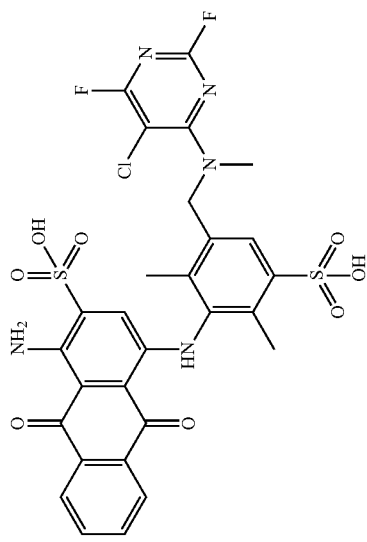

-continued
(67)
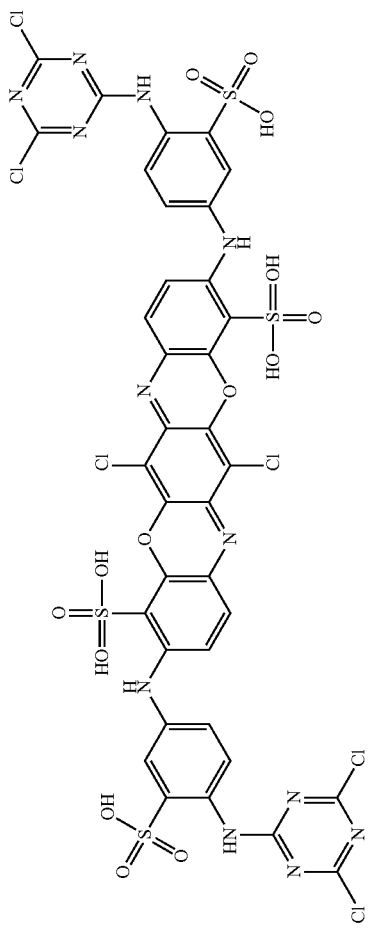
(68)
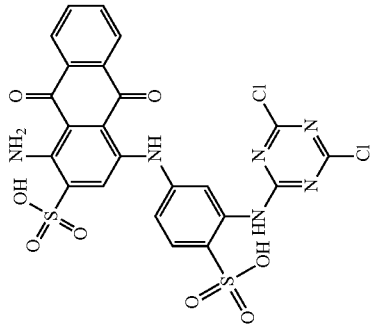
(69)
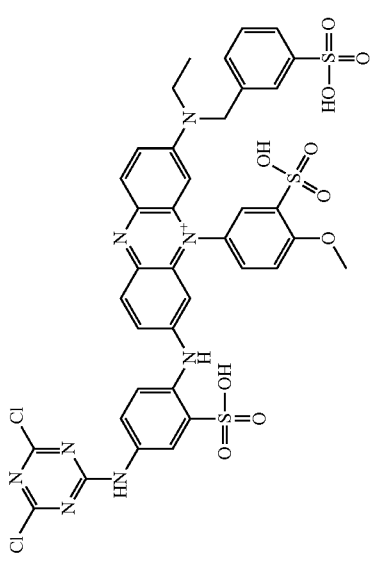

-continued
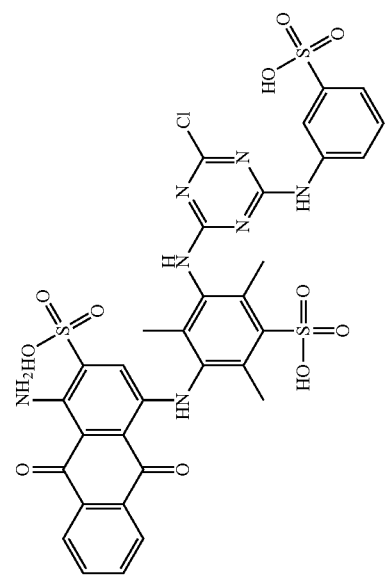
(70)
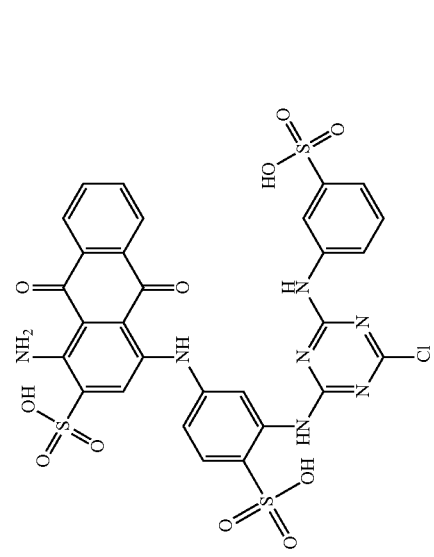
(71)
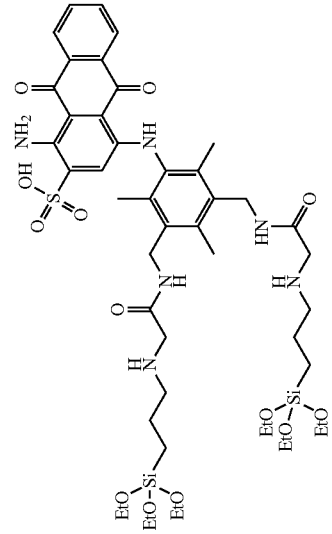
(72)
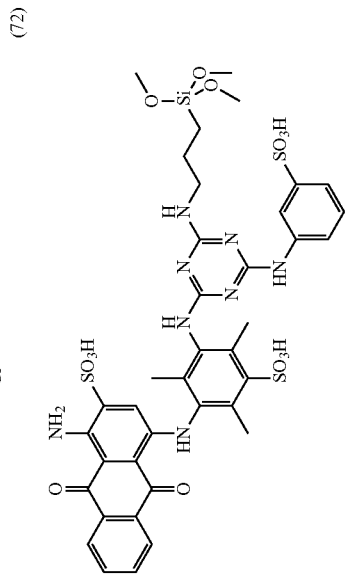
(73)

-continued
(74)
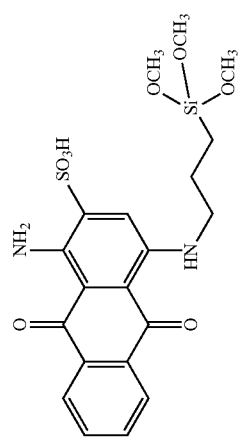
(75)
(76)
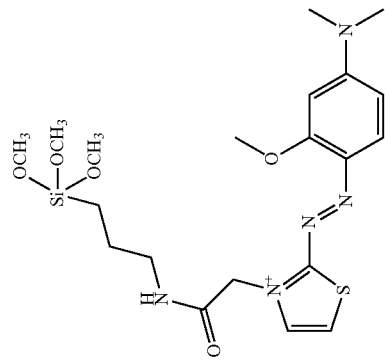
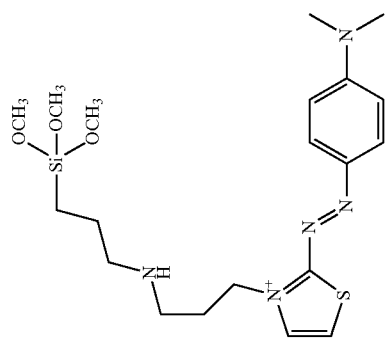

Examples for reactive black dyes and mixtures of such dyes which can be used within the context of the present invention are the following:
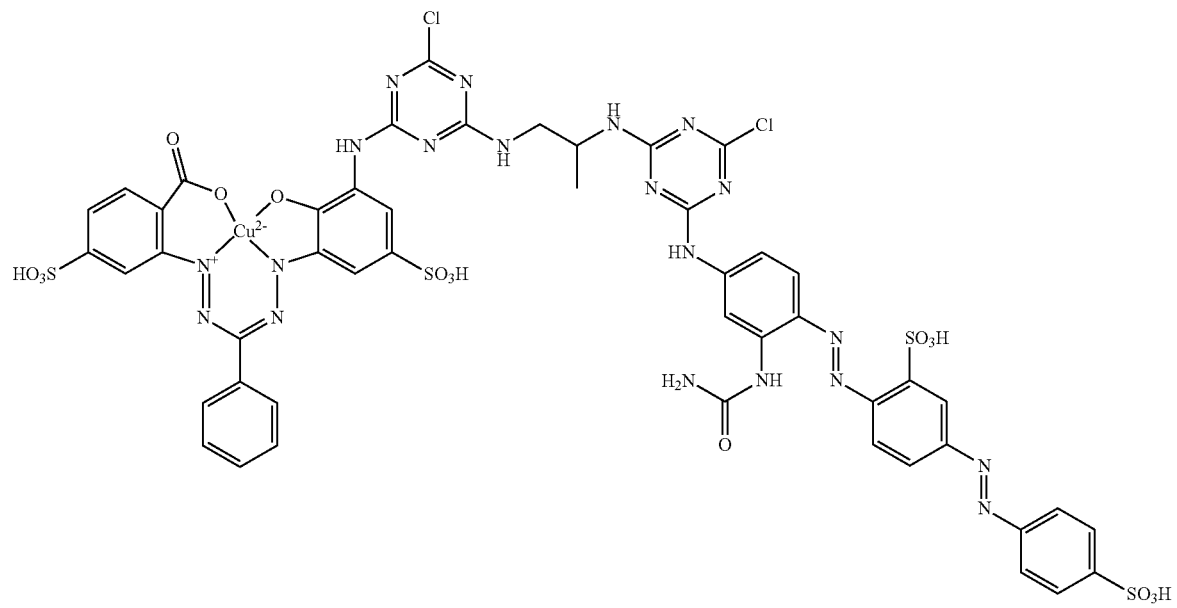
(77)
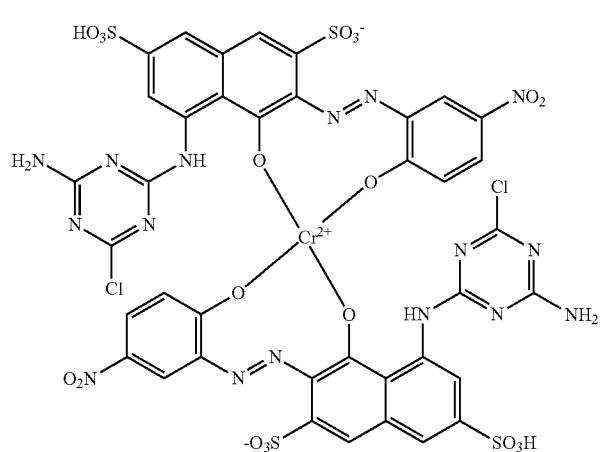
(78)

-continued
(79)
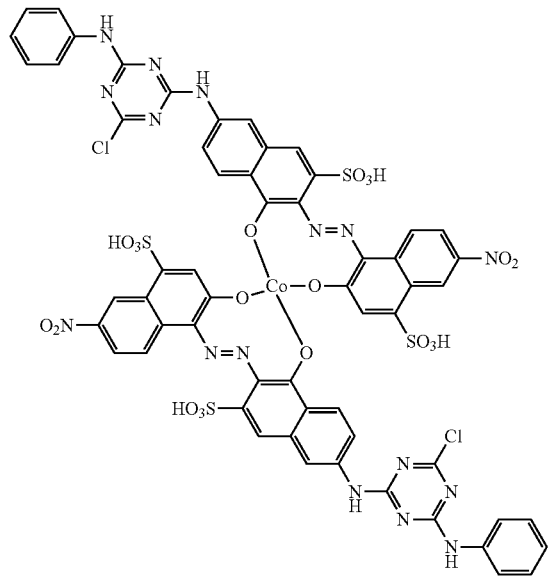
(80)
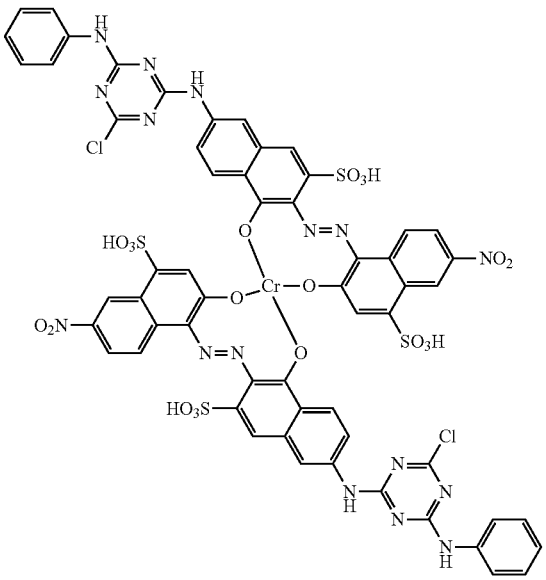
(81)
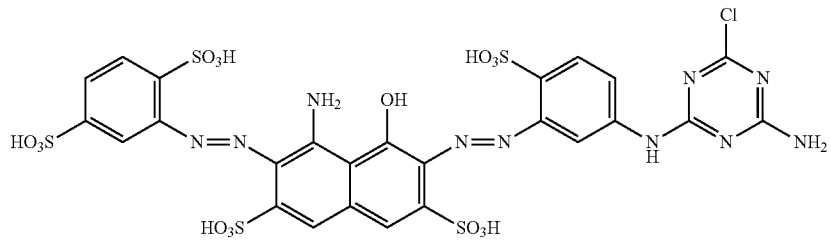
(82)
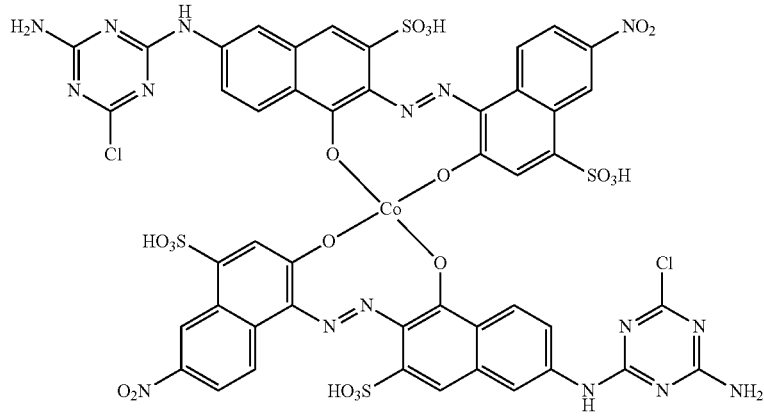
(83)
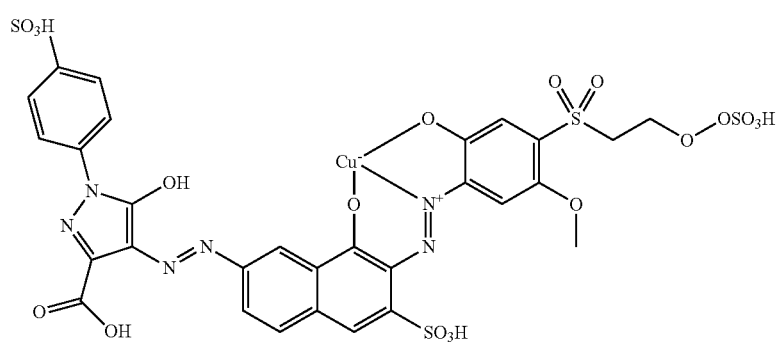

(84)
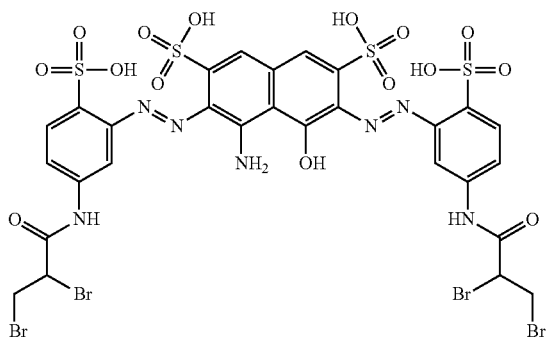
(85)
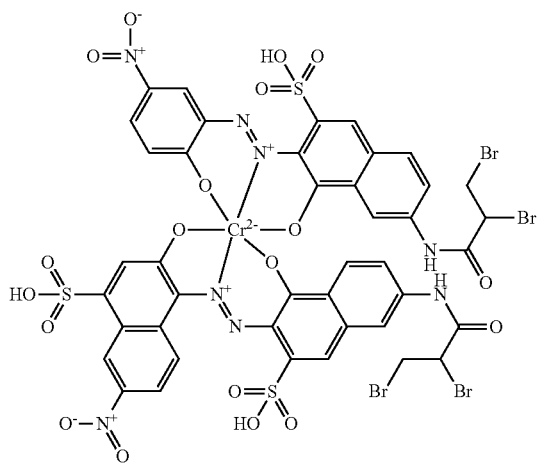
Mixture comprising
52 parts
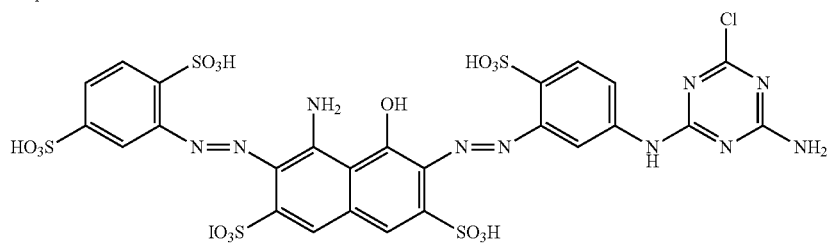
(86)
12 parts
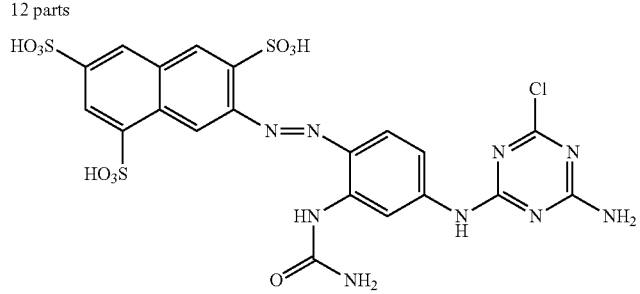
22 parts
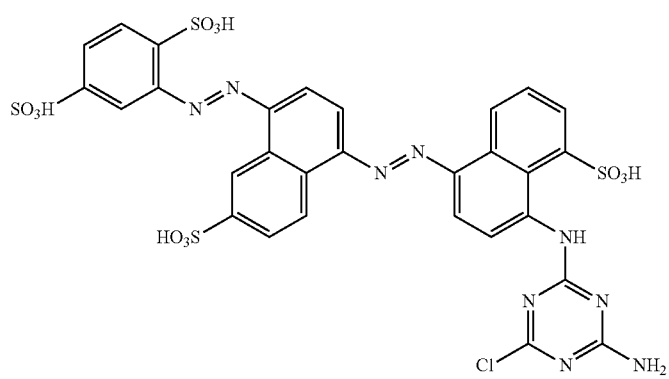

Mixture comprising
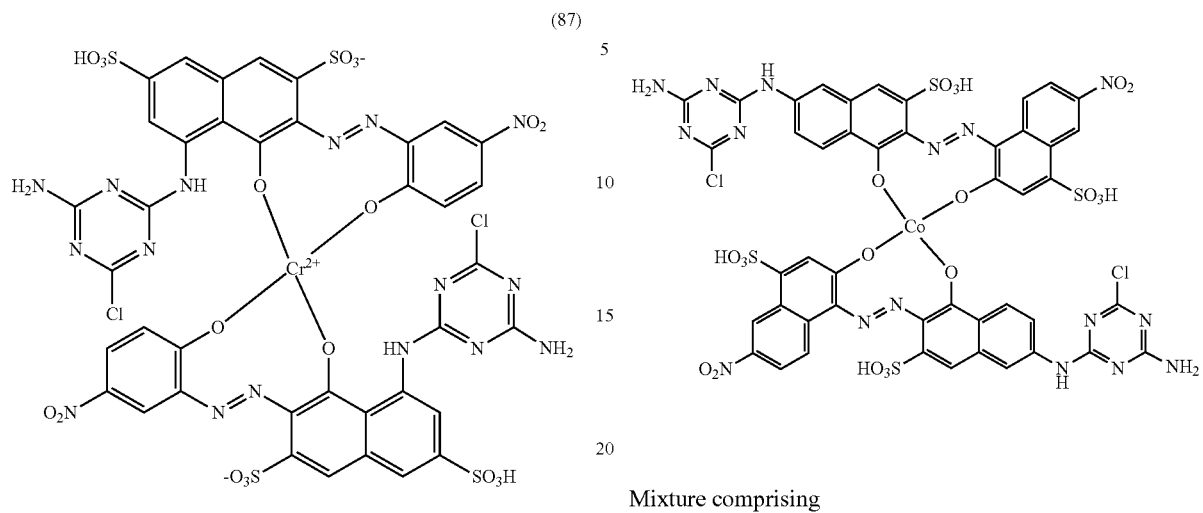
(87)
Mixture comprising
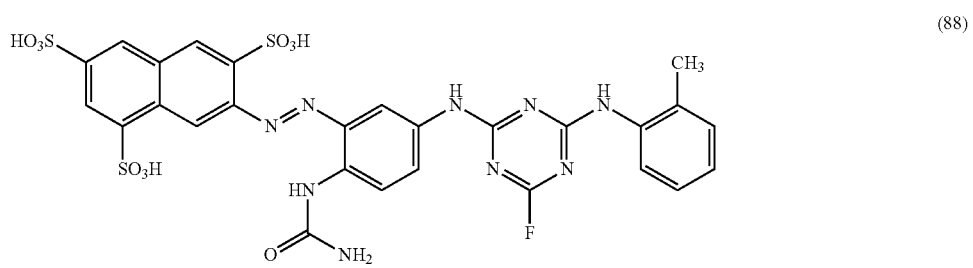
(88)
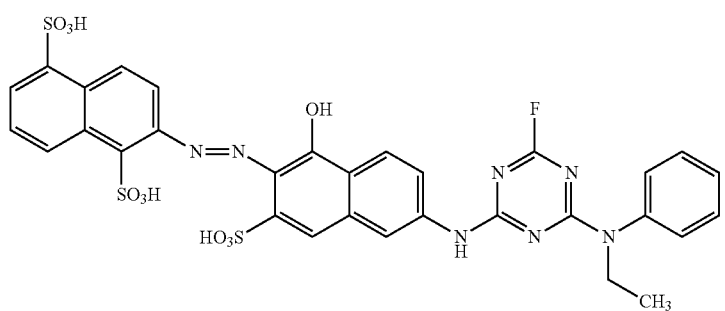
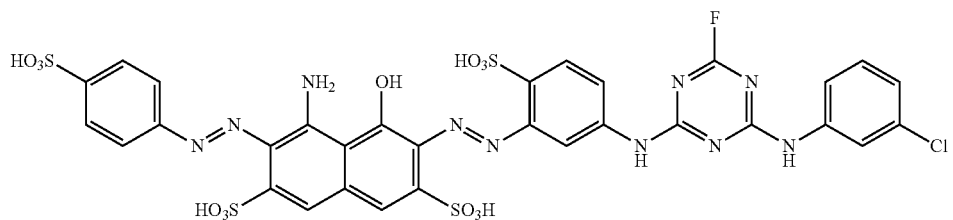

Mixture comprising
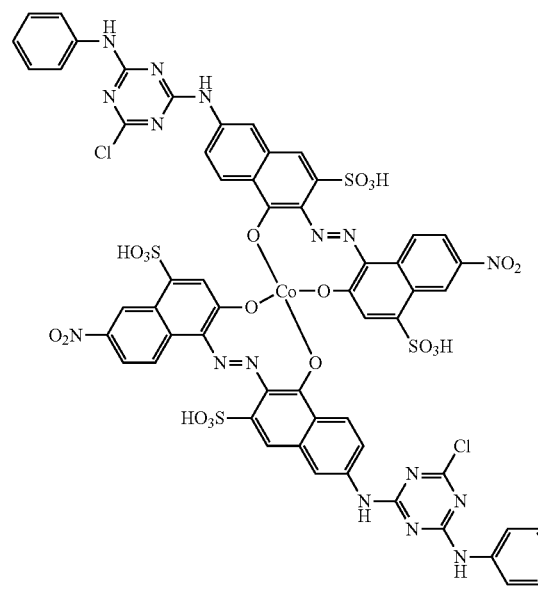
34 Teile
(89)
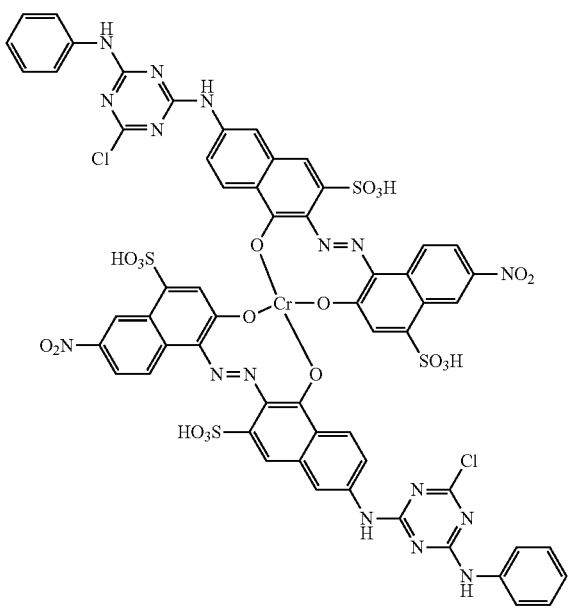
66 Teile
Mixture comprising
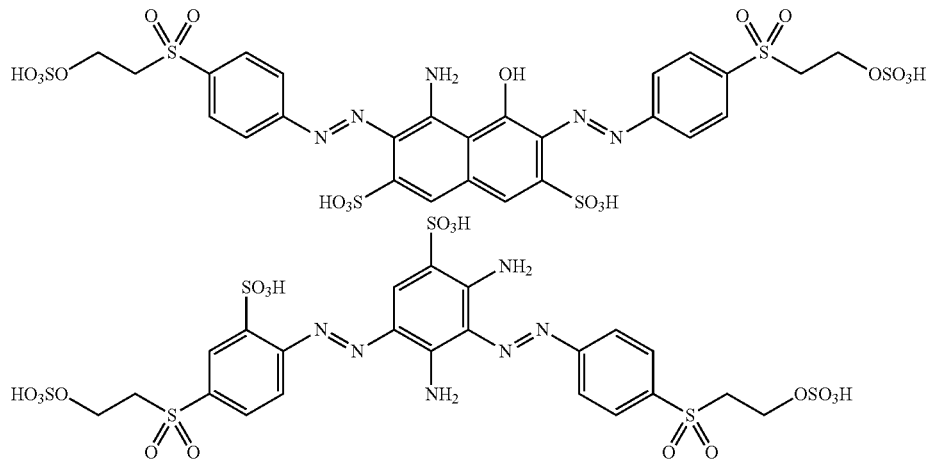
(209)
90 parts
Mixture comprising
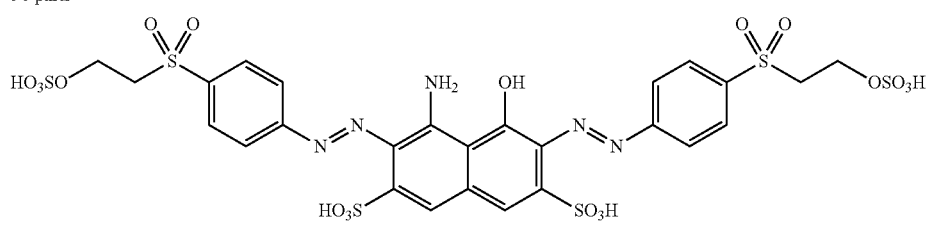
(90)

10 parts
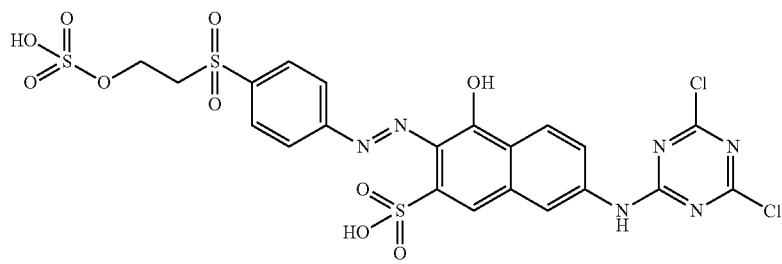
Mixture comprising
62 parts of
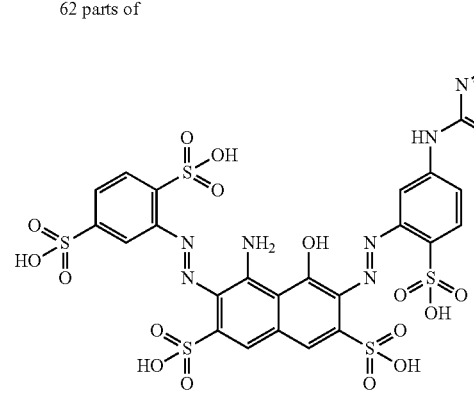
(90a)
15 parts of
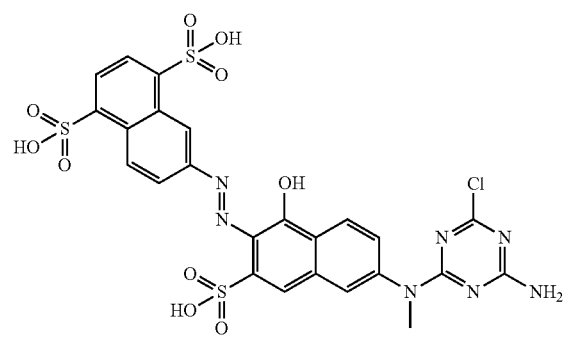
14 parts of
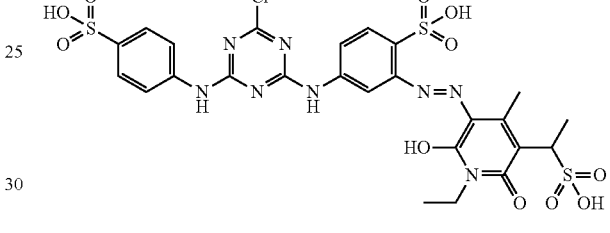
9 parts of
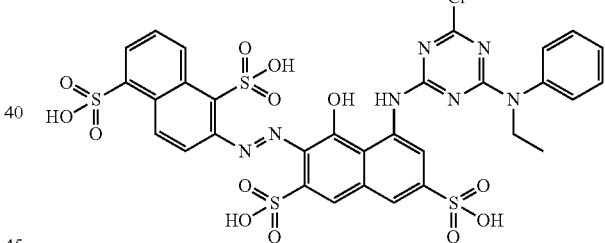
Examples for reactive red or magenta dyes which can be used within the context of the present invention are the magenta dyes of formulae (4) and (32) depicted in Example 1, Step 1.2, and Example 6, Step 6.4, respectively, and the following:
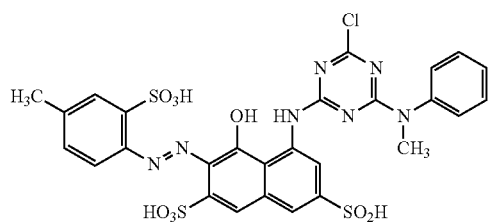
(91)
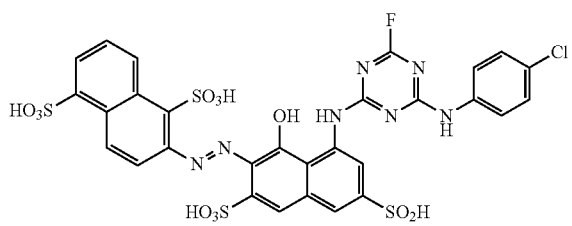
(92)

-continued
(93)
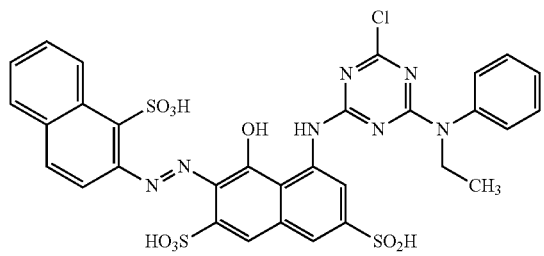
(94)
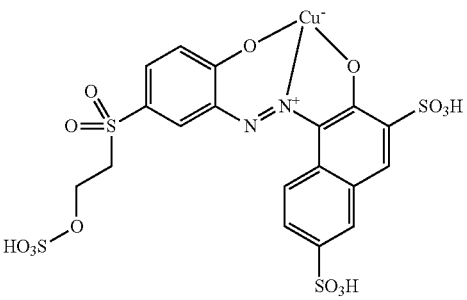
(95)
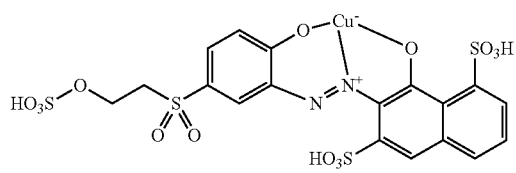
(96)
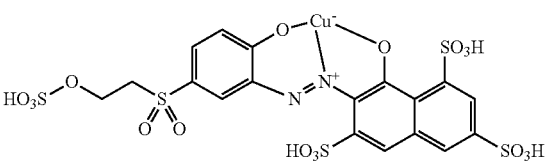
(97)
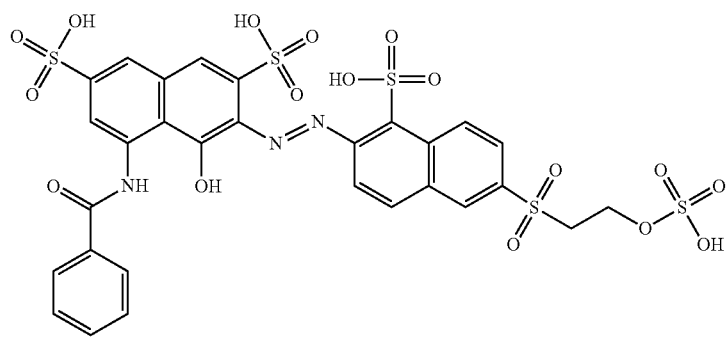
(98)
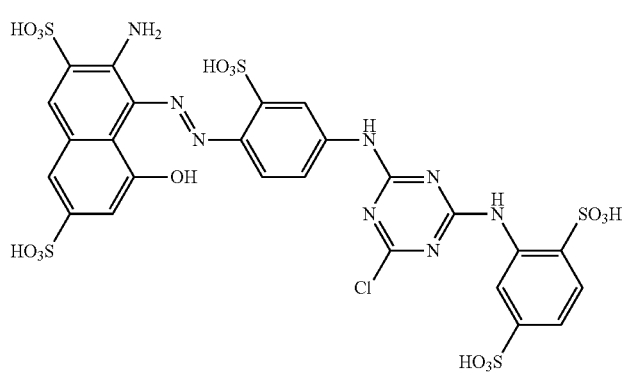
(99)
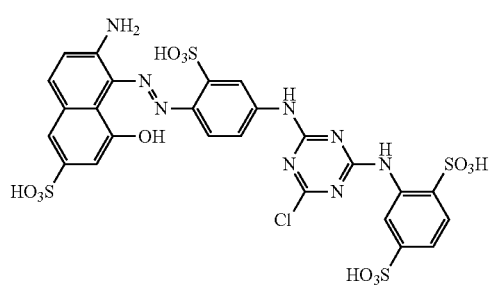
(100)
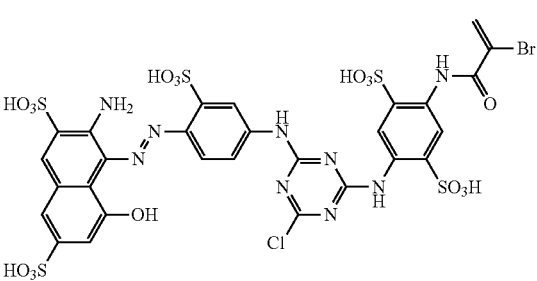

-continued
(102)
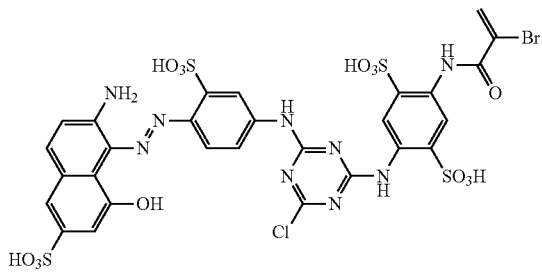
(101)
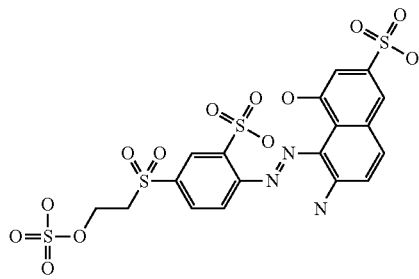
(104)
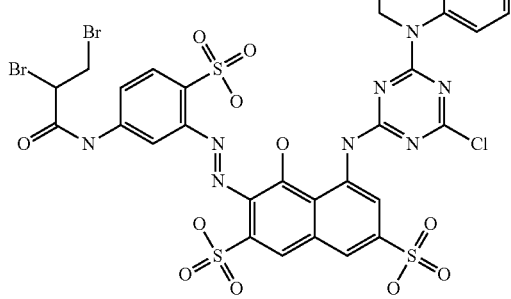
(103)
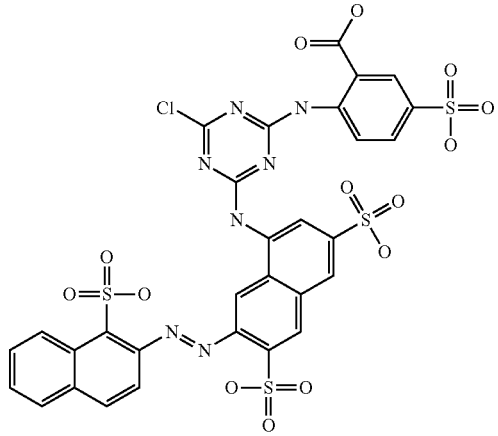
(105)
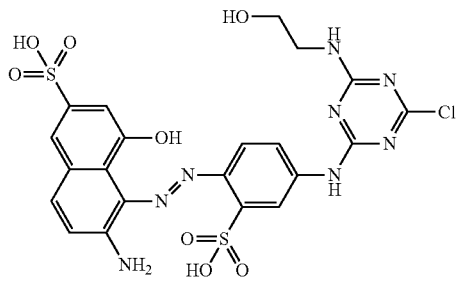
(106)
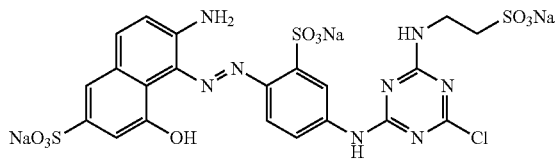
(107)
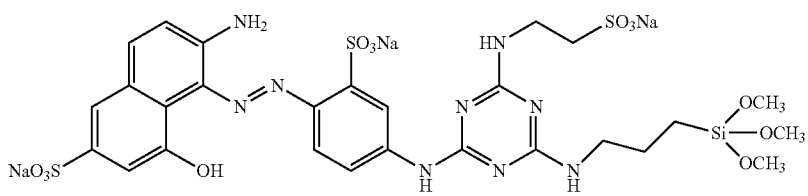
(108)
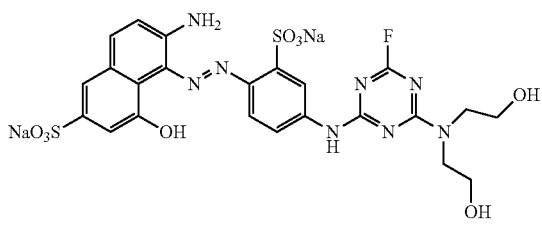
(109)
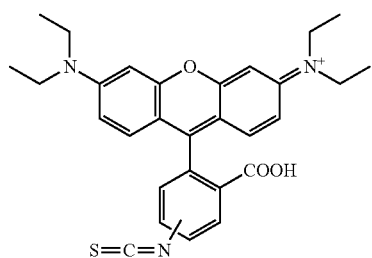

(110) 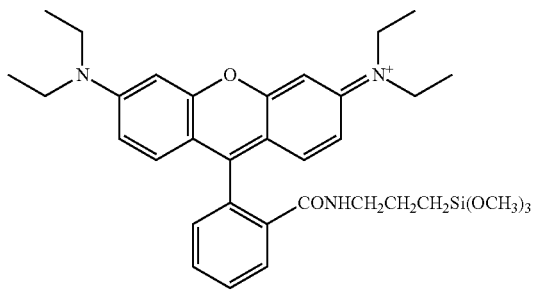
(111) 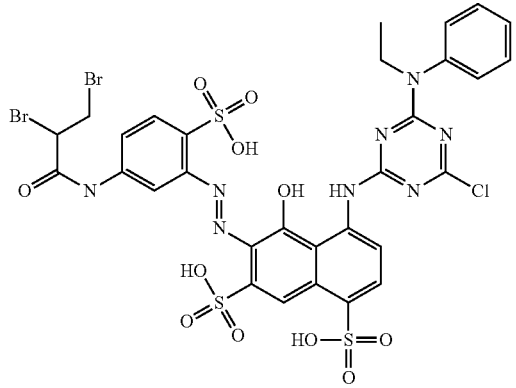
(112) 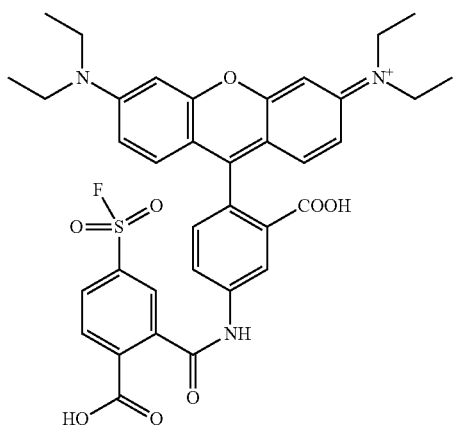
(113) 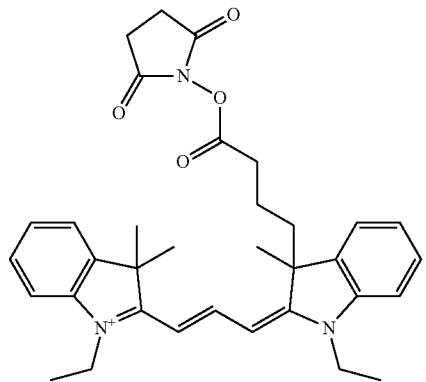
(114) 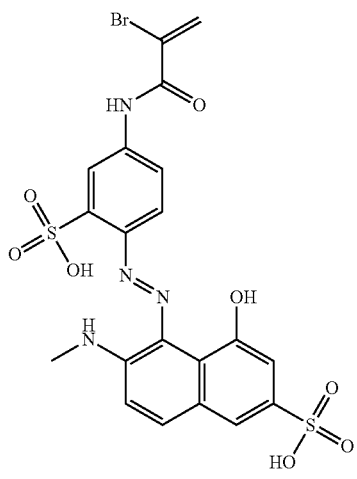
(115) 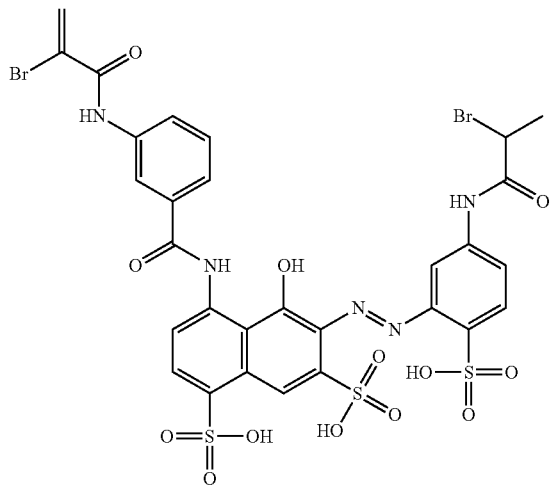

-continued
(116)
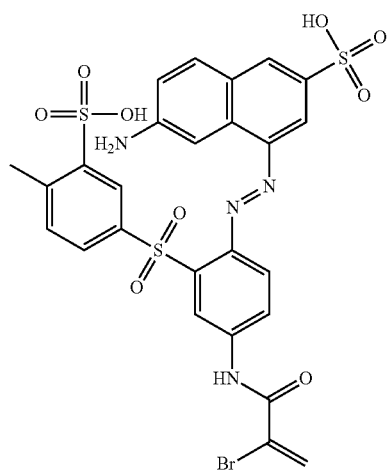
(117)
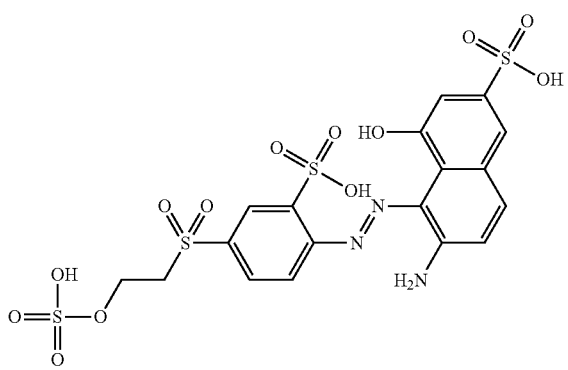
(118)
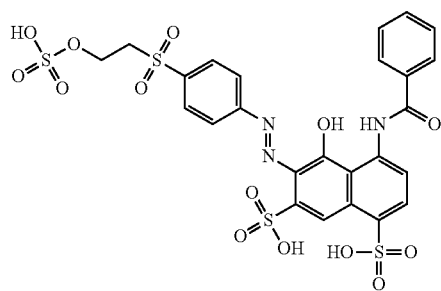
(119)
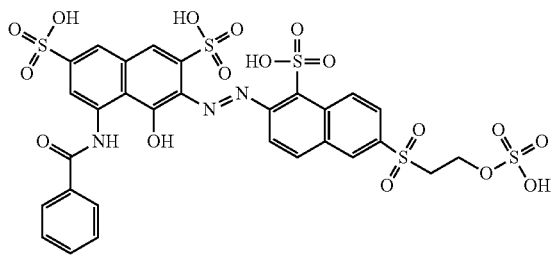
(120)
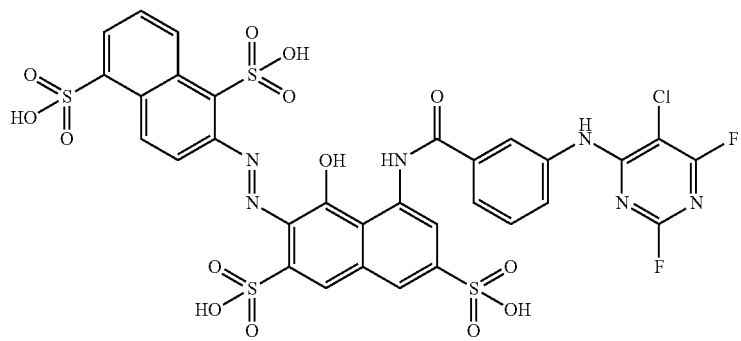
(121)
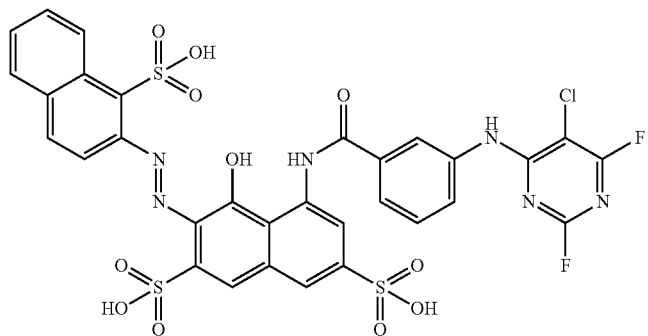

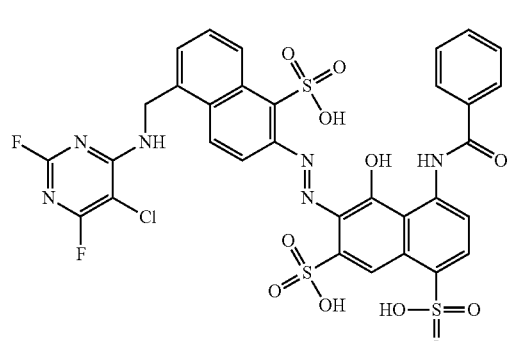
(122)
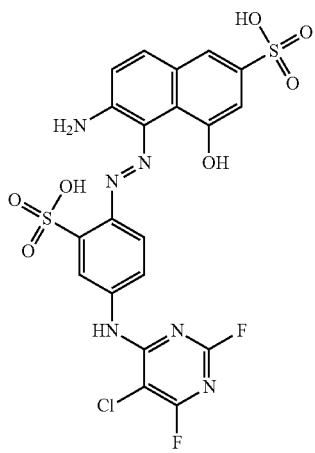
(123)
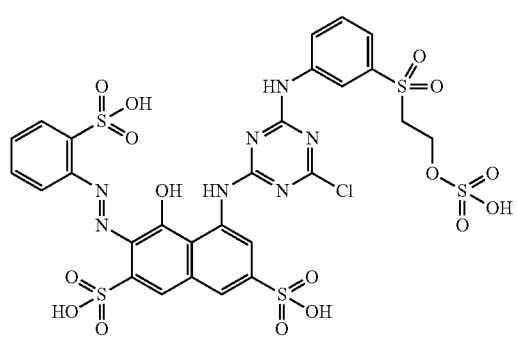
(124)
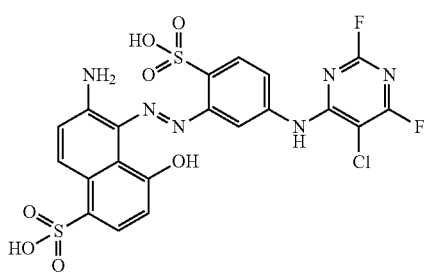
(125)
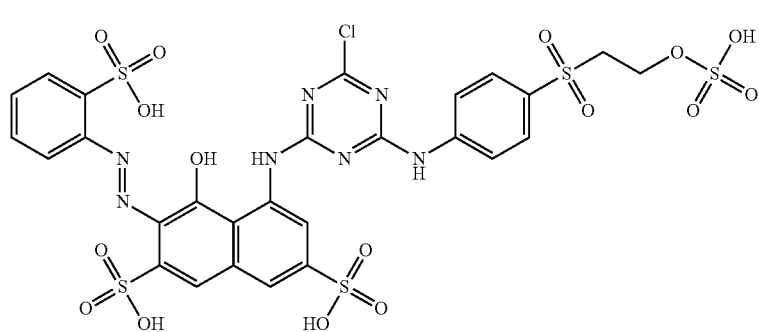
(126)
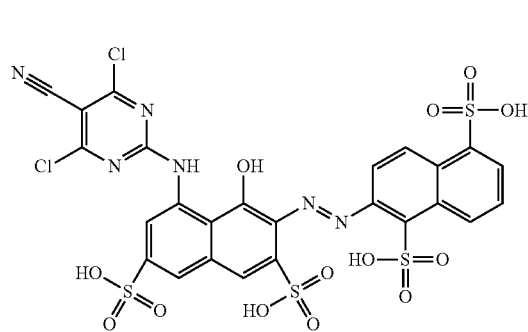
(127)
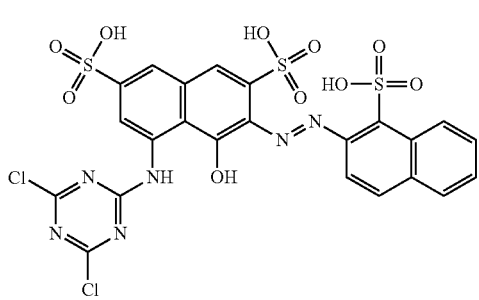
(128)

(129) 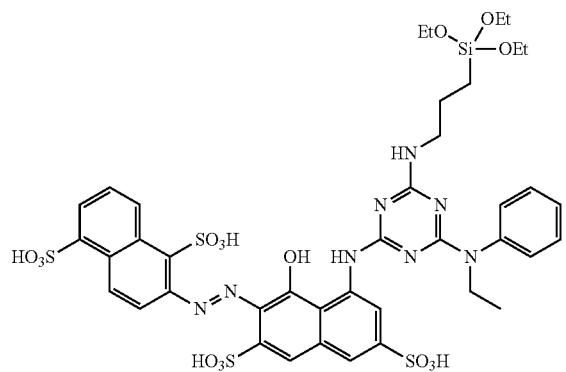
(130) 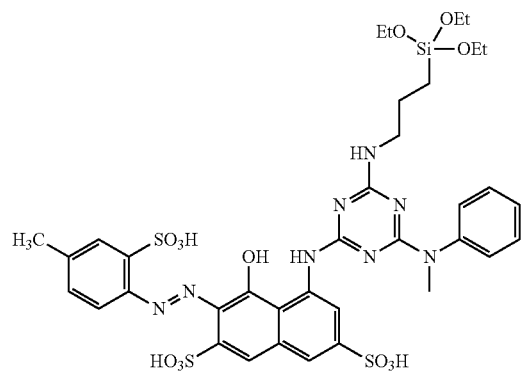
(131) 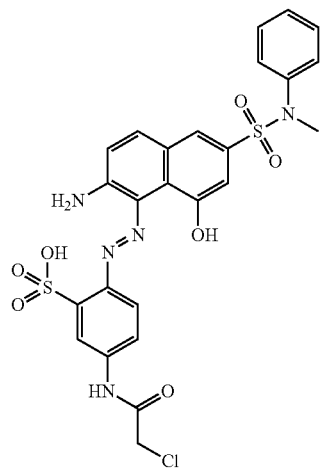
(132) 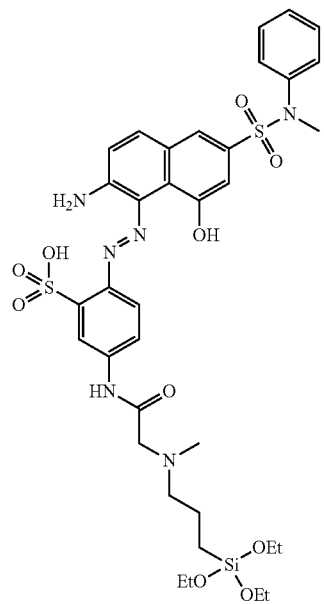
(133) 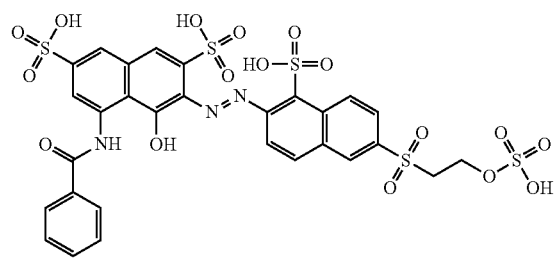
(134) 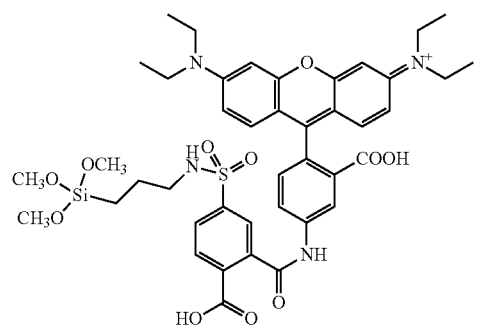

-continued
(135)
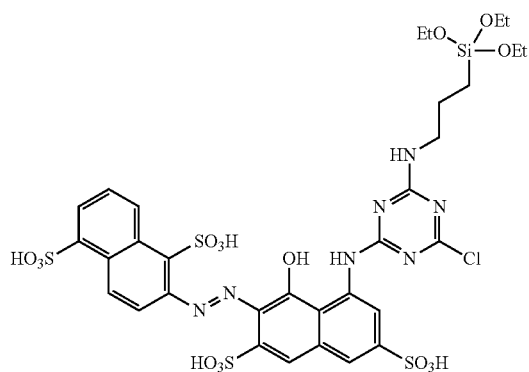
(136)
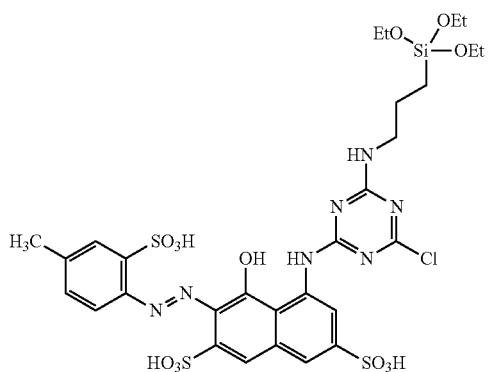
(137)
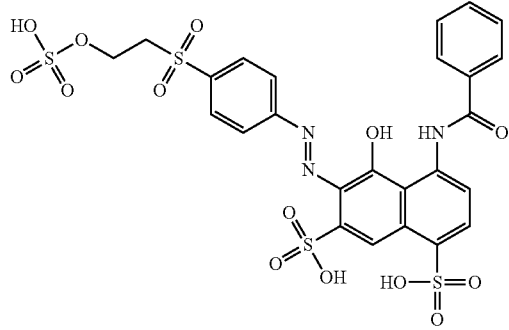
(138)
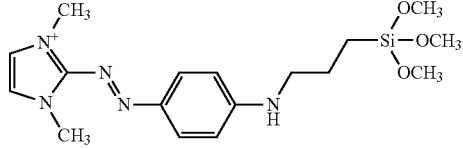
(139)
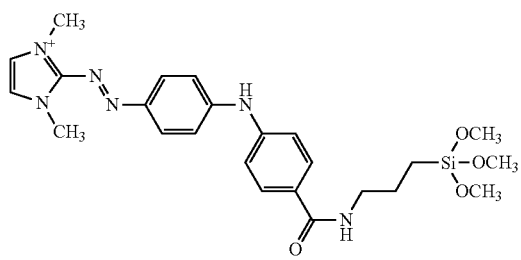
(210)
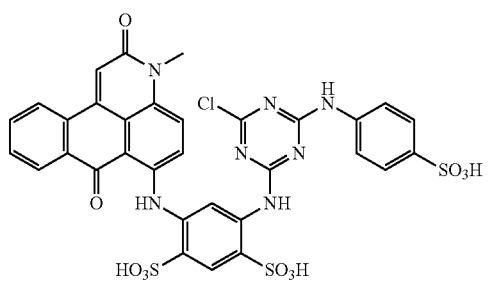
(211)
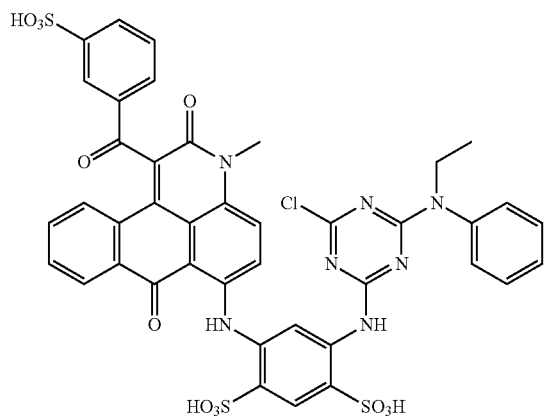
(212)
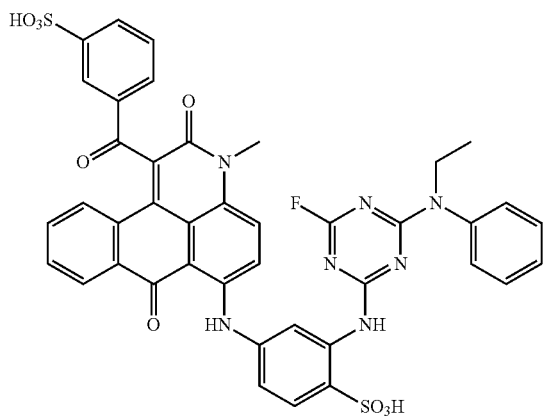

(213)
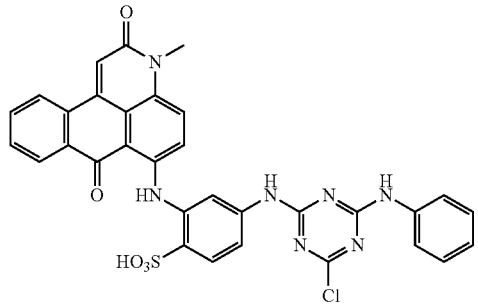
(214)
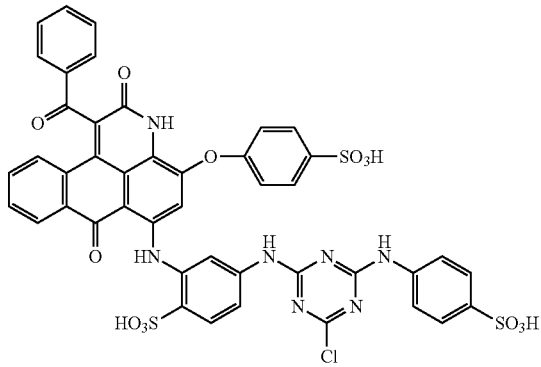
(215)
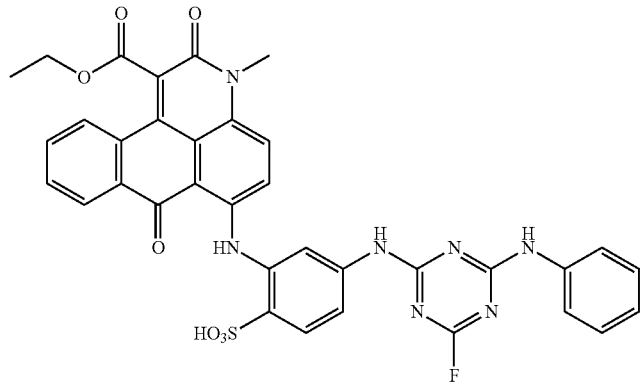
Examples for reactive yellow dyes which can be used within the context of the present invention are the compound of formula (12) described in Example 2, Step 2.1, and the following
(140)
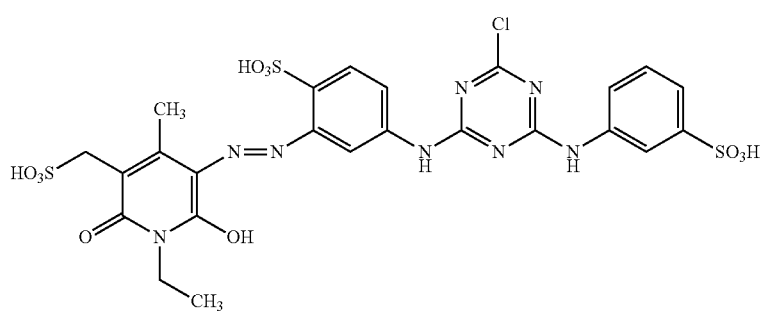
(141)
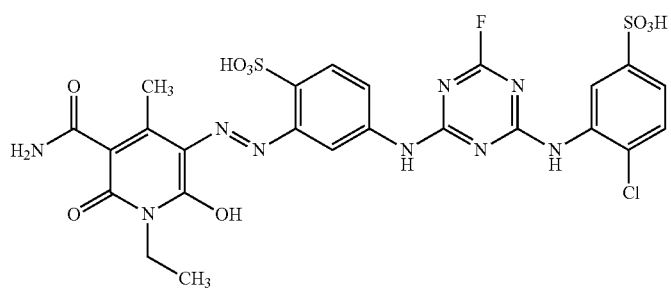

-continued
(142)
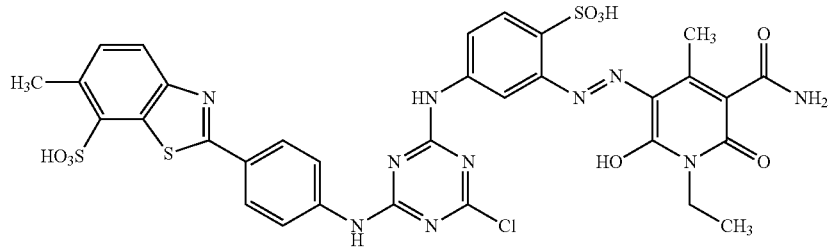
(143)
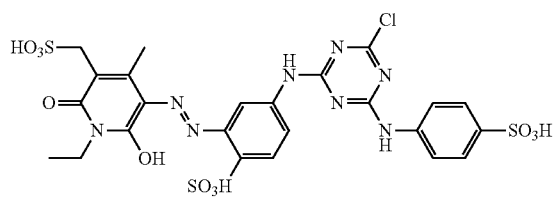
(144)
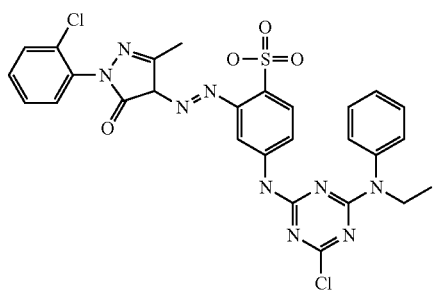
(145)
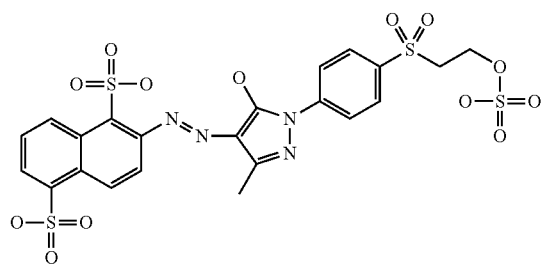
(146)
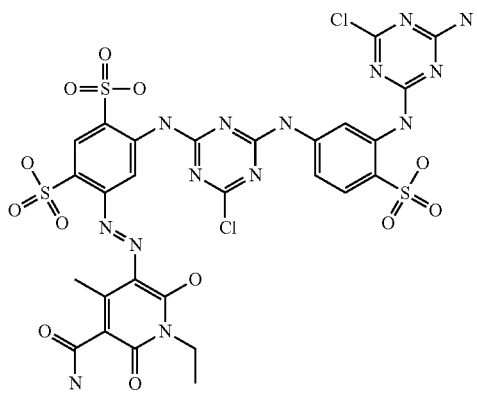
(147)
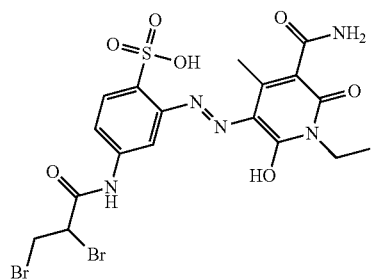
(148)
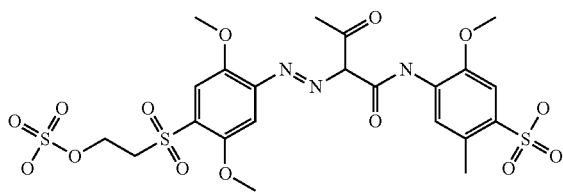
(149)
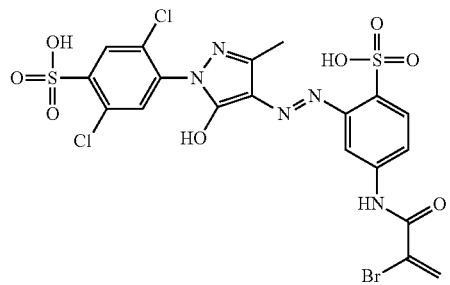
(150)
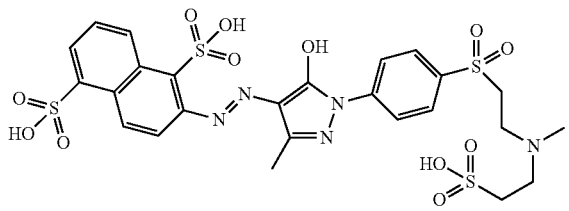

-continued
(151)
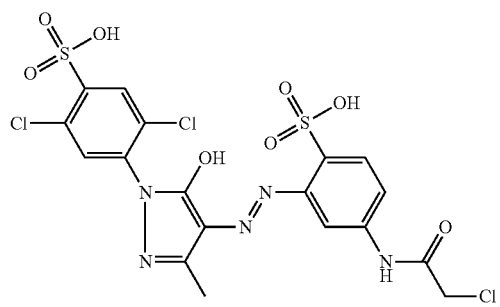
(152)
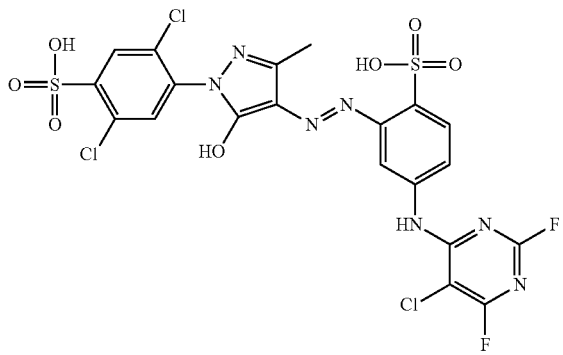
(153)
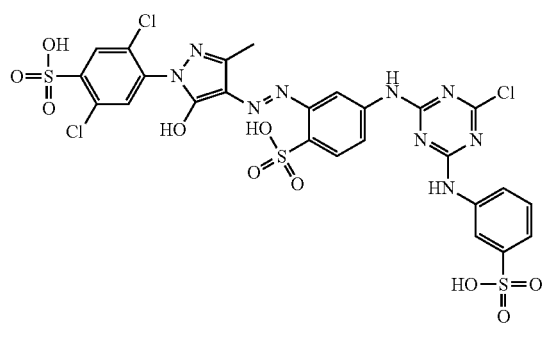
(154)
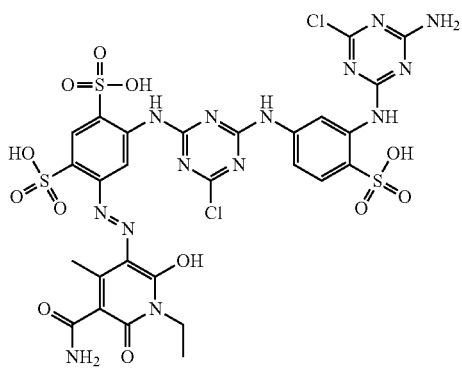
(155)
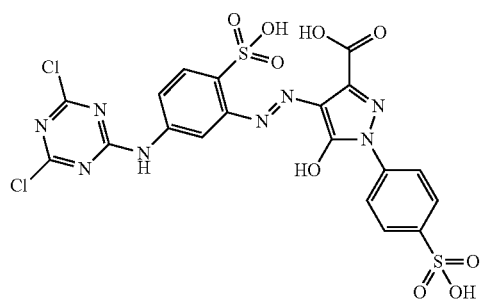
(156)
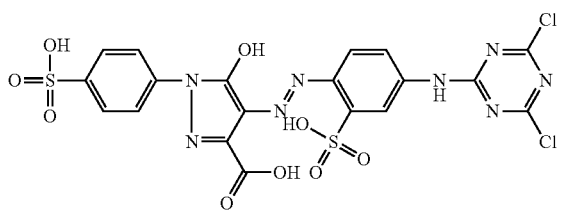
(157)
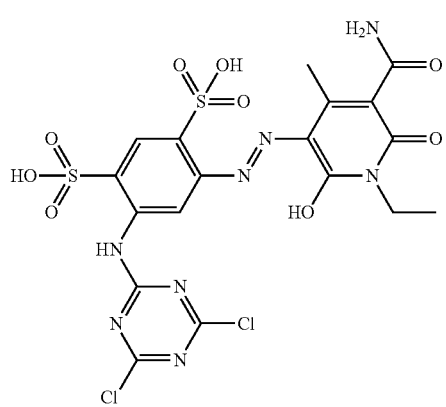

-continued
(158)
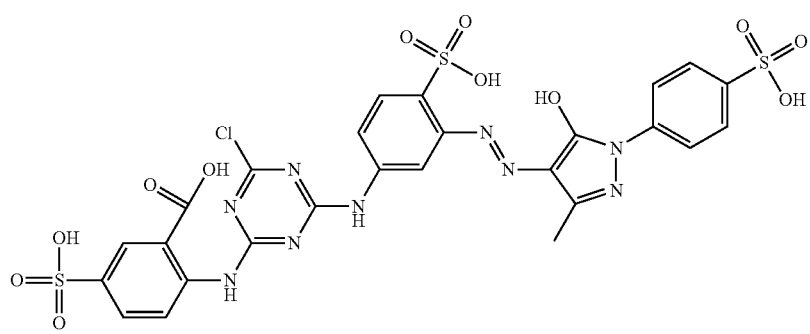
(159)
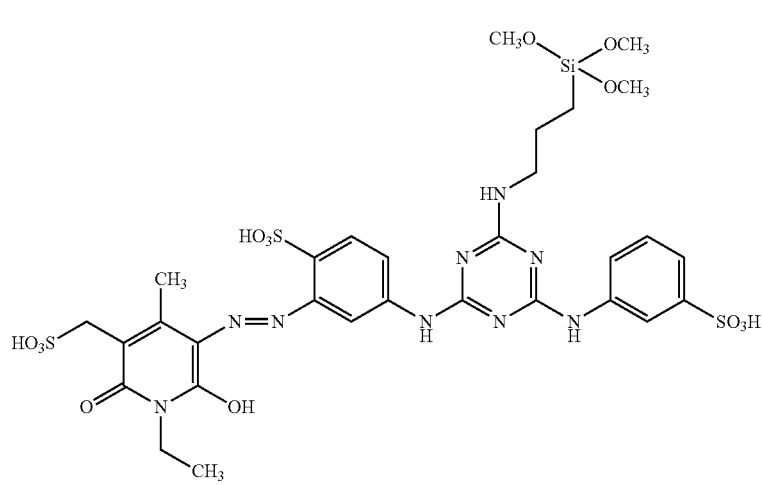
(215)
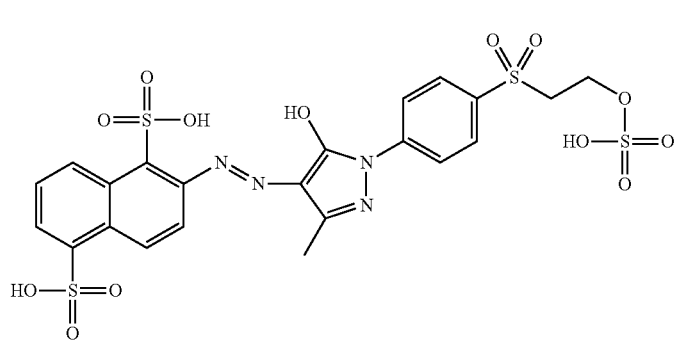
(216)
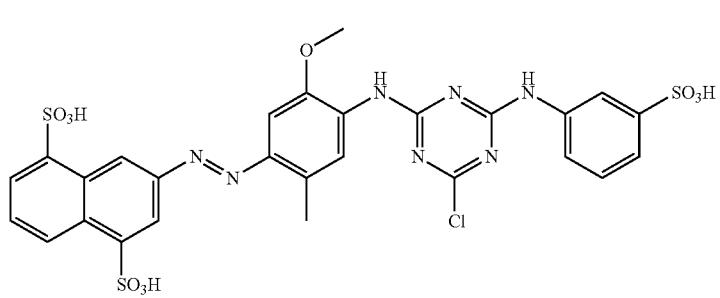

Examples for reactive cyan dyes which can be used within the context of the present invention are the compound of formula (17) described in Example 2, Step 2.1, and the following

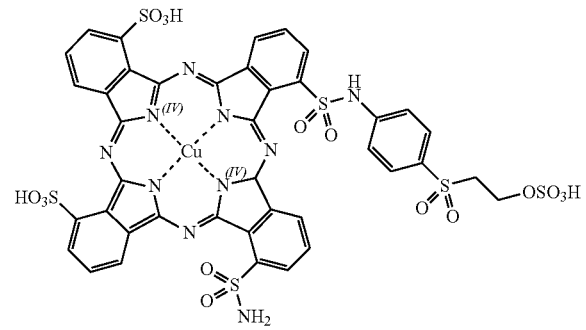
(161)

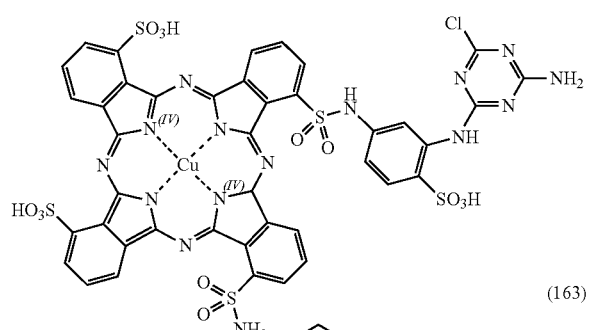
(162)

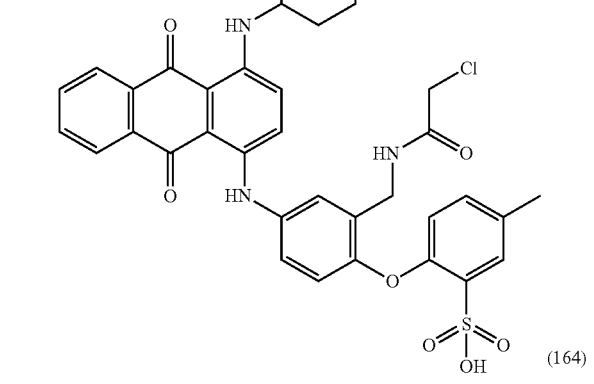
(163)

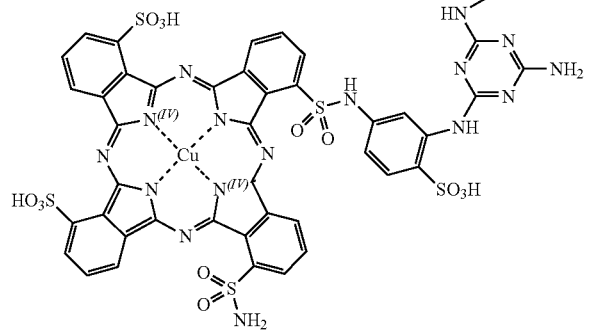
(164)

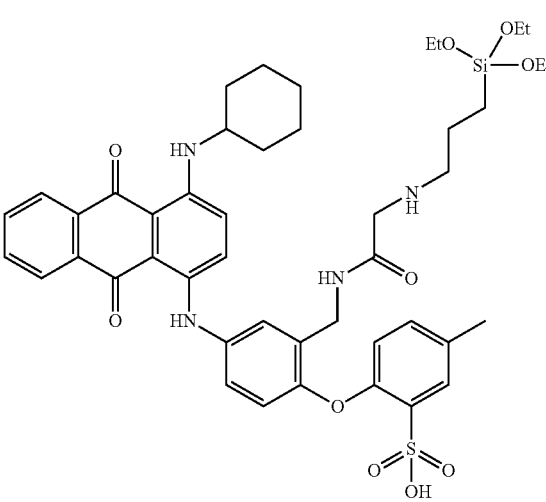
(165)

The functionalized particles comprising an inorganic core and a covalently bound dye are preferably used as green, blue, cyan, red, magenta, yellow or black components.

Preferably, the invention relates to a composition comprising a charged particle of volume 5 nm³ to 500 million nm³ having an inorganic core and a counter ion which is separable from the particle and is not covalently linked to the particle, said counter ion comprising a (poly)siloxane moiety linked via suitable bridge members to a positively or negatively charged functional group.

Instead of an inorganic core, the functionalized particles may contain a core made from, or essentially consisting of, an organic pigment which usually has been modified as described below and is different from a polymeric pigment or polymeric dye and/or does not contain an organic (co-)polymer, like an organic (co-)polymer comprising polystyrene.

Hence, the invention relates also to a composition comprising a charged particle of volume 5 nm³ to 500 million nm³ having a core essentially consisting of an organic pigment and/or an organic pigment derivative, and a counter ion which is separable from the particle and is not covalently linked to the particle, said counter ion comprising a silicon atom which is directly bound to a carbon atom, like preferably a (poly)siloxane moiety linked via suitable bridge members to a positively or negatively charged functional group.

Preferred organic pigments are e.g. carbon black or pigments of the 1-aminoanthraquinone, anthanthrone, anthrapyrimidine, azo, azomethine, quinacridone, quinacridonequinone, quinophthalone, dioxazine, diketopyrrolopyrrole, flavanthrone, indanthrone, isoindoline, isoindolinone, isoviolanthrone, perinone, perylene, phthalocyanine, pyranthrone, thioindigo or oxobenzofuranyliden-dihydroindolone series, if applicable, in the form of metal complexes or lakes, in particular unsubstituted or partially halogenated, oxo- or thio-substituted phthalocyanines such as copper, zinc or nickel phthalocyanines, 1,4-diketo-3,6-diaryl-pyrrolo[3,4-c] pyrroles, dioxazines, isoindolinones, indanthrones, perylenes and quinacridones. Azo pigments can be, for example, mono- or dis-azo pigments from any known sub-class, obtainable, for example, by coupling, condensation or lake formation. Notably useful are the pigments described in the Colour Index, including Pigment Yellow 1, 3, 12, 13, 14, 15, 17, 24, 34, 42, 53, 62, 73, 74, 83, 93, 95, 108, 109, 110, 111, 119, 120, 123, 128, 129, 139, 147, 150, 151, 154, 164, 168, 173, 174, 175, 180, 181, 184, 185, 188, 191, 191:1, 191:2, 193, 194 and 199; Pigment Orange 5, 13, 16, 22, 31, 34, 40, 43, 48, 49, 51, 61, 64, 71, 73 and 81; Pigment Red 2, 4, 5, 23, 48, 48:1, 48:2, 48:3, 48:4, 52:2, 53:1, 57, 57:1, 88, 89, 101, 104, 112, 122, 144, 146, 149, 166, 168, 170, 177, 178, 179, 181, 184, 185, 190, 192, 194, 202, 204, 206, 207, 209, 214, 216, 220, 221, 222, 224, 226, 242, 248, 254, 255, 262, 264, 270 and 272; Pigment Brown 23, 24, 25, 33, 41, 42, 43 and 44; Pigment Violet 19, 23, 29, 31, 37 and 42; Pigment Blue 15, 15:1, 15:2, 15:3, 15:4, 15:6, 16, 25, 26, 28, 29, 60, 64 and 66; Pigment Green 7, 17, 36, 37 and 50; Pigment Black 7, 20, 21, 31 and 32; Vat Red 74; 3,6-di(3',4'-dichloro-phenyl)-2,5-dihydro-pyrrolo[3,4-c]pyrrole-1,4-dione, 3,6-di(4'-cyano-phenyl)-2,5-dihydro-pyrrolo[3,4-c]pyrrole-1,4-dione, 3-phenyl-6-(4'-tert-butyl-phenyl)-2,5-dihydro-pyrrolo[3,4-c]pyrrole-1,4-dione and the compound having the tentative formula (208) depicted in Step 16.1 of the present application; and mixtures and solid solutions thereof.

As stated above, the organic pigments usually need to be modified in order to make them useful within the context of the present application. This modification is necessary for all organic pigments which do not carry a positive or negative charge on their surface because such a charge is needed to attract the counter ion defined in claim 1 of the present application.

The modification may be carried out in different ways, e.g. as exemplified in Examples 11 to 23 of the present application, it being sufficient to manufacture just a small percentage of a derivative carrying an anionic or cationic group of the pigment and to use said small percentage of said pigment derivative to cover the surface of the unmodified pigment, e.g. by way of adsorption or precipitation. This can be effected e.g. as described in WO 02/48268 A1 and WO 02/48269 A1 (both of which are incorporated herein by reference).

The anionic pigment derivative is preferably a derivative of one of the above-mentioned organic pigments, preferably a sulfonate, sulfate, carboxylate, carbonate, phosphonate or phosphate, most preferably a sulfonate or sulfate. These groups may be attached through a non-conjugated linking group, for example an alkylene, ether and/or thio group, but are preferably directly bound to an aromatic group of the chromophore. Adequately, the amount of anionic pigment derivative is from 0.1 to 15% by weight, preferably from 0.2 to 12% by weight, most preferably from 0.5 to 5% by weight, calculated as protonated acid form and relative to the unmodified pigment.

The cationic pigment derivative is preferably a derivative of one of the above-mentioned organic pigments, preferably a phosphonium and most preferably an ammonium derivative. These phosphonium or ammonium groups can either be attached through a linking group, for example a phenylene, naphthylene, alkylene, alkenylene, cycloalkylene, cycloalkenylene, alkynyl, carbonyl, carbonate, ester, amide, ether or thio group, or they are directly bound to an aromatic group of the chromophore. Preferably, ammonium or phosphonium is bound to the pigment through a linking group which is not conjugated or only partially conjugated. The cationic pigment or cationic pigment derivative can alternatively be the protonated form of a pigment or the cationic form of a triphenylmethane colorant. Adequately, the amount of cationic pigment derivative is from 0.1 to 15% by weight, preferably from 0.2 to 12% by weight, most preferably from 0.5 to 5% by weight, relative to the unmodified pigment.

More preferably, a combination of the functionalized particles is used, e.g. for the manufacturing of electrophoretic displays, and the functionalized particles are used as red, green and blue components (RGB, European Broadcasting Union E.B.U. Tech 3213-E standard values), or the functionalized particles are used as cyan, magenta, yellow and key (black) components (CMYK, ISO 2846 standard).

By using different coloured dyes, it is possible to synthesize rather homodisperse particles with any colour needed, with a wide range of zeta potential, and which are stable in dispersions.

As the particle size is easy to tune in a narrow particle size distribution, it is possible to produce transparent as well as opaque coloured particles. This is important as for different display approaches either transparent or opaque coloured particles could be needed.

A counter ion (which is separable from the particle and not covalently linked to it) comprising a silicon atom which is directly bound to a carbon atom preferably comprises a (poly)siloxane moiety linked via suitable bridge members to a charged group, e.g. a negatively or preferably positively charged functional group. In particular, said counter ion comprises at least one, especially 1-4, more especially 1-3, and preferably 1-2 (poly)siloxane moieties linked via suitable bridge members, e.g. alkylene groups, to a charged group, e.g. a negatively or preferably positively charged functional group, e.g. a charged metal complex, a quaternary (positively charged) nitrogen or phosphorus atom, or an anionic group, e.g. a carboxylate anion ($COO^-$), or preferably a borate, e.g. $-[B(OH)3]-$, a sulfate ($-OSO3-$), a phosphonate, a phosphate, $-CSS-$ or $CSO-$, or especially preferably a sulfonate anion ($SO_3^-$), or to a moiety carrying an anionic group. Preferably, the counter ion comprises only one charged group/charged site and/or, in case the core of the charged particle comprises an organic pigment and/or pigment derivative, does not comprise a carboxylate anion ($COO^-$).

A siloxane is any chemical compound the backbone of which is mainly composed of units of the form $-Si(R'_2)-O-$, where R' is a hydrogen atom, an unsubstituted or halogenated hydrocarbon group, like especially $C_1$-$C_7$alkyl, preferably methyl or ethyl, or, in case of a branched siloxane, a moiety of the formula $-O-Si(R''_2)-$ or another siloxane moiety composed of units of the form $-O-Si(R''_2)-$ wherein R" has one of the meanings of R', but may be the same or different as R'. A siloxane has a branched or unbranched backbone of alternating silicon and oxygen atoms $-Si-O-Si-O-$, with side chains R' (and R", respectively) attached to the silicon atoms. Polymerized siloxanes with organic side chains (R' and R"≠H) are commonly known as silicones or as polysiloxanes. In the (poly)siloxanes said backbone of alternating silicon and oxygen atoms $-Si-O-Si-O-$ is usually terminated by $-Si-H$ and/or end groups linked to a silicon atom in the backbone via a direct bond to a carbon atom in the end group. Usual end groups of (poly)siloxanes are hydrocarbon moieties, like alkyl, cycloalkyl or phenyl groups, all of which may be halogenated, e.g. fluorinated. In case of the present invention at least one end group of the (poly)siloxanes comprises a charged group, e.g. as defined above.

Less preferred are counter ions comprising a charged group as defined above and a silicon atom all four valencies of which are directly bound to a carbon atom, as exemplified by formulae (203) and (204) below.

Examples for a counter ion comprising a silicon atom which is directly bound to a carbon atom are the following:

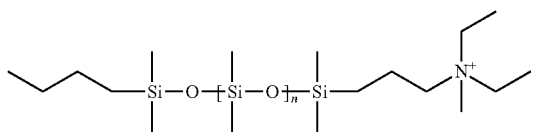
(175)
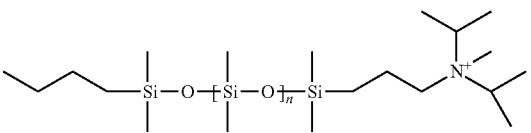
(176)
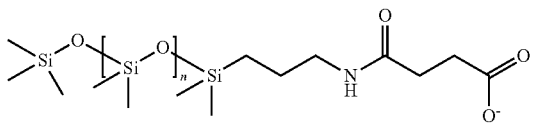
(177)
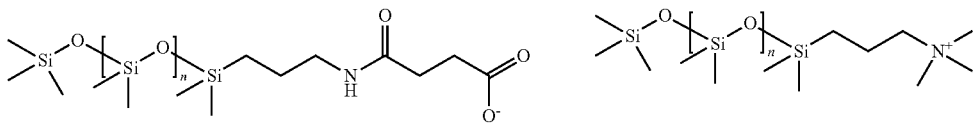
(178)
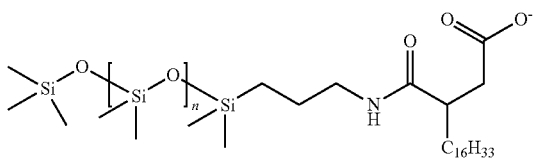
(179)
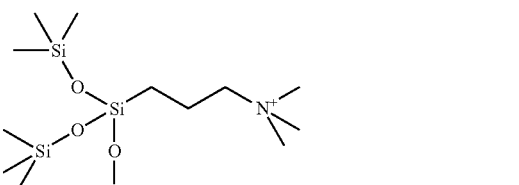
(180)
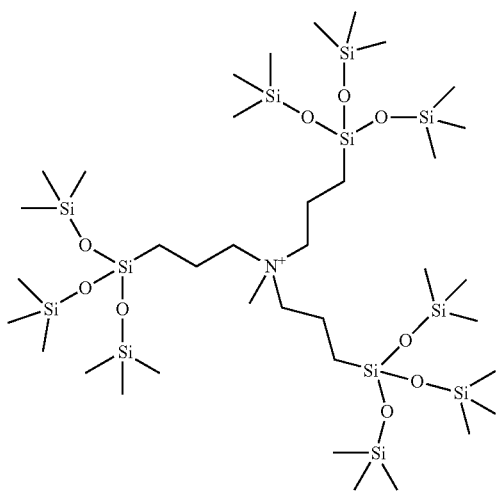
(181)
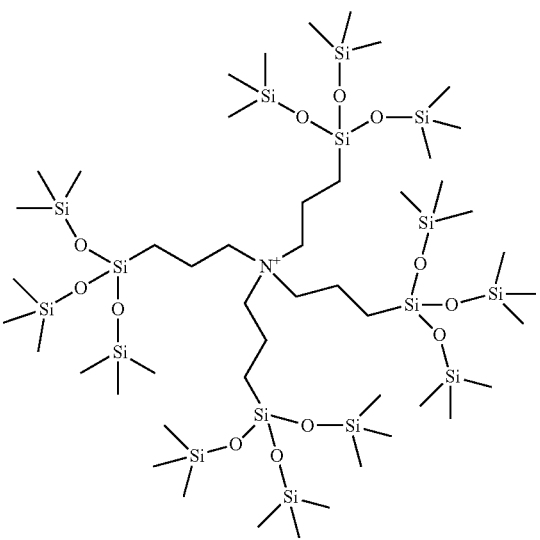
(182)
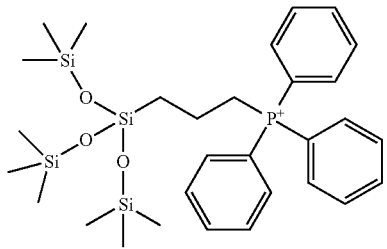
(183)
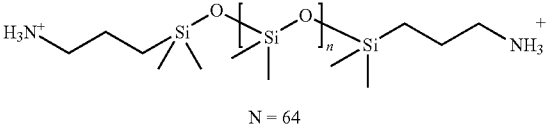
(184)
N = 64
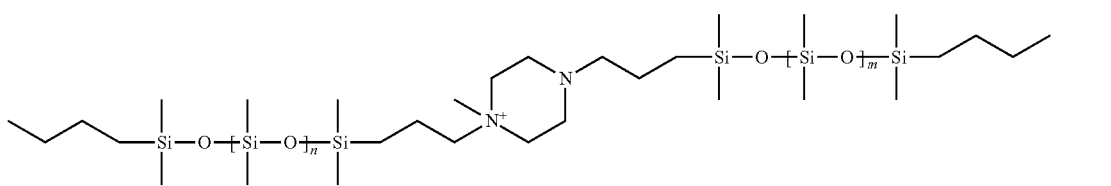
(185)

-continued
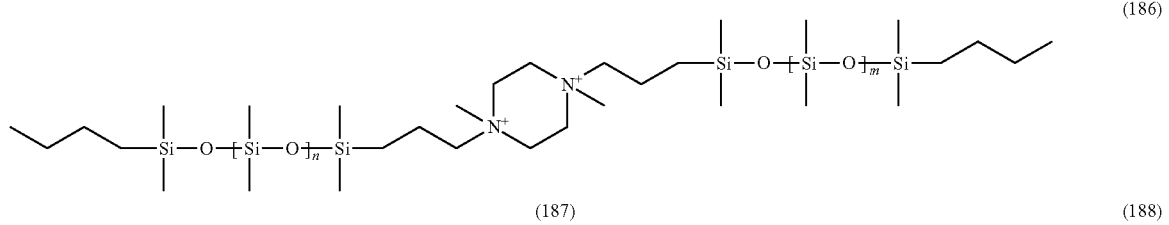
(186)
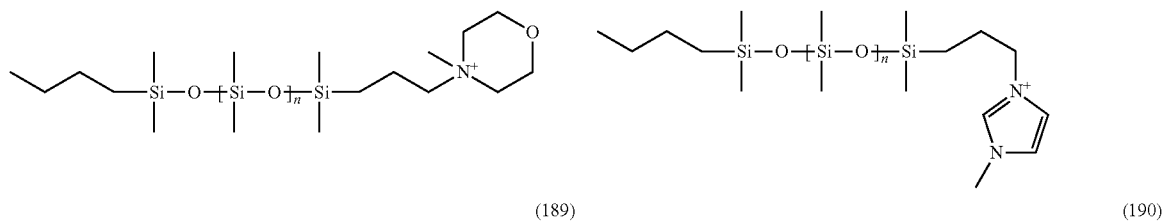
(187) (188)
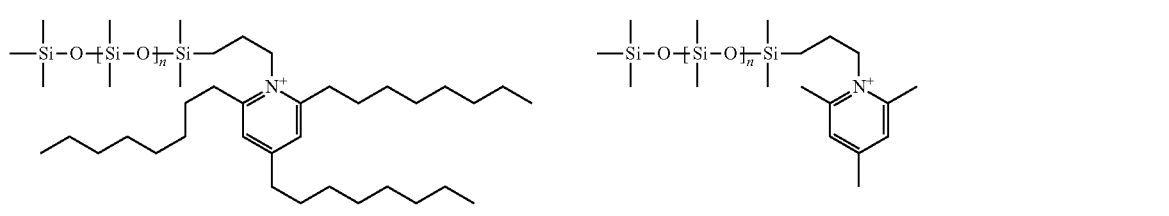
(189) (190)
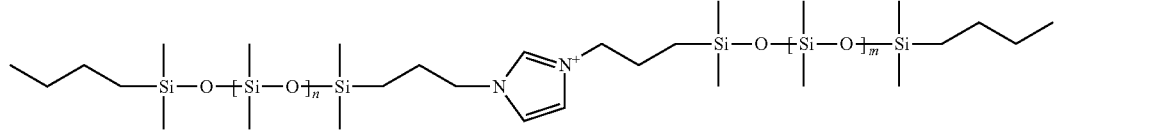
(191)
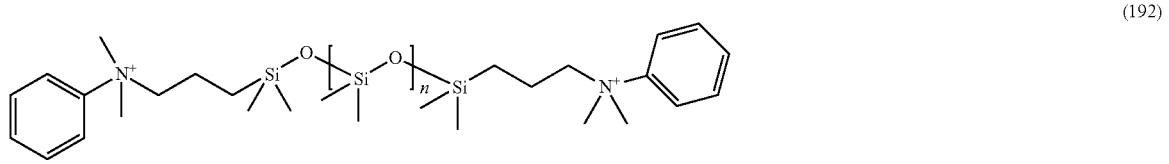
(192)
N = 64
(193) (194)
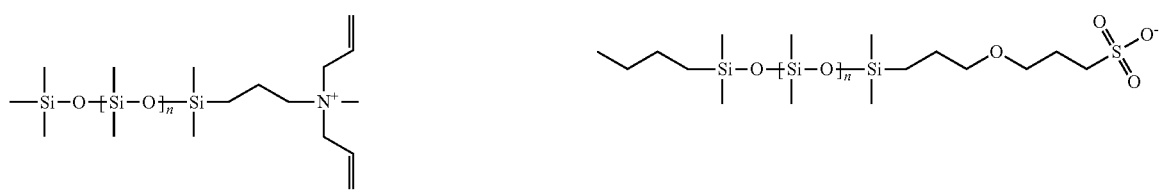
(195)
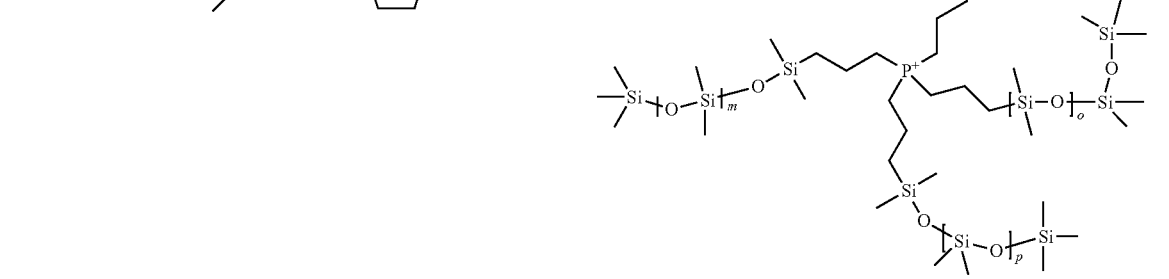
(196)

-continued
(197)
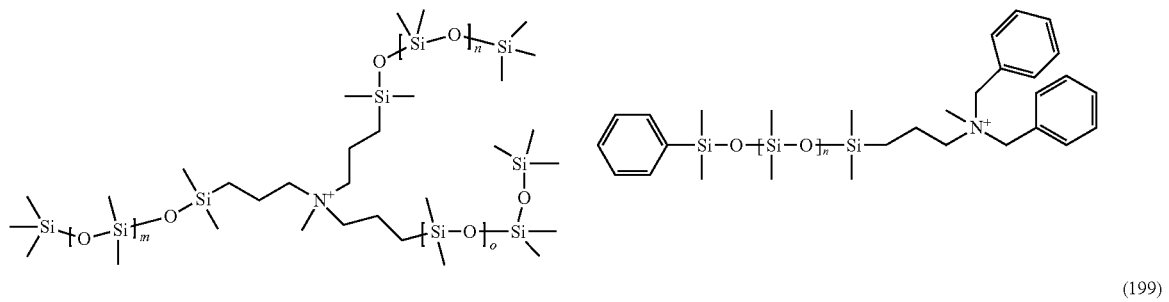
(198)
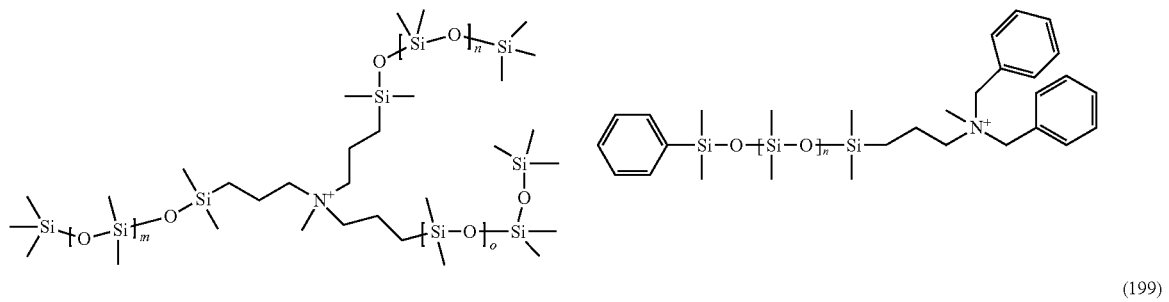
(199)
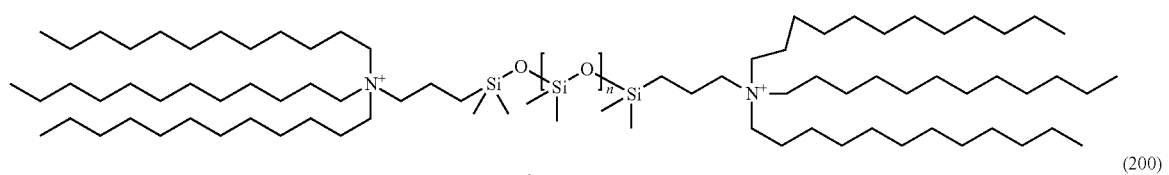
(200)
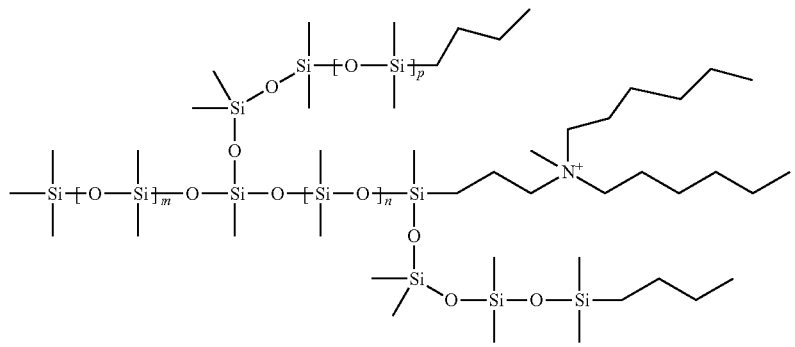
(201)
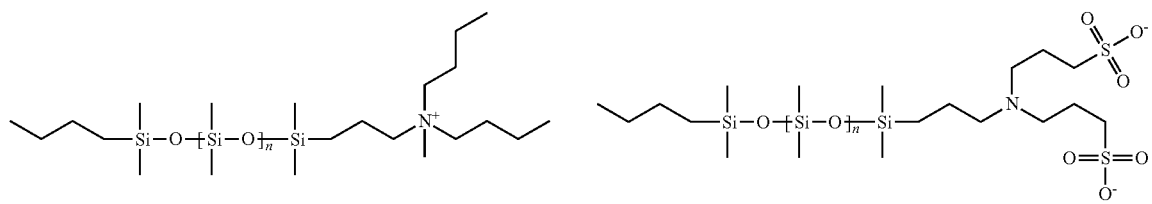
(202)
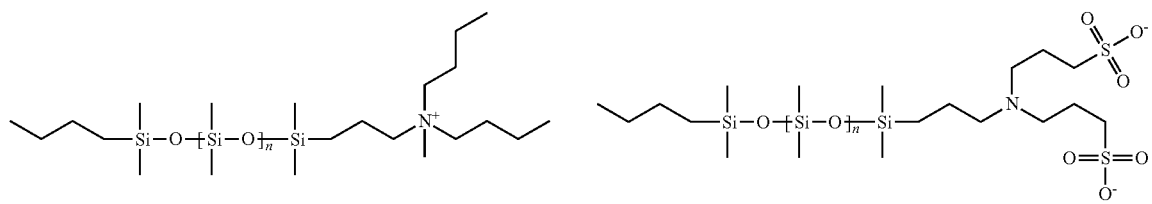
(203)
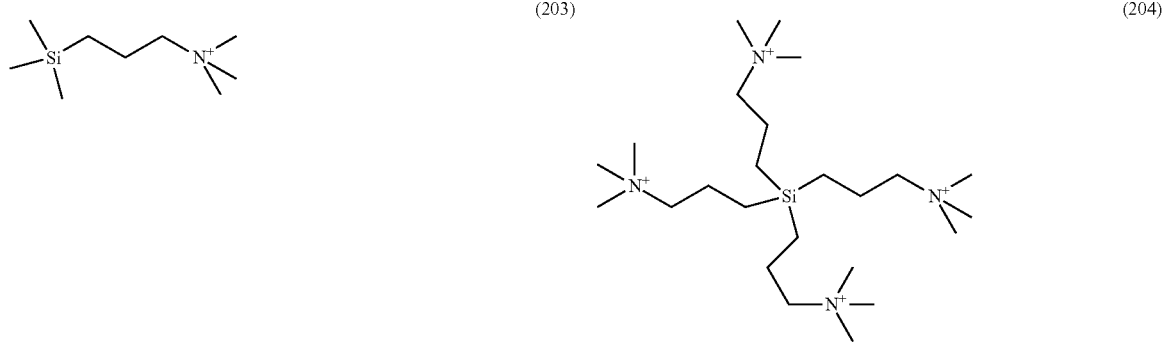
(204)
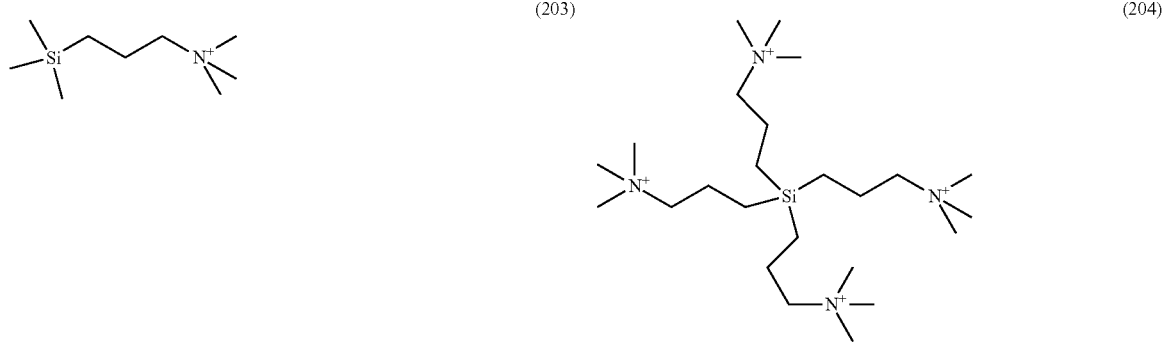
(224)
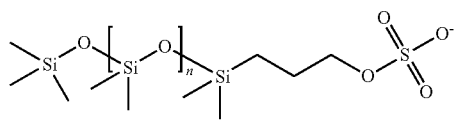

In the above examples n represents 0 to 1000, especially 0 to 100 or 10 to 100, more especially 0 to 50 or 0 to 20, preferably 5-20 or 5-15, e.g. 10 to 13, preferably 11.

Preferred counter ions are those of formula (II), wherein n has any one of the above meanings and each of $R_4$, $R_{11}$ and $R_{12}$, independently of each other represents hydrogen or $C_1$-$C_{12}$alkyl, preferably $C_1$-$C_{12}$alkyl.

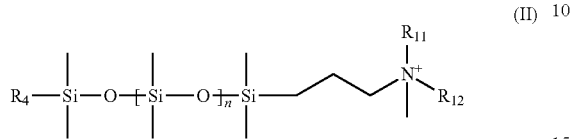

The counter ions forming part of the present invention can be manufactured in a manner known to a person skilled in the art, cf. e.g. WO 2008/033908 A2, DE 2226823 A1, U.S. Pat. No. 4,005,028 A, US 2008/0076938 A1 and U.S. Pat. No. 4,587,321 A.

For example, in order to manufacture counter ions comprising a quaternary nitrogen atom, one may start from a (poly)siloxane carrying a terminal hydrogen atom [cf. Example 1, Step 1.3, formula (6)] and react it with an aliphatic amine carrying a terminal C=C double bond, e.g. allylamine, in the presence of a suitable catalyst, e.g. platinum oxide. The amino group in the obtained product is then further N-substituted and finally quaternized, e.g. by reaction with a suitable aliphatic halide, like an alkyl halide, like n-butyl-bromide and/or methyl iodide [cf. Example 1, Steps 1.3 and 1.5] or an alkyl halide substituted by a siloxane moiety [cf. Example 6, Steps 6.2 and 6.3 and formula (28) in Step 6.2]. Advantageously, for reasons of steric hindrance, a small aliphatic halide, like methyl iodide, is used for the final quaternization step. Methyl iodide may also be used to effect the N-substitution to create the secondary, tertiary and quaternary nitrogen atom in one single reaction step [cf. Example 7, Step 7.1].

Counter ions comprising a quaternary phosphorus atom may be e.g. manufactured by reacting an alkyl halide substituted by a siloxane moiety [cf. formula (28) in Step 6.2] with a suitable phosphine, i.e. a trisubstituted phosphane, like triphenylphosphine, in a suitable solvent, like a suitable ether, e.g. a cyclic ether, like tetrahydrofurane, in the presence of a suitable base, like sodium carbonate [cf. Example 8, Step 8.1].

Counter ions comprising a carboxylate group like those of formulae (177) or (179) above can be synthesized e.g. by reacting a preferably primary amino-substituted siloxane with succinic anhydride or derivatives thereof.

Counter ions comprising a sulfonate group like those of formulae (202) or (194) above can be synthesized by e.g. reacting an amino- or hydroxy-substituted siloxane and a sultone, e.g. 1,3-propanesultone (1,2-oxathiolane 2,2-dioxide; Chemical Abstracts No. 1120-71-4).

The invention relates also to the use of the counter ions in electrophoretic devices and to novel counter ions per se. Especially, many counter ions comprising a quaternary phosphorus atom [cf. formula (37) in Step 8.1] are novel and claimed per se.

The charged particles comprising an inorganic core and a dye covalently bound thereto can also be manufactured in a manner known to a person skilled in the art, for example analogously to the processes of manufacture described in WO 2007/048721 A1 which is herein incorporated by reference, or in U.S. Pat. No. 5,378,574 A, or as described by F. M. Winnik et al., "New water-dispersible silica-based pigments: synthesis and characterization", Dyes and Pigments volume 14, issue 2, 1990, pages 101-112.

Unmodified, i.e. unfunctionalized particles, especially such nanoparticles, useful as starting materials for the manufacture of charged particles comprising an inorganic core and a dye covalently bound thereto are commercially available from different suppliers such as Degussa, Hanse Chemie, Nissan Chemicals, Clariant, H.C. Starck, Nanoproducts or Nyacol Nano Technologies as powder or as dispersions. Examples of commercially available silica nanoparticles are Aerosil® from Degussa, Ludox® from DuPont, Snowtex® from Nissan Chemical, Levasil® from Bayer, or Sylysia® from Fuji Silysia Chemical. Examples of commercially available $Al_2O_3$ nanoparticles are Nyacol® products from Nyacol Nano Technologies Inc., or Disperal® products from Sasol. The artisan is aware of different well-established processes to access particles in different sizes, with different physical properties and with different compositions such as flame-hydrolysis (Aerosil-Process), plasma-process, arc-process and hot-wall reactor-process for gas-phase or solid-phase reactions or ionic-exchange processes and precipitation processes for solution-based reactions. Reference is made to several references describing the detailed processes, such as EP-A-1 236 765, U.S. Pat. Nos. 5,851,507, 6,719,821, US-A-2004-178530, U.S. Pat. No. 2,244,325, WO-A-05/026068, and EP-A-1 048 617.

The inorganic core of the unfunctionalized particles (like silica, alumina or titanium dioxide particles) comprises on the surface free hydroxy groups as evident e.g. from formula (1) in Example 1, Step 1.1. The dye is covalently bound to such hydroxy groups, either directly or, preferably, indirectly, e.g. as illustrated by formulae (I) or (Ia) herein before.

For example, the inorganic core may first be reacted with an aliphatic amine carrying a trialkoxy-silyl group, a dialkoxy-alkyl-silyl group or an alkoxy-dialkyl-silyl group, preferably a trimethoxysilyl group, bound to a carbon atom in the aliphatic part of the amine, e.g. with 3-trimethoxysilyl-propyl amine [cf. Example 1, Step 1.1, formula (2)] as illustrated by the below reaction scheme wherein X represents e.g. an alkylene group, e.g. trimethylene. Alternatively, other functionalities on the silicon atom may be used instead of alkoxy groups, like e.g. halides (especially chlorides) or silamides.

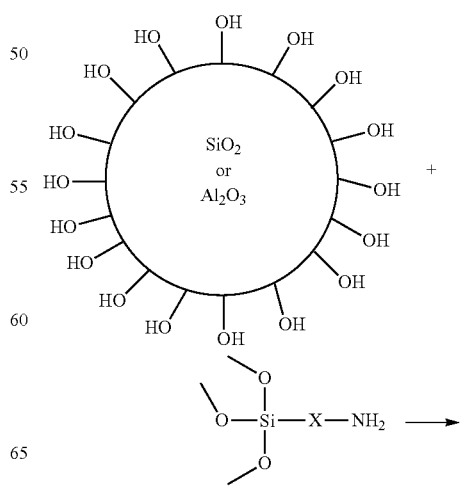

-continued

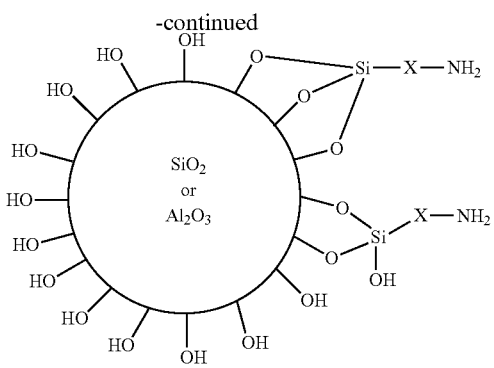

Preferably, the obtained surface modified particles are purified by elimination of soluble parts in a manner known by the person skilled in the art, e.g. by suitable filtration, centrifugation, dialysis, osmosis, sedimentation etc.

The obtained intermediate may then be reacted with a dye carrying a functional group which can react with the amino group in the intermediate. One such functional group is a halogen atom, like especially a chlorine substituent, in a 1,3,5-triazine ring as present e.g. in the dye of the formula (4) depicted in Example 1, Step 1.2.

A number of dyes, like those of formulae (72) to (76) depicted herein before, contain trialkoxy-silyl moieties. These dyes may be directly linked to the inorganic core without first introducing a bridge member. The covalent binding of this kind of dyes to the inorganic core may be carried out analogously to the above reaction of the inorganic core with an aliphatic amine carrying a trialkoxy-silyl group.

Preferably, the obtained dyed particles are purified by elimination of soluble parts in a manner known by the person skilled in the art, e.g. by suitable filtration, centrifugation, dialysis, osmosis, sedimentation etc.

The composition comprising the charged particles and the counterions of the present invention may be used e.g. in the form of a dispersion. A liquid dispersion is manufactured for example as follows:

An aqueous dispersion of the charged particles is added to a solution of the counterions in a mixture of a suitable alkanol, like ethanol, and a suitable alkane, e.g. pentane or hexane or a mixture thereof, like petroleum ether with a boiling point of 40-60° C., and the obtained two-phase system is stirred at an elevated temperature, e.g. 60° C. After cooling and phase separation the organic phase is thoroughly washed with deionized water. A suitable solvent which is liquid at room temperature and at normal pressure, e.g. a suitable unsubstituted or halogenated hydrocarbon solvent, e.g. tetrachloroethylene or a suitable alkane, like n-dodecane, or a suitable cyclic hydrocarbon, like tetraline (1,2,3,4-tetrahydronaphthalene), or any other high-insulation organic solvent mentioned below, is added to the organic phase and the low-boiling organic solvents are removed in vacuo leaving behind a dispersion of the desired composition comprising the charged particles and the counterions in the solvent, e.g. dodecane.

If desired, the obtained dispersion can be made homogenous, e.g. by removal of the agglomerates by centrifugation. Typically, the dispersed particles are nanoparticles having a diameter or mean particle size between about 10 and 1000, especially between 10 and 600 or 500, preferably between 10 and 300 or 200 nanometers (nm), e.g. between 50 and 500 or between 100 or 300 nm. As a lower limit of the mean particle size 10 nm, especially 20 nm, is preferred. Using the formula for the volume V of a sphere, i.e. $V=\frac{1}{6} \pi d^3$, these diameters d correspond to an approximate particle volume of about 500 $nm^3$ (diameter 10 nm), 63000 $nm^3$ (diameter 50 nm), 500000 $nm^3$ (diameter 100 nm), 4 million $nm^3$ (diameter 200 nm), 14 million $nm^3$ (diameter 300 nm), 63 million $nm^3$ (diameter 500 nm), 110 million $nm^3$ (diameter 600 nm), and 500 million $nm^3$ (diameter 1000 nm), respectively. The particle size may, for example, be determined by electron microscopy or dynamic light scattering also known as Photon Correlation Spectroscopy or Quasi-Elastic Light Scattering.

In order to prepare a composition comprising the charged particles and the counterions of the present invention in a non-dispersed form one may proceed as described above, but, instead of adding a higher molecular weight hydrocarbon solvent, like dodecane to the organic phase which has been washed with deionized water, said organic phase is evaporated in vacuo. If desired, the obtained non-dispersed composition may be dispersed as described above. It is, however, also possible to use the composition of the present invention in the form of a powder dispersed in a gas, like a protecting gas, like argon ("gaseous fluid") or even in a vacuum. Dispersions of electro-optic materials in gaseous fluids are e.g. disclosed in US20090122389 A1 (cf. paragraph [0015]).

The organic content of the particles according to the present invention is, for example, 5 to 95 percent by weight, especially 10 to 90, 20 to 90, 30 to 90, 40 to 90 or 50 to 90 percent by weight, based on the total weight of the particle.

The invention relates to the compositions both in pure, i.e. non-dispersed form, and in dispersed, especially homogenously dispersed, form.

For such electrophoretic dispersions it is of importance that no settlement of the particles takes place.

As liquid dispersion media high-insulation organic solvents are preferred. These solvents include aromatic hydrocarbons such as toluene, xylenes, and alkylbenzenes; aliphatic hydrocarbons such as pentane, hexane, octane, decane or dodecane; alicyclic hydrocarbons such as cyclohexane and methyl cyclohexane; halogenated hydrocarbons such as methylene chloride, chloroform, carbon tetrachloride, 1,2-dichloroethane, tetrachloro-ethylene, and 1,2-dichloro-benzene; mineral oil such as silicon oil and fluorocarbon oil; vegetable oil such as olive oil; and long-chain fatty acid esters. These solvents may be used alone or in combination. Aliphatic hydrocarbons and aromatic hydrocarbons are preferred.

The liquid dispersion media may comprise the functionalized particles according to the present invention in an amount of 0.01 to 50% by weight, preferably 0.01 to 25% by weight, especially 0.1 to 10% by weight.

The dispersion may contain further additives, like suitable dispersants, charge control agents and/or stabilizers.

The invention relates also to the use of these compositions in the form of an electrophoretic ink, also called "electronic ink" for electrophoretic displays, preferably for electronic paper.

The working principle of an electrophoretic ink display is described in many different devices in patents (cf. e.g. US 2009/0040594 A1 and all patents concerning device structures and display technology cited therein, and the further patent applications mentioned below) and publications and is known to the person skilled in the art. The basic working principle of an electrophoretic ink display is very simple. For example, an optical active fluid (the electro-phoretic ink) is placed between two electrodes. One of these electrodes is transparent, so any changes in color are visible. The active fluid will be influenced by changes in the electrical field applied between the electrodes. An electrophoretic ink display is e.g. constructed by three layers. For example, the first layer is a transparent foil coated with Indium Tin Oxide (ITO). This layer acts as the top electrode. The second layer, the pixel structure, is made of dry film resist. This is a light sensitive material and can be structured with lithographic processes. The structure of the pixelated layer ensures the electrophoretic-ink to stay in place. The third layer is the back-electrode. For a flexible display a flex foil is used. For a non-flexible display a normal printed circuit board can be used.

One possible working principle for the electrophoretic-ink display is as follows: In the first state of the electrical field all the colored charged particles will be attracted to the back electrode. Now the color of the contrast fluid will appear at the transparent electrode. When the electrical field is reversed, the particles will be attracted by the front electrode. The color of the transparent front side will change into the color of the particles. Because of the viscosity of the fluid, in which the particles are dispersed, and due to electrostatic attraction the particles will remain at their place. The particles are too light to flow around in the fluid. This is a great advantage of this technology, because no power is required during the idle time.

The principal components of electronic inks are a large number (e.g. millions) of tiny microcapsules, about the diameter of a human hair, in a film for integration into electronic displays. In one embodiment, a black and white display, each microcapsule contains positively charged white particles and negatively charged black particles suspended in a clear fluid. When a negative voltage (field) is applied at the top electrode, the white particles move to the top of the microcapsule where they become visible to the user. This makes the surface appear white at that spot. At the same time, an opposite positive voltage pulls the black negatively charged particles to the bottom of the microcapsules where they are hidden. By reversing this process, the black particles appear at the top of the capsule, which now makes the surface appear dark at that spot. With this approach an image or a text can be visualized on display surfaces.

A further object of the present invention are electrophoretic displays, especially electronic paper, comprising as electrophoretic displaying particles functionalized particles according to the present invention. As to the functionalized particles the definitions and preferences given above apply.

Electrophoretic display systems including electrophoretic devices wherein the compositions of the present invention can be used are known (see for example U.S. Pat. No. 5,914,806, US-A-2004/0094422, and WO-A-02/079869). The electrophoretic display systems usually comprise a plurality of such electrophoretic devices.

The electrophoretic display system includes for example the electrophoretic devices each including a pair of substrates (electrodes) and an electrophoretic dispersion placed between the substrates, wherein at least one of the substrates comprises a transparent material, the substrates have a predetermined distance therebetween, and the electrophoretic dispersion contains at least a liquid dispersion medium and electrophoretic particles having a surface charge. When a voltage is applied between the substrates, the electrophoretic particles electrophoretically migrate depending on the surface charge and the direction of the electric field, thereby changing the distribution of the electrophoretic particles. Therefore, the colour of the electrophoretic device is changed when viewed from the transparent substrate side. Namely, when the charged particles move to one of the substrates, which serves as a display surface, the color possessed by the charged particles is recognized. Thus, a desired image can be displayed by controlling the voltage being applied.

It is preferred that some display devices contain red particles, some display devices contain green particles and some display devices contain blue particles. According to another embodiment it is preferred that some display devices contain cyan particles, some display devices contain magenta particles, some display devices contain yellow particles, and some display devices contain black particles. By addressing the display devices individually, a display can be caused to give an appearance corresponding to a selected colour at a selected brightness level.

Interesting types of electrophoretic displays are the so-called microcell electrophoretic displays. In microcell electrophoretic displays the particle containing dispersion medium is retained in a plurality of cavities formed within a carrier medium (see for example WO-A-02/01281).

A preferred electrophoretic display is electronic paper. This is typically a sheet-like display comprising a sheet-like display function layer.

In a special device structure, more than one different and transparent color can be displayed in a multilayer system at the same time, where the mixed color is viewed by the human eye.

The present invention relates also to a claimed composition in the form of an homogenous dispersion, to its use in an electrophoretic display and to the use of a counter ion comprising a (poly)siloxane moiety linked via suitable bridge members to a quaternary, positively charged, nitrogen or phosphorus atom, or to a moiety carrying an anionic functional group in electrophoresis. The present invention relates also to new counter ions per se.

The following Examples illustrate the invention.

EXAMPLES

Example 1

Ammoniumsiloxane Modified Magenta Dyed Nanoparticles of the Formula (10)

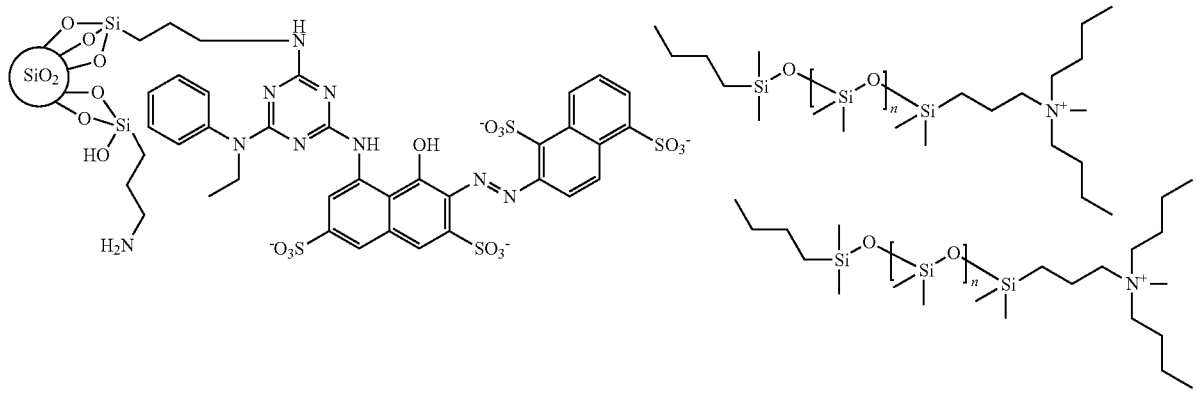

-continued

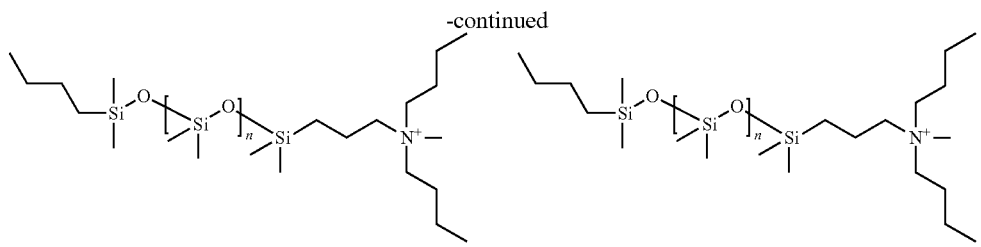

34 mg of compound (9) described in step 1.5 below are dissolved in a mixture of 3 ml of ethanol and 3 ml of petroleum ether (boiling range 40-60° C.) and 0.89 g of an aqueous dispersion of compound (5) described in step 1.2 below, containing 3.3% by weight of the dyed nanoparticles (sodium salt), are added. The two-phase system is stirred for 15 minutes at 60° C. in a vial immersed into a heated oil bath. After cooling, the two phases separate. The organic phase is washed twice with 4 ml of deionized water. 1 ml of n-dodecane is added. After standing over night, the low-boiling organic solvents are removed in vacuo, leaving behind 0.75 g of a red dispersion of the nanoparticles (10) in dodecane. After removal of agglomerates by centrifugation, the dispersion is homogeneous for applicatorial testing (cf. the below results). It may be used in a device as magenta electrophoretic ink.

The dispersed charged nanoparticles have a diameter of 176 nm as measured by dynamic light scattering by means of a Malvern Zetasizer Nanoseries (Malvern Instruments Ltd., United Kingdom).

The surface modified dispersed charged nanoparticles show a zeta potential ($\xi$) of $-19.4$ mV as measured by means of a Malvern Zetasizer Nanoseries and, an electrophoretic mobility $\mu$, as calculated from the Smoluchowsky relation ($\xi=\mu\eta/\in$ where $\mu$ is the mobility, $\eta=1.344$ mPa*s is the viscosity of the medium at 25° C. and $\in=2.0$ is the dielectric constant at 20° C.) of $-1.66\text{e-}2\times10^{-8}$ m$^2$/Vs at 40V.

The significance of zeta potential is that its absolute (i.e. positive or negative) value is related to the stability of colloidal dispersions. The zeta potential indicates the degree of repulsion between adjacent, similarly charged particles in a dispersion. For molecules and particles that are small enough, like the nano particles of the present invention, a high zeta potential confers stability, i.e. the dispersion resists aggregation. When the potential is low, attraction exceeds repulsion and the dispersion will break and flocculate. So, colloids with high zeta potential (negative or positive) are electrically stabilized while colloids with low zeta potentials tend to coagulate or flocculate. The other importance of the zeta potential is that the mobility of a particle under influence of an electric field is proportional to the zeta potential. The higher the (absolute) zeta potential, the faster is the movement of the particles and the switching between the two states.

The electrophoretic mobility is the coefficient of proportionality between particle speed and electric field strength.

In order to prepare ammoniumsiloxane modified magenta dyed nanoparticles of the formula (10) in a non-dispersed form one may proceed as described above, but, instead of adding dodecane to the organic phase which has been washed twice with 4 ml of deionized water, said organic phase is evaporated in vacuo.

The starting materials (9) and (5) are prepared as follows:

Step 1.1: Aminopropyl-modified-nanoparticles (3)

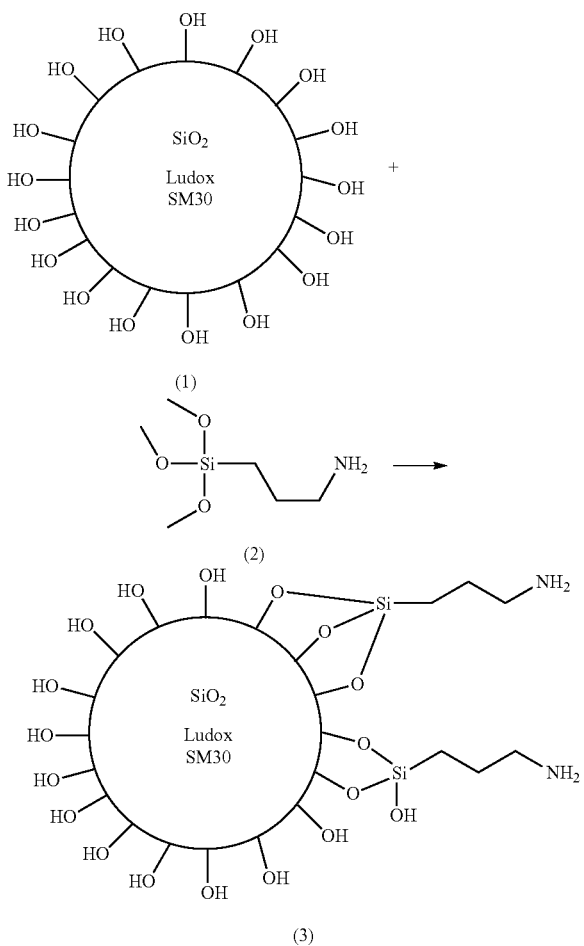

46.3 g of LUDOX SM-30 (dispersion of silica nanoparticles 30% by weight in water; Grace-Davison; average diameter between 5 and 15 nm, especially between 7 and 10 nm, e.g. 8 nm) of the schematic "formula" (1) are diluted with 46 ml of water and stirred for 10 minutes at ambient temperature with 13.8 g of freshly acid-activated Amberlite® IR-120, i.e. a strongly acidic gel-type resin with sulfonic acid functionality (Rohm and Haas). After removal of the ion exchanger by a coarse frit, the dispersion of the silica is diluted with 1200 ml of tert.-butanol and stirred at ambient temperature for 21 hours. To the resulting clear dispersion, a solution of 21.52 g of (3-aminopropyl)-trimethoxysilane (2) in 80 ml of tert.-butanol is added dropwise with stirring during a period of two hours. The resulting turbid dispersion is stirred at ambient temperature for 1.5 hours, then for another 3 hours at 80° C. under reflux. Then at the same temperature, water and methanol are removed together with a part of the tert.-butanol by azeotropic distillation during 5 hours, distilling off 490 ml overall. After cooling down to ambient temperature, the solvent is exchanged with ethanol by azeotropic distillation in vacuo, after addition of a sufficient quantity of ethanol. The dispersion is separated from dissolved material and concentrated in vacuo to give 302 g of a dispersion containing 5.1% by weight of 3-aminopropylsilane modified silica nanoparticles (3).

Step 1.2: Magenta dye modified nanoparticles (counter ion: sodium) (5)

fied silica), Ex. XVI using the dye of the above formula (4) (sodium salt) instead of Procion Turquoise HA (dye-attached silica).

Step 1.3: Aminopropyl-polydimethylsiloxane (7)

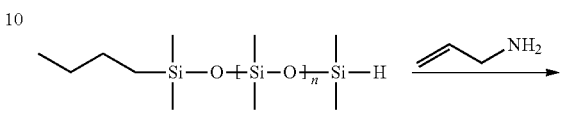

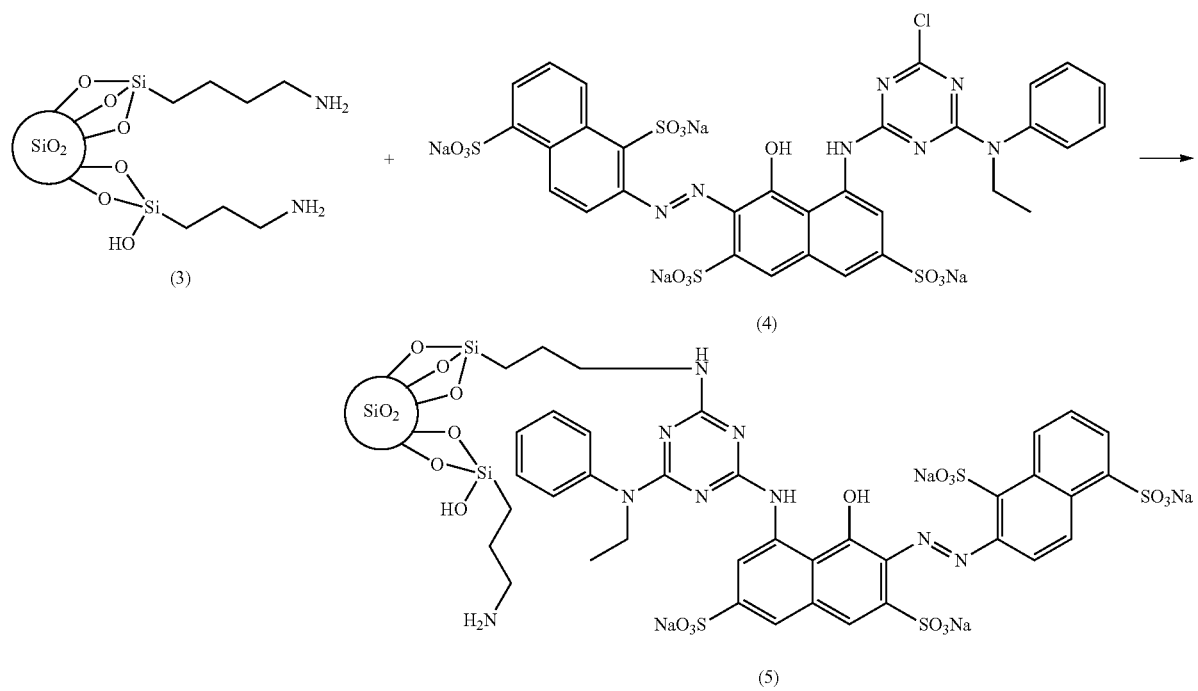

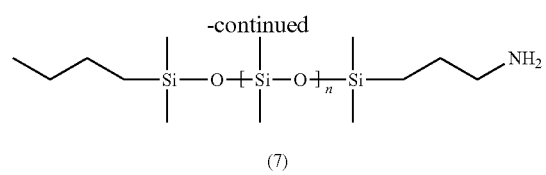

22.5 g of a dispersion of substance (3) (5.1% by weight of solids in ethanol) are added to 30 ml of N,N-dimethylacetamide in a reaction flask. 530 mg of anhydrous sodium carbonate are added, then a solution of 4.77 g of a reactive magenta dye of the formula (4) in 30 ml of N,N-dimethylacetamide. The mixture is heated with stirring for 16 hours to 105° C., then cooled to ambient temperature.

The reaction mixture is poured onto 800 ml of ethanol, the product isolated by centrifugation, and redispersed in water. The particle is separated from dissolved material, and finally concentrated to a volume of 100 ml. This dispersion contains 3.3% by weight of dye-attached nanoparticles (5).

The dispersed charged nanoparticles have a diameter of 174 nm as measured by dynamic light scattering by means of a Malvern Zetasizer Nanoseries.

An alternative synthesis method is described in EP 0355062, Example VI (aminopropyltriethoxysilane-modi- 1 g of compound (6), a linear poly(dimethylsiloxane) with a molecular weight around 1,000 (i.e. n is about 11) terminated by a butyl group on one end and a hydride at the other end, sold by Chisso Corp., Japan, under the trade name FM 0111, is added to a suspension of 11.5 mg of platinum oxide in 375 μl (286 mg) of allyl amine. The mixture is stirred for 16 hours at 105° C. in a vial immersed into a heated oil bath. After cooling to ambient temperature, the reaction mixture is filtered through a membrane filter (polytetrafluoro-ethylene [PTFE], pore size 0.45 μm). After removal of the excess of allyl amine in vacuo, the product of the formula (7) remains in the form of a yellowish slightly turbid liquid. The 1H-NMR reveals the complete disappearance of the starting hydridosilane and that the reaction occurs with >90% selectivity at the 3-position of the allyl amine (as compared to the 1-position); $^1$H-NMR (ppm, CDCl$_3$): 2.60 2H t, 1.39 2H txt, 1.28-1.21 4H m, 0.84 3H t, 0.48 4H t, 0 CH$_3$—Si s.

Step 1.4:
N,N-Dibutylamino-propyl-polydimethylsiloxane (8)

Step 1.5:
Methyl-dibutyl-ammoniumpropyl-polydimethylsiloxane (9)

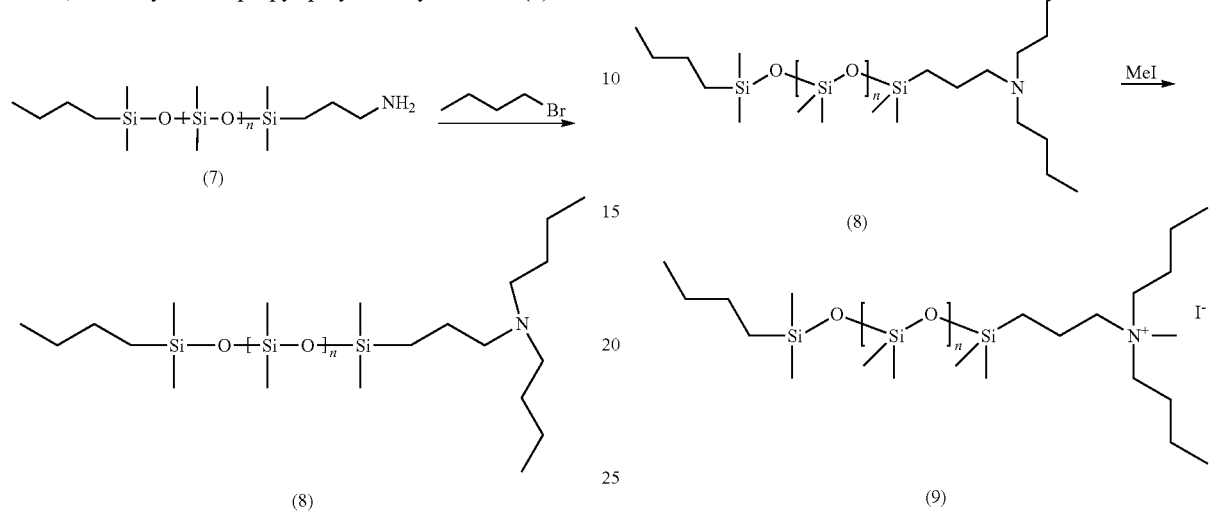

3 g of compound (7) are dissolved in 10 ml of n-butyl bromide, 1.73 g of anhydrous sodium carbonate are added, and the suspension is stirred for 3 hours at 105° C. in a closed vial immersed into a heated oil bath. After cooling to ambient temperature, the reaction mixture is diluted with methylene chloride and washed with water, and the aqueous phase is once again extracted with methylene chloride. The combined organic phases are dried over anhydrous sodium sulfate, leaving, after removal of the solvent in vacuo, 3.0 g of a brownish-yellow oil.

2 g of this crude reaction mixture are purified by HPLC (silica gel, heptane-isopropanol 90:10), resulting in 0.57 g of a slightly yellowish clear oil, being >95% of tertiary amine (8) according to $^1$H- and $^{13}$C-NMR.

560 mg of compound (8) are dissolved in 2.7 ml of methyl iodide, and this solution is stirred for 20 minutes at 45° C. in a closed vial immersed into a heated oil bath. After cooling to ambient temperature, the excess of methyl iodide is removed in vacuo, leaving behind compound (9) in the form of a yellowish viscous oil showing by $^1$H-NMR complete conversion of the tertiary amine to the quaternary ammonium salt; $^1$H-NMR (ppm, CDCl$_3$): 3.45-3.28 6H m, 3.25 3H s, 1.75-1.55 6H m, 1.45 4H txq, 1.26-1.20 4H m, 0.95 6H t, 0.81 3H t, 0.55-0.43 4H m, 0.09 6H s, 0 CH$_3$—Si s.

Example 2

Ammoniumsiloxane Modified Yellow Dyed Nano Particles

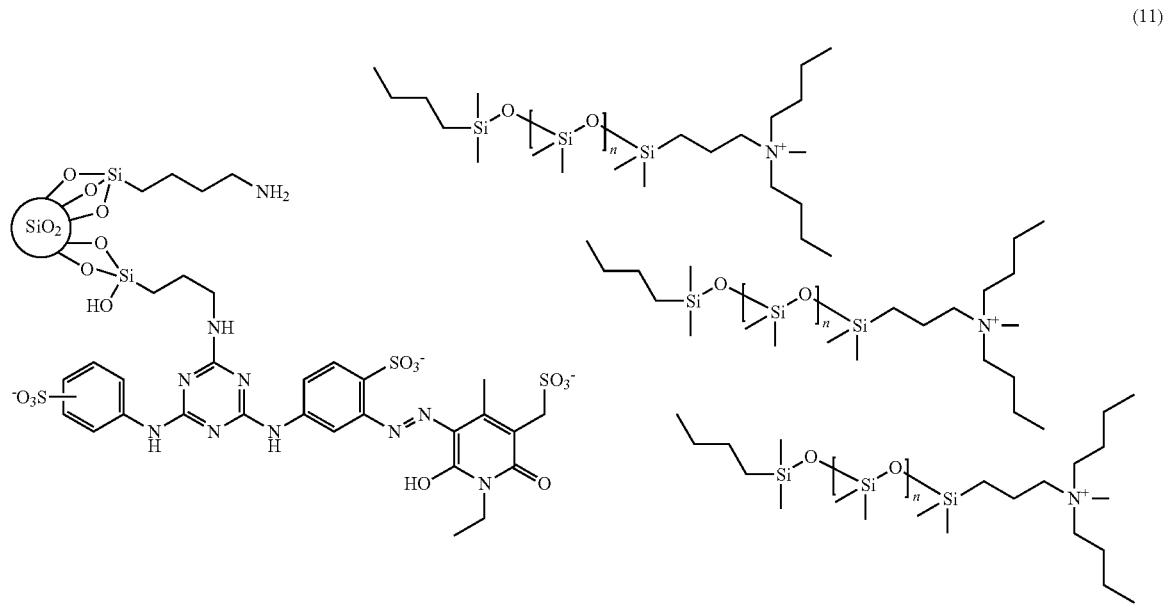

34 mg of compound (9) described in Step 1.5 are dissolved in a mixture of 3 ml of ethanol and 3 ml of petrol ether (boiling range 40-60° C.) and 1.94 g of an aqueous dispersion of (13), containing 1.9% by weight of the nanoparticles as sodium salt, are added. The two-phase system is stirred for 15 minutes at 60° C. in a vial immersed into a heated oil bath. After cooling, the two phases separate. The organic phase is washed twice with 4 ml each of deionized water. 1 ml of n-dodecane is added. After standing over night, the low-boiling organic solvents are removed in vacuo, leaving behind 0.77 g of a yellow dispersion of the nanoparticles (11) in dodecane. After removal of agglomerates by centrifugation, the dispersion is homogeneous and may be used in a device as yellow electrophoretic ink.

The dispersed charged nanoparticles have a diameter of 213 nm as measured by dynamic light scattering by means of a Malvern Zetasizer Nanoseries.

The surface modified dispersed charged nanoparticles show a zeta potential (ξ) of −7.74 mV as measured by means of a Malvern Zetasizer Nanoseries and, an electrophoretic mobility μ, as calculated from the Smoluchowsky relation, of −6.64e-3×10$^{-8}$ m$^2$/Vs at 40V.

The starting material of the formula (13) is prepared as follows:

Step 2.1: Yellow dye modified nanoparticles (13)
(counter ion: sodium)

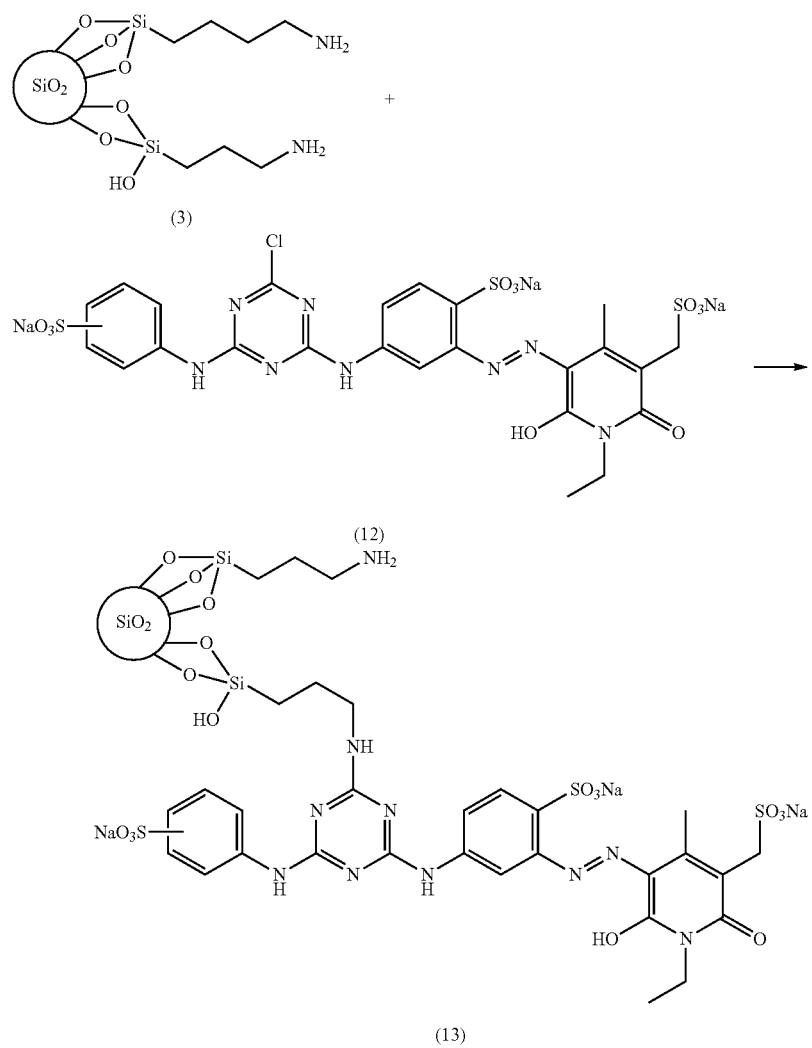

22.5 g of a dispersion of compound (1) (5.1% by weight of solids in ethanol) are added to 30 ml of N,N-dimethylacetamide in a reaction flask. 530 mg of anhydrous sodium carbonate are added, then a suspension of 3.99 g of a reactive yellow dye of formula (12) in 30 ml of N,N-dimethylacetamide. The mixture is heated with stirring for 16 hours to 105° C., and then cooled to ambient temperature. The reaction mixture is poured onto 800 ml of ethanol, the product isolated by centrifugation, and redispersed in water. The particle dispersion is separated from dissolved material, and finally concentrated to a mass of 72.04 g. This dispersion contains 1.9% by weight of dye-attached nanoparticles (13).

Example 3

Ammoniumsiloxane Modified Cyan Dyed Nanoparticles (14)

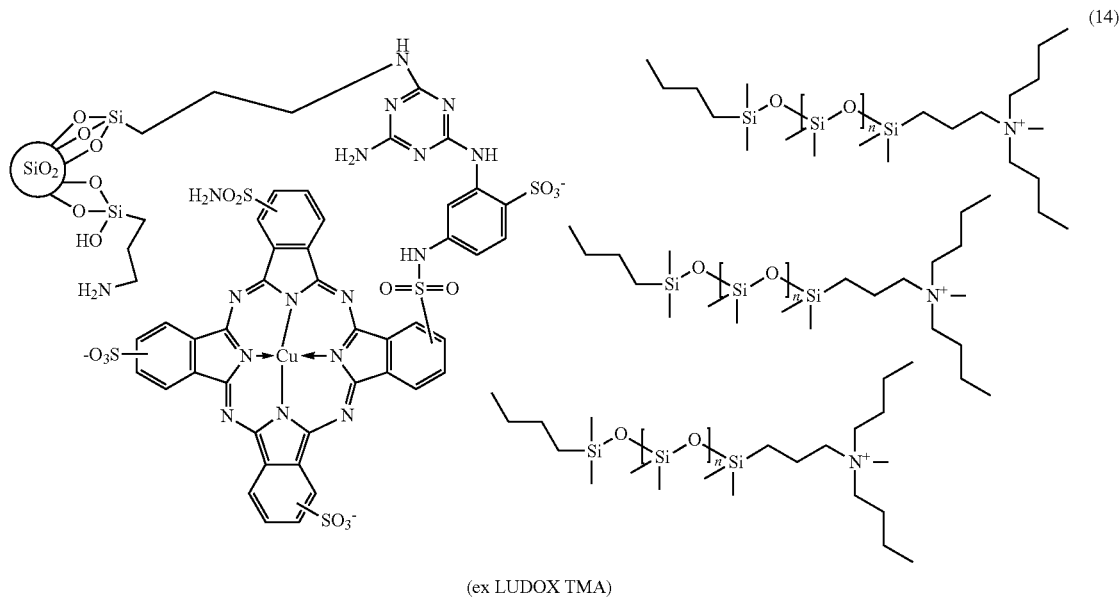

(ex LUDOX TMA)

Analogously as described in Example 2 the nanoparticles (18) are reacted with the ammonium-polydimethylsiloxane (9) described in Step 1.5 to give a homogeneous dispersion of cyan dyed nanoparticles (14) in dodecane wherein n is about 11 [cf. Step 1.3, formula (7)]. This dispersion may be used in a device as cyan electrophoretic ink.

The starting material is prepared as follows:

Step 3.1: Aminopropyl-modified-nanoparticles (16)

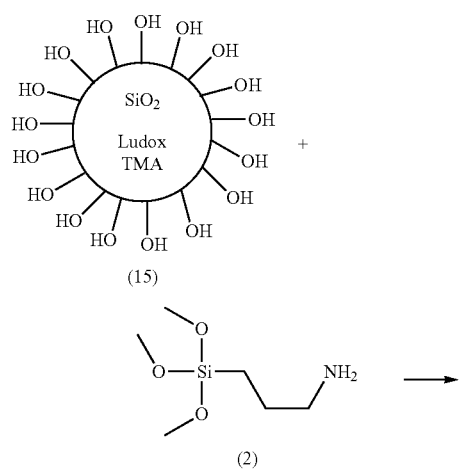

(15)

LUDOX TMA (dispersion of silica nanoparticles 34% by weight in water; Aldrich) of the schematic "formula" (15) is reacted with 3-aminopropyl)-trimethoxysilane (2) analogously as described in step 1.1 to give organically modified nanoparticles in ethanol of formula (16) (solid content of the dispersion: 13%, elemental analysis on solid residue: N, 1.1%).

Step 3.2: Cyan dye modified nanoparticles (counter ion: sodium) (18)

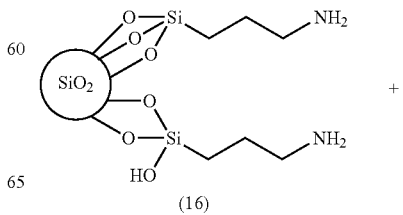

(16)

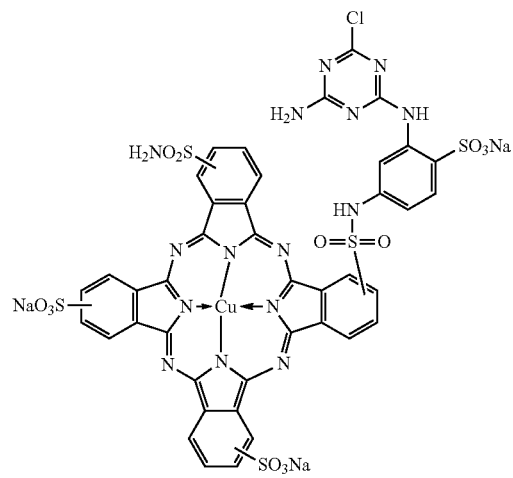
(17)
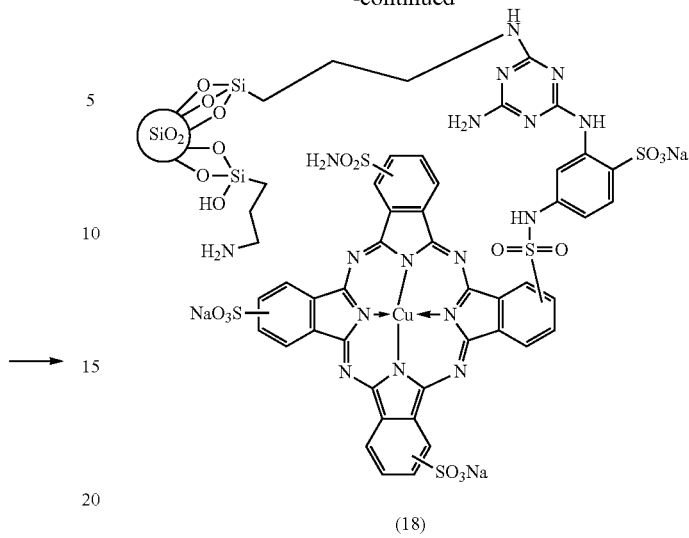
(18)
Analogously as described in step 1.2, the nanoparticles (16) are reacted with a reactive cyan dye of formula (17) to give the cyan nanoparticles (18) (solid content of the dispersion: 2.1%, elemental analysis on solid residue: C: 7.28%, H: 1.16%, N: 2.95%, S: 1.58%).
Example 4
Ammoniumsiloxane Modified Cyan Dyed Nanoparticles (19)
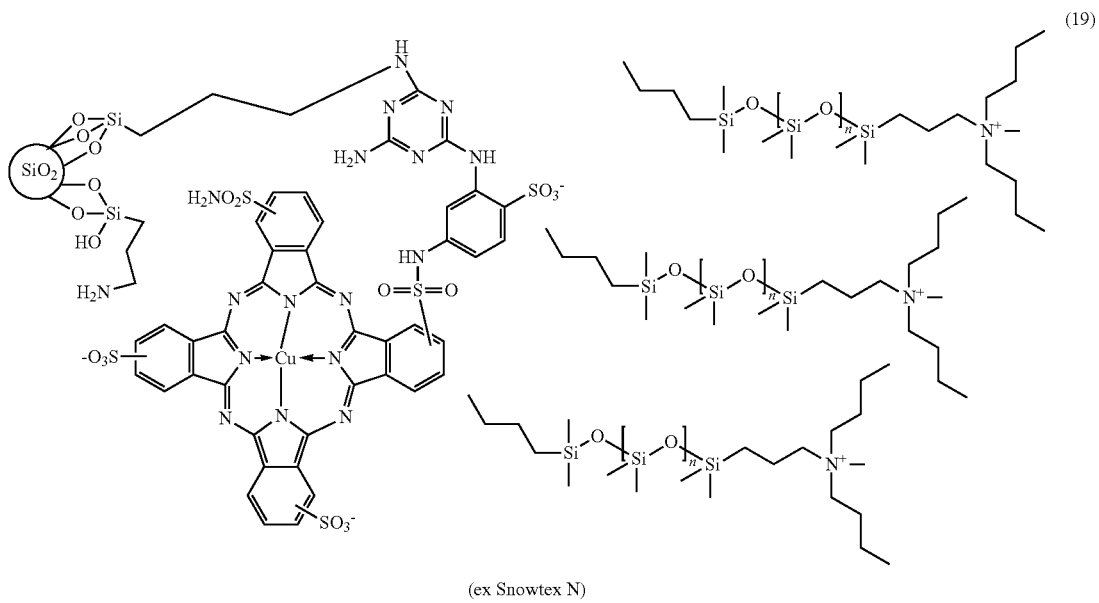
(19)
(ex Snowtex N)

Analogously as described in Example 1 the nanoparticles (22) (cf. step 4.2) are reacted with the ammonium-polydimethylsiloxane (9) to give a homogeneous dispersion of cyan dyed nanoparticles (19) (ex Snowtex N) in dodecane. This dispersion is tested as cyan electrophoretic ink.

The starting material is prepared as follows:

Step 4.1: Aminopropyl-modified-nanoparticles (21)

Step 4.2: Cyan dye modified nanoparticles (counter ion: sodium) (22)

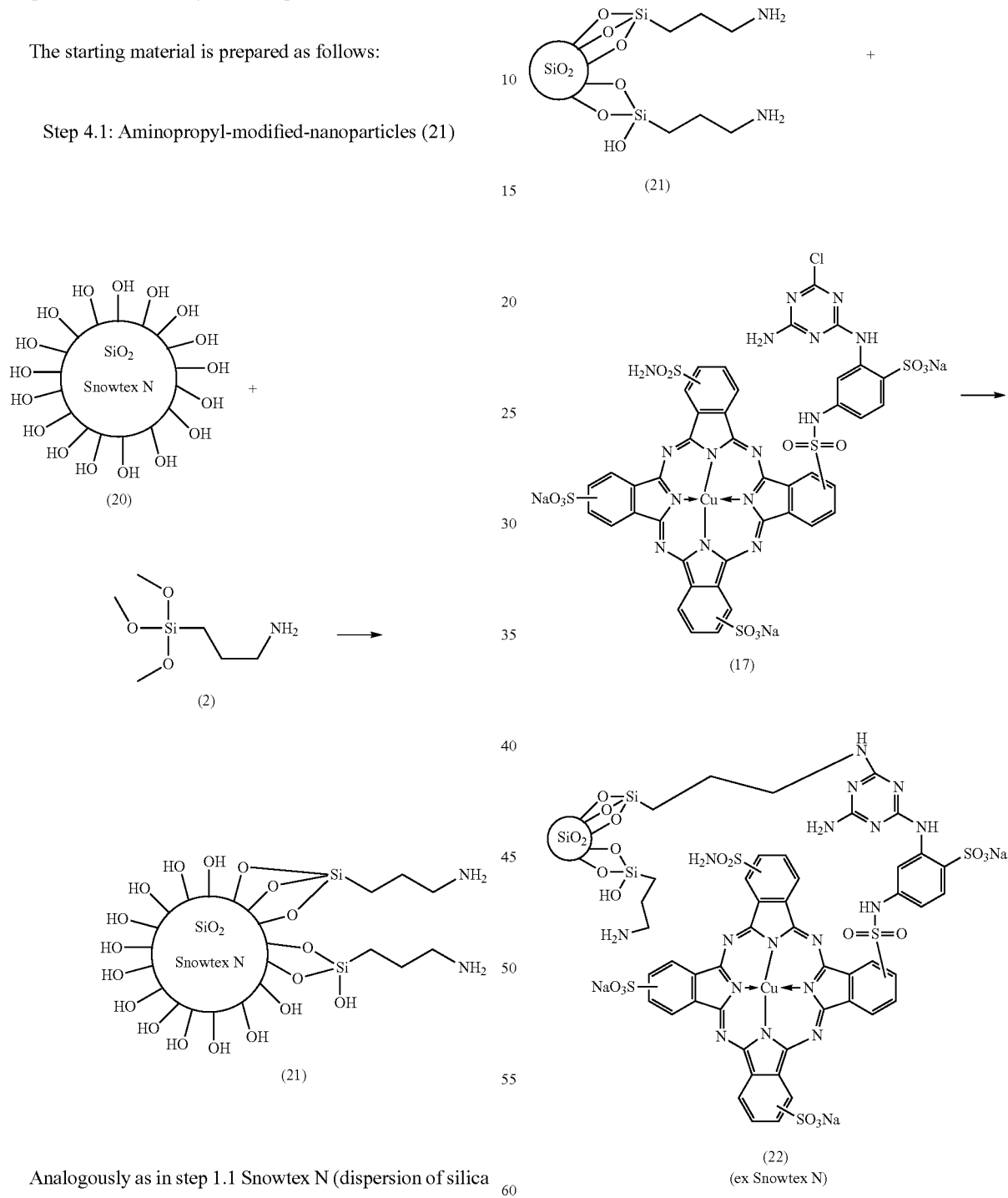

Analogously as in step 1.1 Snowtex N (dispersion of silica nanoparticles 21% by weight in water; Nissan Chemicals) of the schematic "formula" (20) is reacted with 3-aminopropyl)-trimethoxysilane (2) to give organically modified nanoparticles (21) in ethanol (solid content of the dispersion: 5.4%, elemental analysis on solid residue: C: 4.91%, H: 1.23%, N: 1.72%).

Analogously as in step 1.2, the nanoparticles (21) (ex Snowtex N) are reacted with the reactive cyan dye of formula (17) to give the cyan nanoparticles (22) (solid content of the dispersion: 1.36%, elemental analysis on solid residue: C: 11.08%, H: 1.43%, N: 4.52%, S: 2.47%).

Example 5

Charged Blue Nano Particles

Ammoniumsiloxane modified blue dyed nanoparticles (23)

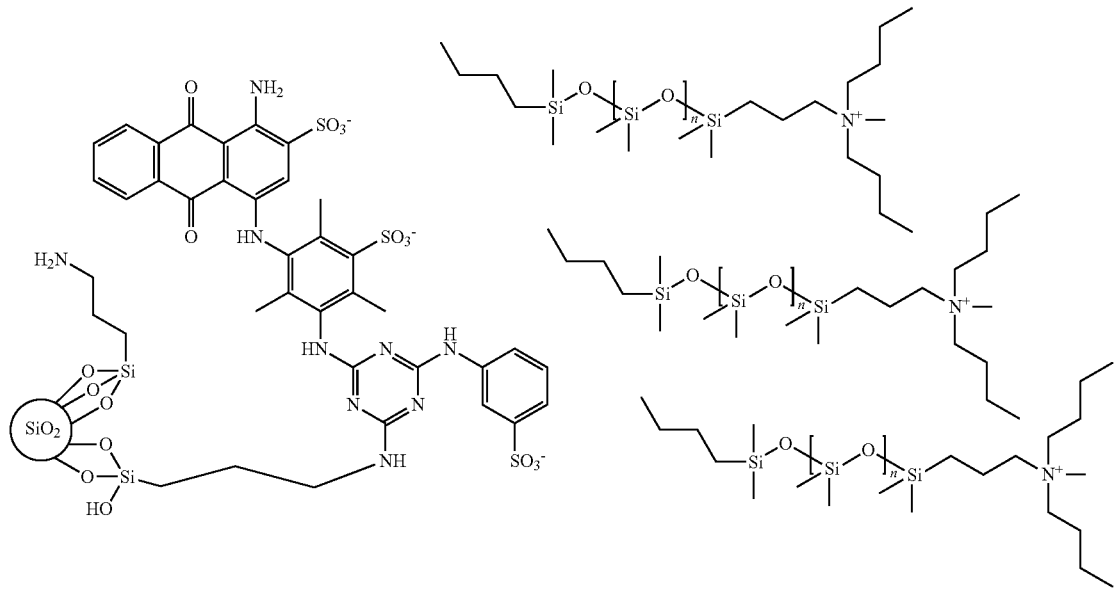

(23)

(ex Ludox SM30)

Analogously as in Example 1 the nanoparticles (25) (cf. step 5.1) are reacted with the ammonium-polydimethylsiloxane (9) to give a homogeneous dispersion of blue dyed nanoparticles (23) in dodecane. This dispersion may be used in a device as blue electrophoretic ink.

The dispersed charged nanoparticles have a diameter of 164 nm as measured by dynamic light scattering by means of a Malvern Zetasizer Nanoseries.

The surface modified dispersed charged nanoparticles show a zeta potential (ξ) of −17.7 mV as measured by means of a Malvern Zetasizer Nanoseries and, an electrophoretic mobility μ, as calculated from the Smoluchowski relation of −1.52e-2×10$^{-8}$ m$^2$/Vs at 40V.

The starting material is prepared as follows:

Step 5.1: Blue dye modified nanoparticles (counter ion: sodium) (25)

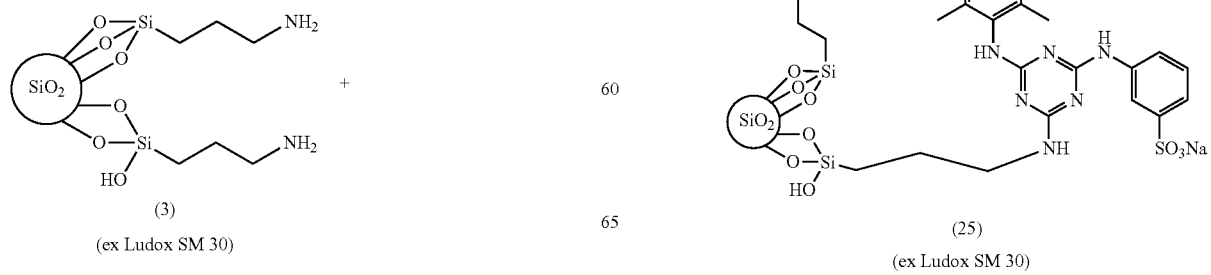

Analogously as described in step 1.2 the nanoparticles (3) are reacted with a reactive blue dye of formula (24) to give the blue nanoparticles (25) (solid content of the dispersion: 3.3%, elemental analysis on solid residue: C: 15.48%, H: 2.02%, N: 4.33%, S: 3.02%).

Example 6

Ammoniumsiloxane Modified Magenta Dyed Nanoparticles (26)

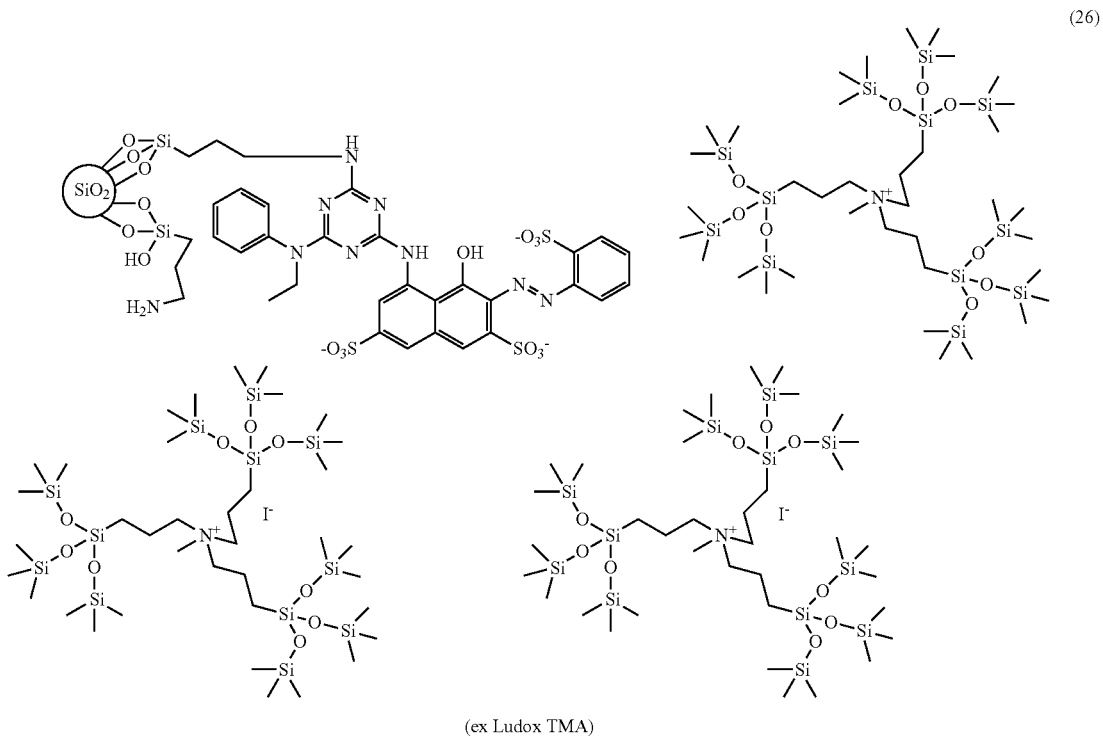

(ex Ludox TMA)

Analogously as described in Example 1 the nanoparticles (33) (cf. step 6.4) are reacted with the ammonium-polydimethylsiloxane (31) to give a homogeneous dispersion of magenta dyed nanoparticles (26) in dodecane. This dispersion may be used in a device as magenta electrophoretic ink.

The starting material is prepared as follows:

Step 6.1: Iodopropylsilane (28)

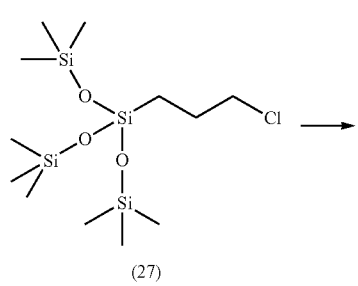

(27)

-continued

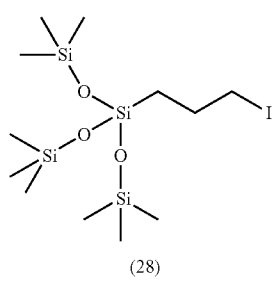

(28)

90 g of 3-chloropropyltris(trimethylsiloxy)silane (27) (Chem. Abstracts No. 18077-31-1) and 105.22 g of sodium iodide are added to 250 ml of acetone and stirred for 24 hours at reflux. The acetone is evaporated and the residue taken up in methylene chloride. The organic phase is washed with water, dried and evaporated. 89 g of the desired 3-iodopropyl-tris(trimethylsiloxy)silane (28) are obtained; $^1$H-NMR (ppm, CDCl$_3$): 3.12 2H t, 1.75 2H txt, 0.43 2H t, 0 27H s.

Step 6.2: Tris(tris(trimethylsiloxy)silylpropyl)amine (30)

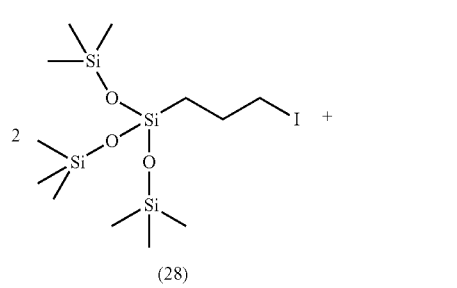

(28)

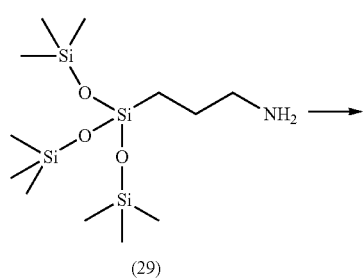

(29)

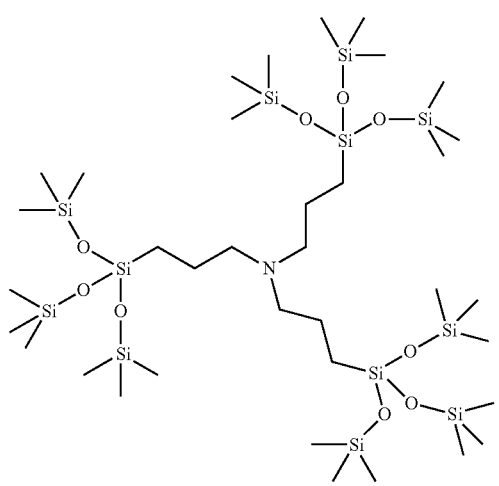

(30)

14.3 g of 3-iodopropyltris(trimethylsiloxy)silane (28), 5.7 g of 3-aminopropyltris(trimethyl-siloxy)silane and 9.6 g of sodium carbonate are added to 50 ml dimethylacetamide and stirred for 15 hours at 80° C. The dimethylacetamide is then evaporated and the residue taken up in methylene chloride. The organic phase is washed with water, dried and evaporated. The product is purified by column chromatography on silica gel to give 7 g of a slightly yellowish oil of formula (30); $^1$H-NMR (ppm, CDCl$_3$): 2.21 6H t, 1.38 6H txt, 0.28 6H t, 0 81H s.

Step 6.3: Methyl-tris(tris(trimethylsiloxy)silylpropyl)ammonium iodide (31)

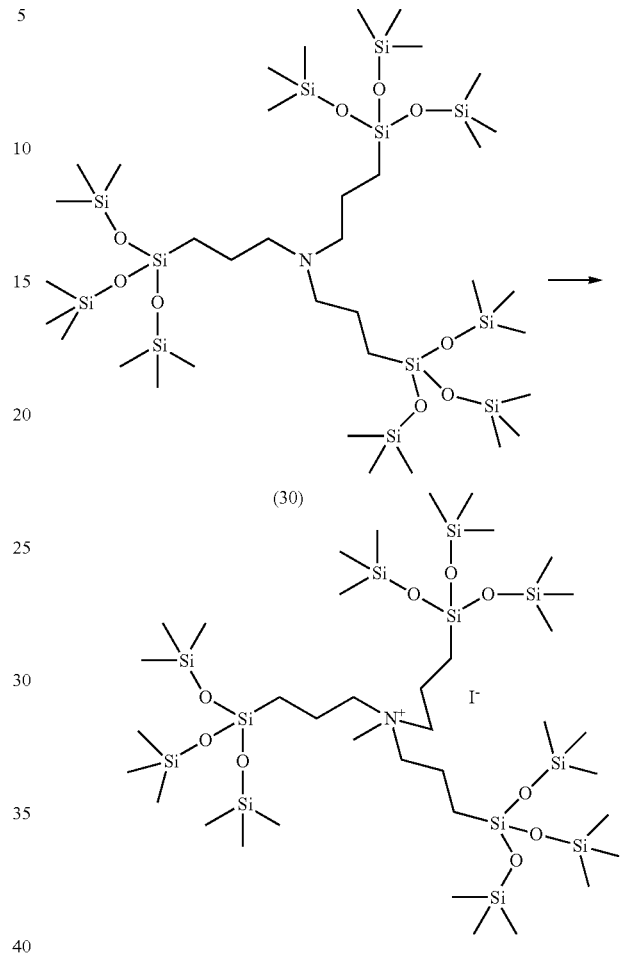

(31)

1.42 g of tris(tris(trimethylsiloxy)silylpropyl)amine (30), 1.2 g of methyl iodide and 0.9 g of sodium carbonate are added to 50 ml of acetone. The reaction mixture is stirred for 15 hours at reflux. The solvent is evaporated and the residue taken up in methylene chloride. The organic phase is then washed with water, dried and evaporated. The residue contains the desired product methyl-tris(tris(trimethylsiloxy)silylpropyl)ammonium iodide (31); $^1$H-NMR (ppm, CDCl$_3$): 3.27 6H t, 3.18 3H s, 1.56-1.50 6H m, 0.37 6H t, 0 81H s.

Step 6.4: Magenta dye modified nanoparticles (counter ion: sodium) (33)

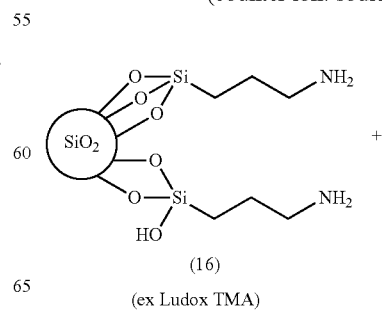

(16)

(ex Ludox TMA)

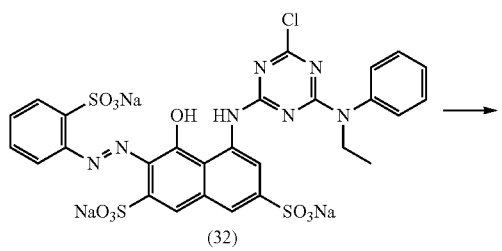

(32)

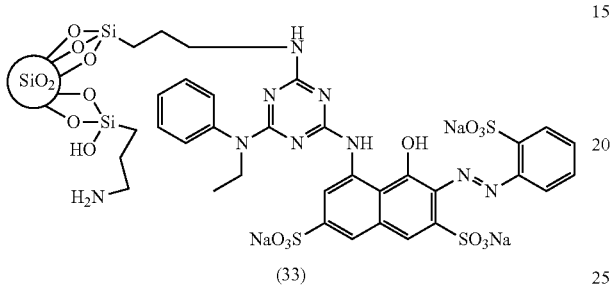

(33)

Analogously as described in step 1.2 nanoparticles of formula (16) are reacted with a reactive magenta dye of formula (32) to give the magenta nanoparticles (33) (solid content of the dispersion: 8.6%, elemental analysis on solid residue: S: 1.33%).

Example 7

Ammoniumsiloxane Modified Magenta Dyed Nano Particles (34)

Analogously as described in Example 1 the nanoparticles of the formula (5) described in Step 1.2 are reacted with the ammonium-polydimethylsiloxane of the formula (35) described in Step 7.1 to give a homogeneous dispersion of magenta dyed nanoparticles of the formula (34).

As dispersion solvent for the nanoparticles of the formula (34) tetraline may be used instead of dodecane. This dispersion may be used in a device as magenta electrophoretic ink.

Step 7.1: N,N,N-Trimethyl-N-[3-(tris-trimethylsiloxy-silyl)-propyl]ammonium iodide (35)

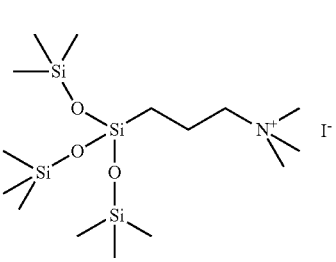

(35)

0.8 g of 3-aminopropyltris(trimethylsiloxy)silane, 1.8 g of methyl iodide and 1.35 g of sodium carbonate are added to 50 ml of dimethylformamide. The reaction mixture is stirred for 3 hours at room temperature. The solvent is evaporated and the residue taken in methylene chloride and water. The organic phase is then washed with water, dried and evaporated whereby compound (35) is obtained; $^1$H-NMR (ppm, CDCl$_3$): 3.45-3.32 11H m, 1.68-1.58 2H m, 0.39 2H t, 0.00 27H s.

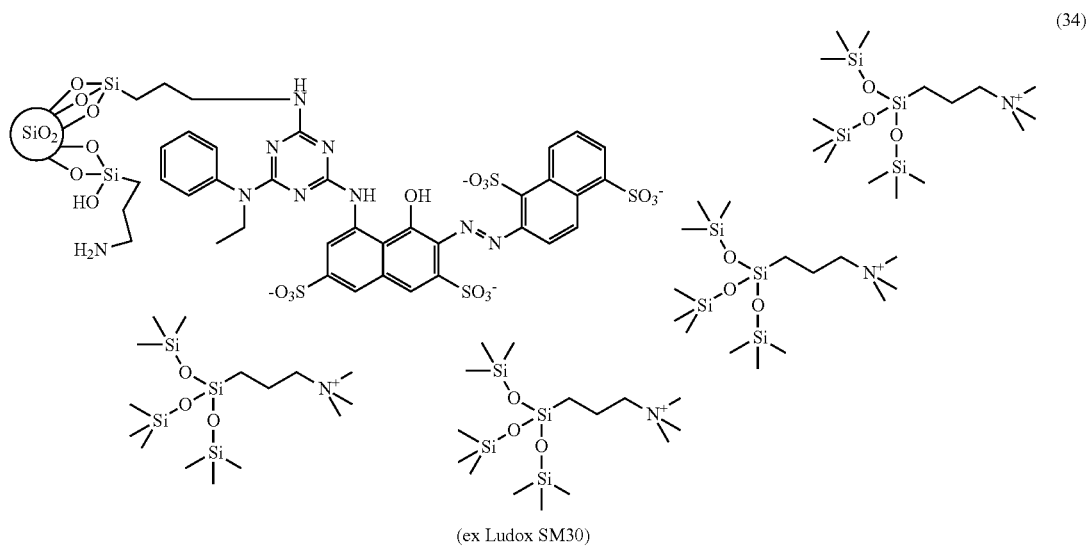

(34)

(ex Ludox SM30)

Example 8

Phosphoniumsiloxane Modified Magenta Dyed Nano Particles (36)

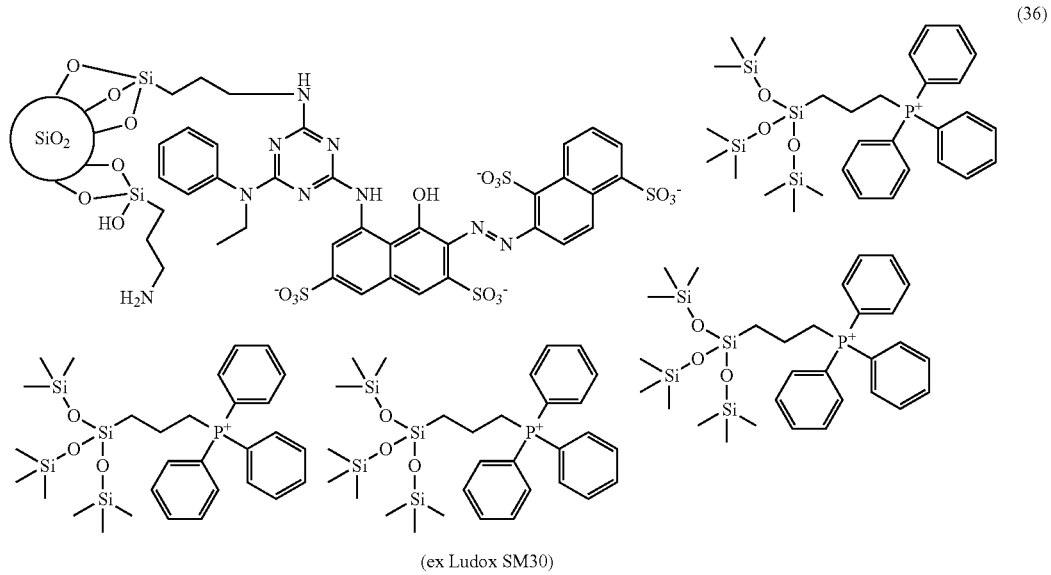

(ex Ludox SM30)

Analogously as described in Example 1 the nanoparticles of the formula (5) described in Step 1.2 are reacted with the Triphenyl-(tris(trimethylsiloxy)silylpropyl)phosphonium iodide of the formula (37) described in Step 8.1 to give a homogeneous dispersion of magenta dyed nanoparticles of the formula (36).

As dispersion solvent for the nanoparticles of the formula (36) tetraline may be used instead of dodecane. This dispersion may be used in a device as magenta electrophoretic ink.

Step 8.1: Triphenyl-(tris(trimethylsiloxy)silylpropyl) phosphonium iodide (37)

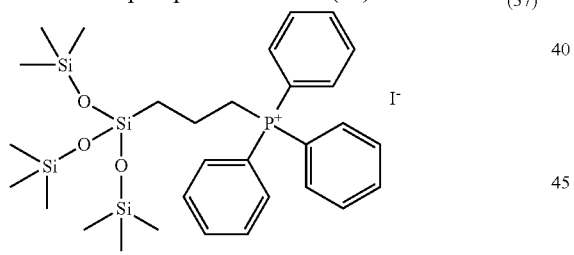

1.0 g of 3-iodopropyltris(trimethylsiloxy)silane (28) described in Step 6.1, 1.7 g of triphenylphosphine and 0.69 g of sodium carbonate are added to 50 ml of tetrahydrofurane. The reaction mixture is stirred for 2 days at reflux. The solvent is evaporated and the residue purified by column chromatography on silica gel to give the desired phosphonium salt (37); ESI-MS: M$^+$599.58.

Example 9

Ammoniumsiloxane Modified Yellow Dyed Nanoparticles (38)

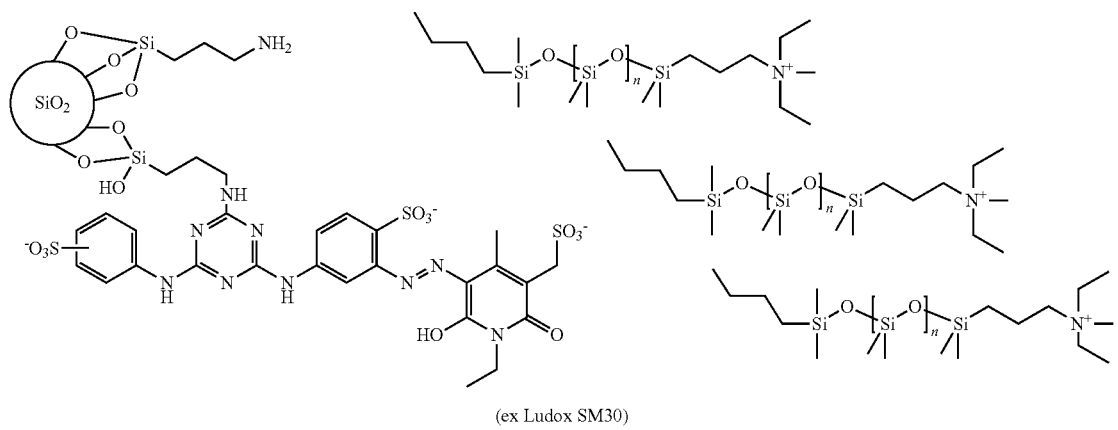

(ex Ludox SM30)

Analogously as described for compound (II) in Example 2, the nanoparticles (13) are reacted with compound (39) (cf. Step 9.1) to give a homogeneous dispersion of yellow dyed nanoparticles 26. Instead of dodecane Isopar G is used as dispersion solvent. This dispersion is used in a device as yellow electrophoretic ink.

Step 9.1: Methyl-diethyl-ammoniumpropylene-polydimethylsiloxane (39)

Analogously as described for compound (9) in Step 1.5 compound (39) is manufactured; $^1$H-NMR (ppm, CDCl$_3$): 3.58 4H q, 3.32 2H t, 3.20 3H s, 1.70-1.55 4H m, 1.35 6H t, 1.30-1.2 4H m, 0.82 3H t, 0.55-0.46 4H m, 0.08 6H s, 0.00 CH$_3$—Si s.

Example 10

Ammoniumsiloxane Modified Cyan Dyed Nanoparticles (40)

Analogously as described for compound (19) in Example 4, the nanoparticles (22) are reacted with compound (41) (cf. Step 10.1) to give a homogeneous dispersion of cyan dyed nanoparticles (40). This dispersion is used in a device as cyan electrophoretic ink.

Step 10.1: Methyl-diisopropyl-ammoniumpropylene-polydimethylsiloxane (41)

Analogously as described for compound (9) in Step 1.5 compound (41) is manufactured; $^1$H-NMR (ppm, CDCl$_3$): 4.08 2H dxq, 3.22 2H t, 3.07 3H s, 1.75-1.61 4H m, 1.50 6H d, 1.45 6H d, 1.30-1.2 4H m, 0.82 3H t, 0.55-0.46 4H m, 0.08 6H s, 0.00 CH$_3$—Si s.

Example 11

Electrophoretic Ink Comprising Red Pigment Particles

Analogously as described in Example 2, the aqueous suspension of the modified pigment particles described in Step 11.1 are reacted with the ammonium-polydimethylsiloxane of the formula (9) depicted in Step 1.5. The two-phase system is stirred for 15 minutes at 60° C. in a vial immersed into a heated oil bath. After cooling, the two phases separate. The organic phase is washed. After standing over night, the low-boiling organic solvents are removed in vacuo, leaving a red dispersion of the modified pigment in dodecane. After removal of agglomerates by centrifugation, the dispersion is homogeneous and may be used in a device as red electrophoretic ink.

Step 11.1: 39.1 g of a 41.1% aqueous press cake of salt kneaded C.I. (Colour Index) Pigment Red 254 [CAS-No. 84632-65-5; IRGAZIN DPP Red BO ex CIBA SC; 3,6-Bis (4-chlorophenyl)-2,5-dihydropyrrolo[3,4-c]pyrrole-1,4-dione] of the formula (205) and 0.28 g of a 28.6% aqueous filter cake of the sodium salt of a partially sulfonated mixture of the three compounds having the chemical formulae (205), (206) and (207)

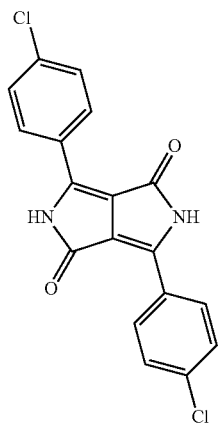

(205)

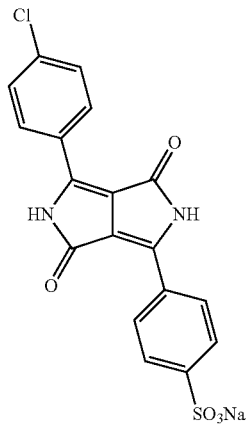

(206)

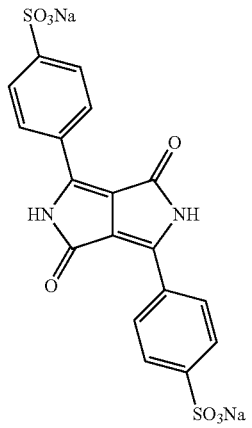

(207)

obtainable as described in Example 1a) and 1b) of DE-4037556A1 are dispersed with a disperser mixer (Cowles dissolver) during 90 minutes in 150 ml water.

Example 12

Electrophoretic Ink Comprising Blue Pigment Particles

Analogously as described in Example 2, the aqueous suspension of the pigment manufactured as described in Step 12.1 is reacted with the ammonium-polydimethylsiloxane of the formula (9) depicted in Step 1.5 to prepare a blue electrophoretic ink.

Step 12.1: 23.1 g of a 49.2% aqueous filter cake of salt kneaded Copper Phthalocyanine Blue 15.3 (C.I. Pigment Blue 15.3; C.I. NO.: 74160:3; CAS NO: 147-14-8; IRGALITE Blue GLO; ex CIBA SC) of formula (221) and 0.42 g of a mono-sulfonated (as sodium salt) copper phthalocyanine (as 26.4% aqueous filter cake) derivative of formula (222) are dispersed together in 100 ml of water with a Cowles dissolver for 90 minutes.

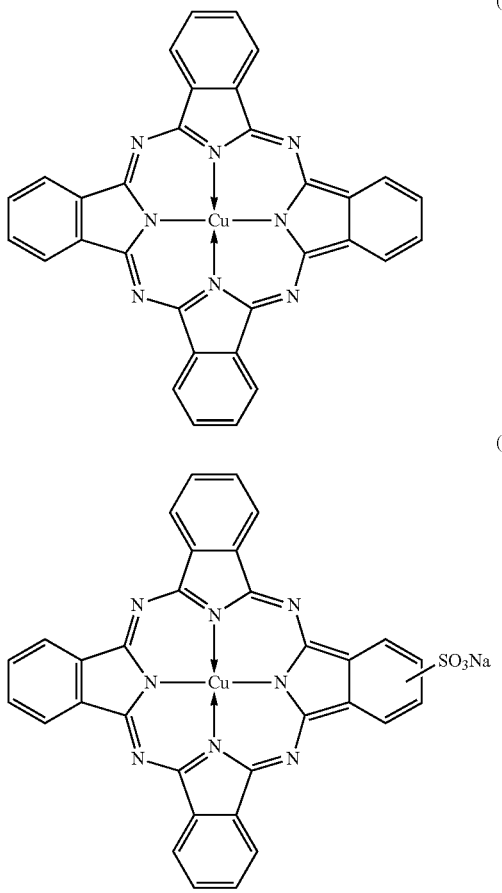

(221)

(222)

Example 13

Electrophoretic Ink Comprising Blue Pigment Particles

Analogously as described in Example 2, the aqueous suspension of the pigment manufactured as described in Step 13.1 is reacted with the ammonium-polydimethylsiloxane of the formula (9) depicted in Step 1.5 to prepare a blue electrophoretic ink.

Step 13.1: 23.4 g of a 49.2% aqueous filter cake of salt kneaded C.I. Pigment Blue 15.3 (IRGALITE Blue GLO ex CIBA SC) of formula (221) and 0.23 g of the pigmentary synergist (dispersant) SOLSPERSE 5000 [CAS No. 70750-63-9; Lubrizol Advanced Materials Inc.; corresponding to formula (222) with the difference that SOLSPERSE 5000 is no sodium salt, but likely a quaternary ammonium salt] are dispersed together in 100 ml of water with a Cowles dissolver for 90 minutes. Afterwards the suspension is filtered on a paper filter, washed with water and the product is dried in a vacuum oven at 80° C.

Example 14

Electrophoretic Ink Comprising Green Pigment Particles

Analogously as described in Example 2, the aqueous suspension of the pigment manufactured as described in Step 14.1 is reacted with the ammonium-polydimethylsiloxane of the formula (9) depicted in Step 1.5 to prepare a green electrophoretic ink.

Step 14.1: 13.5 g of a 38.9% aqueous filter cake of C.I. Pigment Green 7 (C.I. 74260; Copper Phthalocyanine Green; Polychloro copper phthalocyanine; IRGALITE Green GFNP; ex CIBA SC) and 0.11 g of the copper phthalocyanine derivative (217)

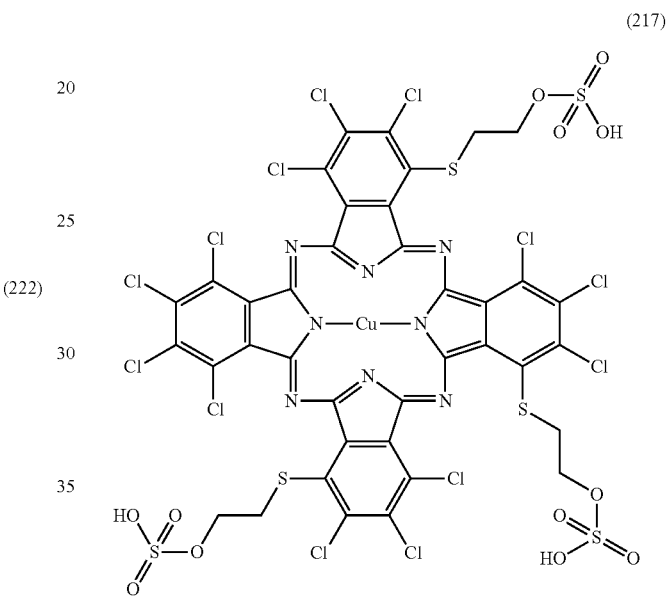

(217)

are dispersed with a Cowles dissolver for 90 minutes.

Example 15

Electrophoretic Ink Comprising Green Pigment Particles

Analogously as described in Example 2, the aqueous suspension of the pigment manufactured as described in Step 15.1 is reacted with the ammonium-polydimethylsiloxane of the formula (9) depicted in Step 1.5 to prepare a green electrophoretic ink.

Step 15.1: 14 g of a 35.5% aqueous filter cake of CI Pigment Green 36 (copper phthalocyanine green powder [cp green 360009]; polybromophthalo green; C.I. NO.: 74265 CAS NO: 14302-13-7; IRGALITE Green 6G ex CIBA SC) and 0.12 g of the copper phthalocyanine derivative (217) depicted in Step 14.1 are dispersed with a Cowles dissolver for 90 minutes.

Example 16

Electrophoretic Ink Comprising Black Pigment Particles

Analogously as described in Example 2, the aqueous suspension of the pigment manufactured as described in Step 16.1 is reacted with the ammonium-polydimethylsiloxane of the formula (9) depicted in Step 1.5 to prepare a black electrophoretic ink.

Step 16.1: 10 g of a micronized oxobenzofuranyliden-dihydroindolone obtainable according to example 12B on page 35 of WO 00/24736 A1 and having the tentative formula (208)

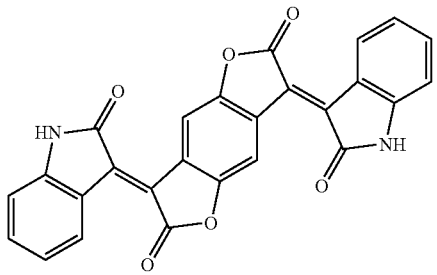

(208)

are dispersed in 100 ml of water for 18 hours.

The substance of the tentative formula (208) is described in WO 00/24736 A1 as a "violet powder". While the inventors of the present patent application consider the above formula (208) to represent the most likely structure of the product obtained according to said Example 12b, the structure is not absolutely certain. The correct structure could also correspond to an isomer, especially a cis/trans-isomer of formula (208), or to a mixture of such isomers.

0.7 g of sulfanilic acid (4-aminobenzene sulfonic acid) in 2.9 g of water and 1.38 g of 35% aqueous hydrochloric acid are treated separately with 1.08 ml of 4M aqueous $NaNO_2$ solution at 4° C. The diazonium salt is added to the pigment suspension obtained according to Step 16.1. The cooling is removed and the mixture is allowed to warm up from 4° C. to 23° C. under constant stirring and is then heated to 50° C. during one hour.

Example 17

Electrophoretic Ink Comprising Black Pigment Particles

Analogously as described in Example 2, the aqueous suspension of the pigment manufactured as described in Step 17.1 is reacted with the ammonium-polydimethylsiloxane of the formula (9) depicted in Step 1.5 to prepare a black electrophoretic ink.

Step 17.1: 10 g of C.I. Pigment Black 7 are dispersed overnight in 100 ml water. 0.7 g of sulfanilic acid in 2.9 g of water and 1.38 g of concentrated hydrochloric acid are treated separately with 1.08 ml of 4M $NaNO_2$ solution at 4° C. The diazonium salt is slowly added to the pigment suspension. The cooling is removed and the mixture is allowed to warm up from 4° C. to room temperature under constant stirring and is then heated to 40° C. during two hours.

Example 18

Electrophoretic Ink Comprising Red Pigment Particles

Analogously as described in Example 2, the aqueous suspension of the pigment manufactured as described in Step 18.1 is reacted with the dipotassium salt of the formula (225) manufactured as described in Step 18.2 to prepare a red electrophoretic ink.

Step 18.1: 45.6 g of a 43.8% aqueous press cake of salt kneaded C.I. Pigment Red 264 of the formula (218)

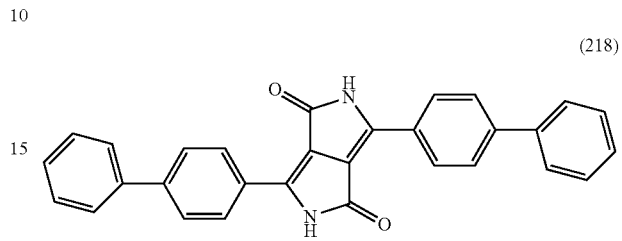

(218)

are dispersed in 200 ml of water. Separately, a solution of 5.5 g of the hydrochloride of procaine having the formula (219)

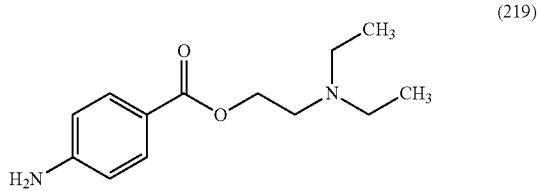 [SMILES: CCN(CC)CCOC(=O)c1ccc(N)cc1]

(219)

in 15 g of water and 7 ml of HCl is treated with 5.5 ml of 4M aqueous $NaNO_2$ solution at 0-4° C. The diazonium salt is added slowly to the pigment suspension. After stirring at 0-4° C. for 15 minutes, the suspension is stirred for one hour at 23° C. and then heated to 50° C. and further stirred for one hour.

Step 18.2: manufacture of the dipotassium salt of the formula (225)

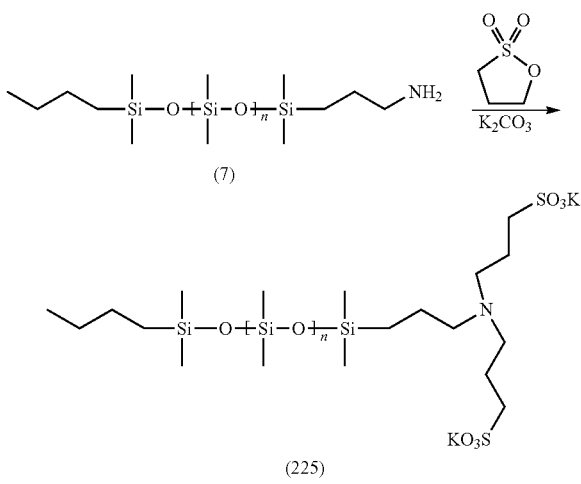

(225)

2 g of compound (7) described in Step 1.3 are dissolved in 10 ml of dimethylformamide, then 0.8 g of anhydrous potassium carbonate and 0.7 g of 1,3-propanesultone are added, and the suspension is stirred overnight at 105° C. After cooling to ambient temperature, the reaction mixture is diluted with water, and the dipotassium salt of formula (225) is separated [cf. the corresponding anion of the formula (202) disclosed on page 23 of the priority document of the present application].

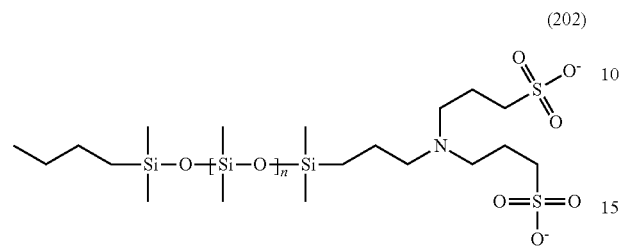

(202)

Example 19

Electrophoretic Ink Comprising Blue Pigment Particles

It is proceeded as in Example 18, with the difference that a presscake of C.I. Pigment Blue 15:3 (Copper Phthalocyanine Blue; C.I. No.: 74160:3; CAS No: 147-14-8) is used instead of a presscake of C.I. Pigment Red 264.

Example 20

Electrophoretic Ink Comprising Blue Pigment Particles

It is proceeded as in example 18, with the difference that a presscake of C.I. Pigment Blue 15:1 (another modification than C.I. Pigment Blue 15:3) is used instead of a presscake of C.I. Pigment Red 264.

Example 21

Electrophoretic Ink Comprising Magenta Pigment Particles

Analogously as described in Example 2, the aqueous suspension of the pigment manufactured as described in Step 21.1 is reacted with the sulfonated polydimethylsiloxane of the formula (225) described in Step 18.2 to prepare a magenta electrophoretic ink.

Step 21.1: 63 g of a 31.5% aqueous press cake of C.I. Pigment Red 122 (CAS Nos. 980-26-7 and 16043-40-6: EU No. 213-561-3: C.I.No.: 73915) of the formula

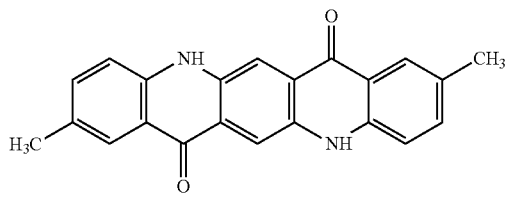

(220)

are dispersed in 180 ml of water. Separately, a solution of 5.5 g of procaine hydrochloride in 15 g of water and 7 ml of HCl is treated with 5.5 ml of 4M aqueous $NaNO_2$ solution at 0-4° C. The diazonium salt is added to the pigment suspension.

Example 22

Electrophoretic Ink Comprising Yellow Pigment Particles

It is proceeded as in Example 21, with the difference that a presscake of C.I. Pigment Yellow 128 of formula (223) is used instead of a presscake of C.I. Pigment Red 122.

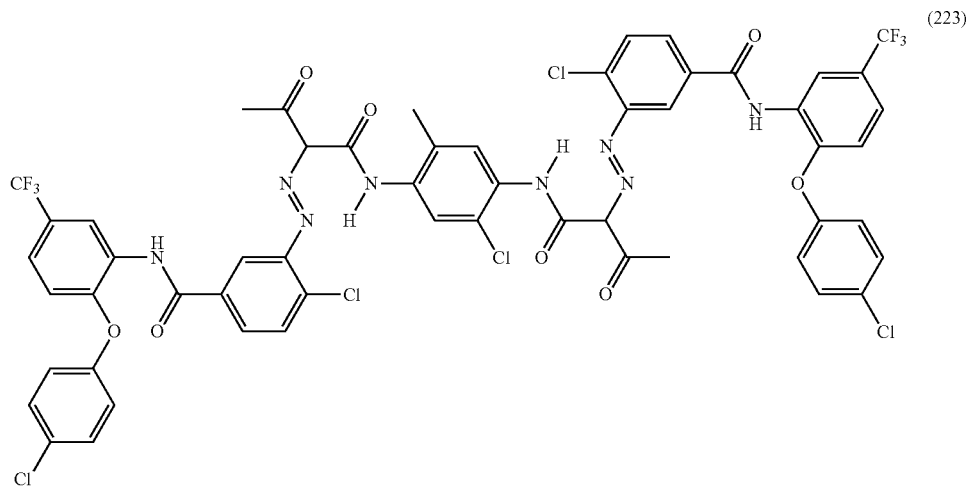 [SMILES: CC(=O)C(/N=N/c1cc(C(=O)Nc2cc(C(F)(F)F)ccc2Oc2ccc(Cl)cc2)ccc1Cl)C(=O)Nc1cc(Cl)c(NC(=O)C(/N=N/c2cc(C(=O)Nc3cc(C(F)(F)F)ccc3Oc3ccc(Cl)cc3)ccc2Cl)C(C)=O)cc1C]

(223)

Example 23

Electrophoretic Ink Comprising Red Pigment Particles

It is proceeded as in Example 11, with the difference that the sulfonated C.I. Pigment Red 254 is replaced by the same quantity (calculated on dry weight) of a) the diketopyrrolopyrrole carboxylate described in Example 11A of U.S. Pat. No. 4,914,211, or b) the diketopyrrolopyrrole phosphonate described in Example 16 of U.S. Pat. No. 4,914,211.

The invention claimed is:

1. A composition comprising:
   a charged particle of volume 5 nm³ to 500 million nm³ having an inorganic core, and
   a counter ion which is separable from the particle and is not covalently linked to the particle, said counter ion comprising a polysiloxane moiety linked via suitable bridge members to a positively or negatively charged functional group, wherein a dye is covalently bound to the core.

2. The composition according to claim 1, wherein the inorganic core is a $SiO_2$, $Al_2O_3$, $TiO_2$ or mixed $SiO_2$, $Al_2O_3$, and/or $TiO_2$ core.

3. The composition according to claim 1, wherein the dye is covalently bound to an oxygen atom on the surface of the core, via a radical of formula

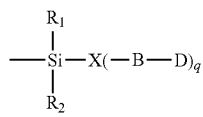

(I)

wherein q is 1 to 4, $R_1$ and $R_2$ are independently of each other hydrogen, core surface—O—, or a substituent, X is alkylene, B is a direct bond or a bridge member extending to D, and D is the charged residue of a dye.

4. The composition according to claim 1, wherein the dye is selected from the group consisting of a magenta dye of formula (4), a yellow dye of formula (12), a cyan dye of formula (17), a blue dye of formula (24), and a magenta dye of formula (32)

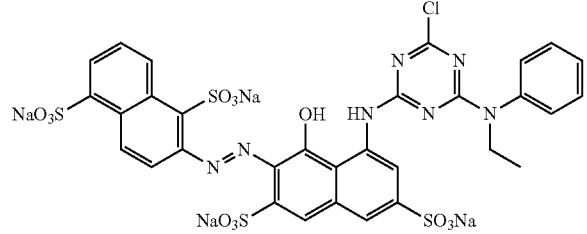

(4)

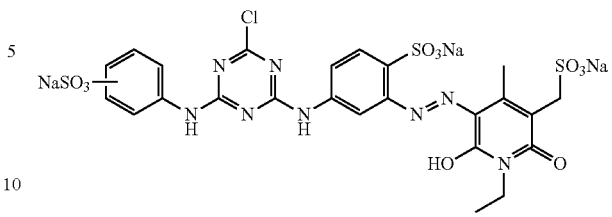

(12)

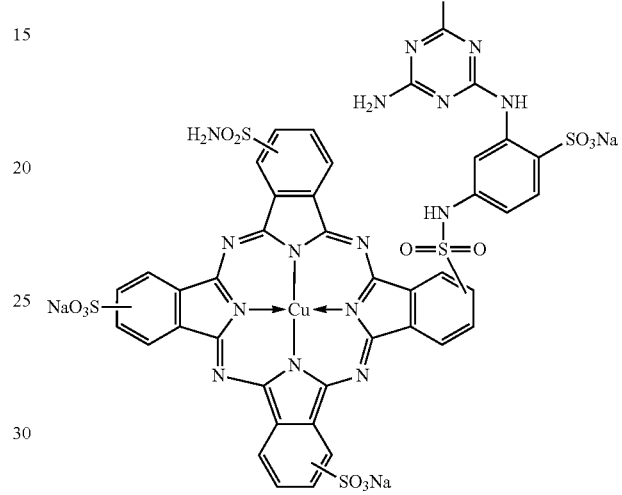

(17)

(24)

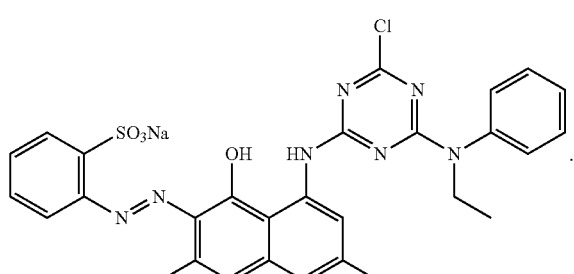

(32)

5. The composition according to claim 1, wherein the counter ion has formula (II) or (202), in each of which n represents 5 to 20 and each of $R_4$, $R_{11}$ and $R_{12}$, independently of each other represents $C_1$-$C_{12}$ alkyl, or formula (183)

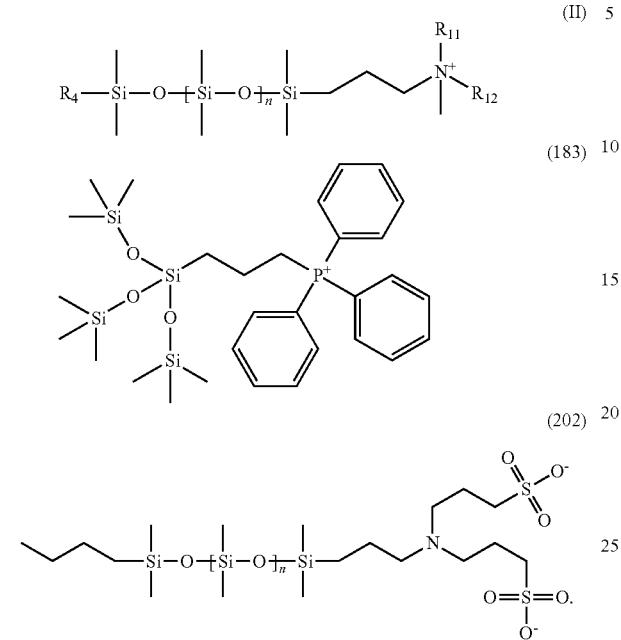

6. The composition according to claim 1 in the form of a homogenous dispersion.

7. The composition according to claim 1 in the form of an electrophoretic ink.

8. A method of using the composition according to claim 1 comprising adding the composition according to claim 1 in an electrophoretic display.

9. A method of using the composition according to claim 1 comprising effecting a color change under electrophoretic conditions.

10. The composition according to claim 1, wherein the polysiloxane moiety comprises a branched or unbranched backbone comprising two or more linked siloxane groups according to the following formula:

—Si(R'$_2$)—O— wherein:
R' is selected from the group consisting of hydrogen, a $C_1$-$C_7$ alkyl group, a $C_1$-$C_7$ haloalkyl group, and —O—Si(R"$_2$)—;
R" can be the same or different from R' and is selected from the group consisting of hydrogen, a $C_1$-$C_7$ alkyl group, and a $C_1$-$C_7$ haloalkyl group.

11. A composition comprising:
a charged particle of volume 5 nm$^3$ to 500 million nm$^3$ having a core consisting of an organic pigment and/or an organic pigment derivative, and
a counter ion which is separable from the particle and is not covalently linked to the particle, said counter ion comprising a polysiloxane moiety linked via suitable bridge members to a positively or negatively charged functional group,
wherein a dye is covalently bound to the core.

12. The composition according to claim 11, wherein the organic pigment is selected from the group consisting of carbon black and pigments of the 1-amino-anthraquinone, anthanthrone, anthrapyrimidine, azo, azomethine, quinacridone, quinacridonequinone, quinophthalone, dioxazine, diketopyrrolopyrrole, flavanthrone, indanthrone, isoindoline, isoindolinone, isoviolanthrone, perinone, perylene, phthalocyanine, pyranthrone, thioindigo or oxobenzofuranyliden-dihydroindolone series.

13. The composition according to claim 11, wherein the polysiloxane moiety comprises a branched or unbranched backbone comprising two or more linked siloxane groups according to the following formula:

—Si(R'$_2$)—O— wherein:
R' is selected from the group consisting of hydrogen, a $C_1$-$C_7$ alkyl group, a $C_1$-$C_7$ haloalkyl group, and —O—Si(R"$_2$)—O—;
R" can be the same or different from R' and is selected from the group consisting of hydrogen, a $C_1$-$C_7$ alkyl group, and a $C_1$-$C_7$ haloalkyl group.

14. A method of using a counter ion comprising:
adding a polysiloxane moiety linked via suitable bridge members to a quaternary, positively charged, nitrogen or phosphorus atom, or to a moiety carrying an anionic functional group in electrophoresis;
wherein the counter ion has formula (II) or (202), in each of which n represents 5 to 20 and each of $R_4$, $R_{11}$ and $R_{12}$, independently of each other represents $C_1$-$C_{12}$ alkyl, or formula (183)

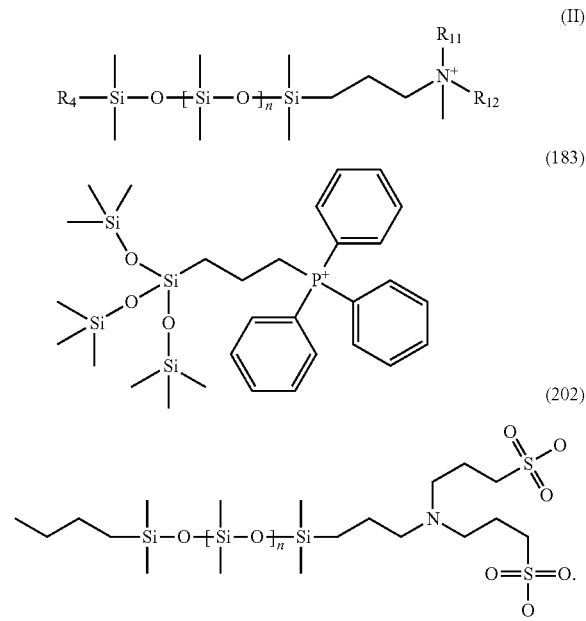

15. The method according to claim 14, wherein the polysiloxane moiety comprises a branched or unbranched backbone comprising two or more linked siloxane groups according to the following formula:

—Si(R'$_2$)—O— wherein:
R' is selected from the group consisting of hydrogen, a $C_1$-$C_7$ alkyl group, a $C_1$-$C_7$ haloalkyl group, and —O—Si(R"$_2$)—;
R" can be the same or different from R' and is selected from the group consisting of hydrogen, a $C_1$-$C_7$ alkyl group, and a $C_1$-$C_7$ haloalkyl group.

* * * * *